United States Patent
Katano et al.

(10) Patent No.: US 10,428,275 B2
(45) Date of Patent: Oct. 1, 2019

(54) METHOD FOR MANUFACTURING LIQUID CRYSTAL DISPLAY DEVICE AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yuko Katano, Chiba (JP); Fumitaka Kondo, Chiba (JP); Kazuhiro Ogita, Chiba (JP); Hiroshi Endou, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/313,472

(22) PCT Filed: Jun. 5, 2017

(86) PCT No.: PCT/JP2017/020780
§ 371 (c)(1),
(2) Date: Dec. 27, 2018

(87) PCT Pub. No.: WO2018/003412
PCT Pub. Date: Jan. 4, 2018

(65) Prior Publication Data
US 2019/0225887 A1 Jul. 25, 2019

(30) Foreign Application Priority Data

Jun. 28, 2016 (JP) .................................. 2016-127323
Sep. 9, 2016 (JP) .................................. 2016-176384

(51) Int. Cl.
| | | |
|---|---|---|
| C09K 19/56 | (2006.01) | |
| G02F 1/1362 | (2006.01) | |
| C09K 19/30 | (2006.01) | |
| C09K 19/34 | (2006.01) | |
| G02F 1/1343 | (2006.01) | |
| G02F 1/1337 | (2006.01) | |

(52) U.S. Cl.
CPC .......... C09K 19/56 (2013.01); C09K 19/3003 (2013.01); C09K 19/3066 (2013.01); C09K 19/3402 (2013.01); G02F 1/1362 (2013.01); G02F 1/13439 (2013.01); G02F 1/133788 (2013.01); C09K 2019/301 (2013.01); C09K 2019/3004 (2013.01); C09K 2019/3009 (2013.01); C09K 2019/3016 (2013.01); C09K 2019/3422 (2013.01); C09K 2019/3425 (2013.01)

(58) Field of Classification Search
CPC ................ C09K 19/56; C09K 19/3066; C09K 19/3402; C09K 19/3003; G02F 1/1362; G02F 1/133788; G02F 1/13439
See application file for complete search history.

(56) References Cited

U.S. PATENT DOCUMENTS

| | | |
|---|---|---|
| 2013/0182202 A1 | 7/2013 | Graziano et al. |
| 2013/0314655 A1 | 11/2013 | Archetti et al. |
| 2015/0252265 A1 | 9/2015 | Archetti et al. |
| 2015/0299576 A1 | 10/2015 | Fujita et al. |
| 2016/0108316 A1 | 4/2016 | Kurisawa et al. |

FOREIGN PATENT DOCUMENTS

| | | |
|---|---|---|
| JP | S5035076 | 4/1975 |
| JP | 2015168826 | 9/2015 |
| JP | 2015205982 | 11/2015 |
| WO | 2012038026 | 3/2012 |
| WO | 2012104008 | 8/2012 |
| WO | 2013004372 | 1/2013 |
| WO | 2014090362 | 6/2014 |
| WO | 2014094959 | 6/2014 |
| WO | 2014123056 | 8/2014 |

OTHER PUBLICATIONS

"International Search Report (Form PCT/ISA/210)" of PCT/JP2017/020780, dated Aug. 1, 2017, with English translation thereof, pp. 1-2.
"Written Opinion of the International Searching Authority (Form PCT/ISA/237) of PCT/JP2017/020780," dated Aug. 1, 2017, with English translation thereof, pp. 1-6.

*Primary Examiner* — Joseph L Williams
(74) *Attorney, Agent, or Firm* — JCIPRNET

(57) ABSTRACT

A method for manufacturing a liquid crystal display device using a liquid crystal composition containing a polar compound having a polymerizable group. Upon manufacturing the liquid crystal display device including a pair of substrates that have no alignment film and arranged to face each other, and including a liquid crystal composition containing a liquid crystal compound and a polymerizable compound as a liquid crystal layer formed between the substrates formed of an electrode group formed on either one or both of surfaces faced by each of the pair of substrates, in which at least one of the polymerizable compounds is a compound having a polar anchor group, wherein the polymerizable compound is allowed to react under conditions of 10 or more in an accumulated light quantity ratio (313 nm/254 nm) at 254 nanometers and 313 nanometers to form an alignment control layer.

20 Claims, No Drawings

METHOD FOR MANUFACTURING LIQUID CRYSTAL DISPLAY DEVICE AND LIQUID CRYSTAL DISPLAY DEVICE

CROSS-REFERENCE TO RELATED APPLICATION

This application is a 371 of international application of PCT application serial no. PCT/JP2017/020780, filed on Jun. 5, 2017, which claims the priority benefit of Japan application no. 2016-127323, filed on Jun. 28, 2016, and Japan application no. 2016-176384, filed on Sep. 9, 2016. The entirety of each of the abovementioned patent applications is hereby incorporated by reference herein and made a part of this specification.

TECHNICAL FIELD

The invention relates to a method for manufacturing a liquid crystal display device. In particular, the invention relates to a method for manufacturing a liquid crystal display device using a liquid crystal composition containing a polar compound (or a polymer thereof) having a polymerizable group.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics therebetween. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide device-usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

Optical anisotropy of the composition relates to a contrast ratio in the device. According to a mode of the device, large optical anisotropy or small optical anisotropy, more specifically, suitable optical anisotropy is required. A product ($\Delta n \times d$) of the optical anisotropy ($\Delta n$) of the composition and a cell gap (d) in the device is designed so as to maximize the contrast ratio. A suitable value of the product depends on a type of the operating mode. In a device having the VA mode, the value is in the range of about 0.30 micrometer to about 0.40 micrometer, and in a device having the IPS mode or the FFS mode, the value is in the range of about 0.20 micrometer to about 0.30 micrometer. In the above case, a composition having the large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at a temperature close to the maximum temperature of the nematic phase even after the device has been used for a long period of time is preferred. Stability of the composition to ultraviolet light and heat relates to a service life of the device. In the case where the stability is high, the device has a long service life. Such characteristics are preferred for an AM device for use in a liquid crystal projector, a liquid crystal television and so forth.

In a polymer sustained alignment (PSA) mode liquid crystal display device, a liquid crystal composition containing a polymer is used. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of the liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

In a general-purpose liquid crystal display device, vertical alignment of the liquid crystal molecules is achieved by a polyimide alignment film. On the other hand, in a liquid crystal display device having no alignment film, a liquid crystal composition containing a polymer and a polar compound is used. First, a composition to which a small amount of a polymerizable compound and a small amount of a polar compound are added is injected into the device. Here, the polar compound is adsorbed onto a substrate surface and arranged. The liquid crystal molecules are aligned according to the arrangement. Next, the composition is irradiated with ultraviolet light while voltage is applied between substrates of the device. Here, the polymerizable compound is polymerized to stabilize alignment of the liquid crystal molecules. In the composition, the alignment of the liquid crystal molecules can be controlled by the polymer and the polar compound, and therefore the response time in the device is shortened and also the image persistence is improved. Further, in the device having no alignment film, a step of forming an alignment film is unnecessary. The device has no alignment film, and therefore electric resistance of the device is not reduced by interaction between the alignment film and the composition. Such an effect due to a combination of the polymer and the polar compound can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In an AM device having a polymer sustained alignment mode, a composition having positive or negative dielectric anisotropy is used. Examples of a liquid crystal composition having negative dielectric anisotropy are disclosed in Patent literature Nos. 1 to 6 described below. Moreover, examples without using an alignment film are disclosed in Patent literature No. 7. The invention relates to a manufacturing method according to which a liquid crystal composition is irradiated with ultraviolet light while applying voltage between substrates of a device.

CITATION LIST

Patent Literature

Patent literature No. 1: WO 2014/090362 A.
Patent literature No. 2: WO 2014/094959 A.
Patent literature No. 3: WO 2013/004372 A.
Patent literature No. 4: WO 2012/104008 A.
Patent literature No. 5: WO 2012/038026 A.
Patent literature No. 6: JP S50-35076 A.
Patent literature No. 7: JP 2015-168826 A.

SUMMARY OF INVENTION

Technical Problem

In a conventional technology, when an attempt is made on manufacturing a liquid crystal display device by using a liquid crystal composition containing a polar compound having a polymerizable group, an effort has been concentrated on performing polymerization, and attention has not been focused on a wavelength distribution and an energy amount of ultraviolet light to be irradiated. The present inventors have continued to study the wavelength distribution and the energy amount of ultraviolet light to be irradiated and performance of the liquid crystal display device obtained, and as a result, the present inventors have found that, when the liquid crystal display device is manufactured under excessive irradiation conditions, component compounds composing the liquid crystal composition are damaged. The present inventors have obtained a finding of capability of contributing to improvement of various performances of the liquid crystal display device by solving the problem of the damage of the component compounds, and thus have completed the invention. More specifically, an object of the invention is to provide a manufacturing method according to which a liquid crystal composition containing a polar compound having a polymerizable group is used, ultraviolet light without damaging the liquid crystal composition is used, and further a pretilt angle can be efficiently provided for a liquid crystal display device.

Solution to Problem

The solution is a method for manufacturing a liquid crystal display device, wherein, upon manufacturing the liquid crystal display device including a pair of substrates that have no alignment film and arranged to face each other, and including a liquid crystal composition containing a liquid crystal compound and the polymerizable compound as a liquid crystal layer formed between the substrates formed of an electrode group formed on either one or both of surfaces faced by each of the pair of substrates, in which at least one of the polymerizable compounds is a compound having a polar anchor group, the polymerizable compound is allowed to react under conditions of 10 or more in an accumulated light quantity ratio (313 nm/254 nm) at 254 nanometers and 313 nanometers to form an alignment control layer.

Advantageous Effects of Invention

An advantage of the invention is that a liquid crystal display device can be prepared efficiently without damaging a liquid crystal composition, and therefore a high-definition liquid crystal display device can be efficiently manufactured by long term reliability, a high response speed, improvement of contrast, and improvement of productivity in a manufacturing process.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with the composition for the purpose of adjusting characteristics such as a temperature range of the nematic phase, viscosity and dielectric anisotropy. The compound has a six-membered ring such as 1,4-cyclohexylene and 1,4-phenylene and has rod-like molecular structure. "Polymerizable compound" is a compound to be added for the purpose of forming a polymer in the composition.

In the invention, a first additive means a polymerizable compound having a polar anchor group. Specifically, the first additive is a compound represented by formula (1) or formula (AI-1). Moreover, a second additive means a polymerizable compound having no polar anchor group. Specifically, the second additive is a compound represented by formula (4).

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added to the liquid crystal composition when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance at room temperature and also at a temperature close to the maximum temperature in an initial stage, and the composition has the large specific resistance at room temperature and also at a temperature close to the maximum temperature even after the device has been used for a long period of time. An expression "having a large voltage holding ratio" means that the device has a large voltage holding ratio at room temperature and also at a temperature close to the maximum temperature in an initial stage, and the device has the large voltage holding ratio at room temperature and also at a temperature close to the maximum temperature even after the device has been used for a long period of time. In the composition or the device, the characteristics may be occasionally examined before and after an aging test (including an acceleration deterioration test). An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

An expression such as "at least one piece of —$CH_2$— may be replaced by —O—" is used herein. In the above case, —$CH_2$—$CH_2$—$CH_2$— may be converted into —O—$CH_2$—O— by replacement of non-adjacent —$CH_2$— by —O—. However, adjacent —$CH_2$— is not replaced by —O—. The reason is that —O—O—$CH_2$— (peroxide) is formed in the replacement. More specifically, the expression means both "one piece of —$CH_2$— may be replaced by —O—" and "at least two pieces of non-adjacent —$CH_2$— may be replaced by —O—." A same rule applies not only to replacement by —O— but also to replacement by a divalent group such as —CH=CH— or —COO—.

A symbol of terminal group $R^1$ is used in a plurality of compounds in chemical formulas of component compounds. In the compounds, two groups represented by two pieces of arbitrary $R^1$ may be identical or different. For example, in one case, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies also to a symbol of any other terminal group or the like. In formula (1), when a is 2, two of ring A exists. In the compound, two groups represented by two of ring A may be identical or different. A same rule applies also to two of arbitrary ring A when a is larger than 2. A same rule applies also to other symbols. A same rule applies also to a case such as two pieces of -$Sp^4$-$P^2$ in compound (4-27).

Symbols such as A, B, C and D surrounded by a hexagonal shape correspond to rings such as ring A, ring B, ring C and ring D, respectively, and represent rings such as a six-membered ring and a fused ring. An oblique line crossing the hexagonal shape represents that arbitrary hydrogen on the ring may be replaced by a group such as -$Sp^1$-$P^1$. A subscript such as 'j' represents the number of groups subjected to replacement. When a subscript 'j' is 0, no such replacement exists. When the subscript 'j' is 2 or more, a plurality of pieces of -$Sp^3$-$P^1$ exist on ring J. The plurality of groups represented by -$Sp^3$-$P^1$ may be identical or different.

Then, 2-fluoro-1,4-phenylene means two divalent groups described below. In a chemical formula, fluorine may be leftward (L) or rightward (R). A same rule applies also to an asymmetrical divalent group formed by eliminating two hydrogen from a ring, such as tetrahydropyran-2,5-diyl. A same rule applies also to a divalent bonding group such as carbonyloxy (—COO— or —OCO—).

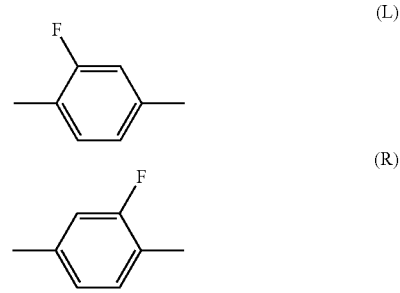

Alkyl of the liquid crystal compound is straight-chain alkyl or branched-chain alkyl, but includes no cyclic alkyl. Straight-chain alkyl is preferred to branched-chain alkyl. A same rule applies also to a terminal group such as alkoxy and alkenyl. With regard to a configuration of 1,4-cyclohexylene, trans is generally preferred to cis. Halogen means fluorine, chlorine, bromine and iodine. Preferred halogen is fluorine or chlorine. Further preferred halogen is fluorine.

The invention includes items described below.

Item 1. A method for manufacturing a liquid crystal display device, wherein, upon manufacturing the liquid crystal display device including a pair of substrates that have no alignment film and arranged to face each other, and including a liquid crystal composition containing a liquid crystal compound and the polymerizable compound as a liquid crystal layer formed between the substrates formed of an electrode group formed on either one or both of surfaces faced by each of the pair of substrates, in which at least one of the polymerizable compounds is a compound having a polar anchor group, wherein the polymerizable compound is allowed to react under conditions of 10 or more in an accumulated light quantity ratio (313 nm/254 nm) at 254 nanometers and 313 nanometers to form an alignment control layer.

Item 2. The method for manufacturing a liquid crystal display device according to item 1, wherein the polymerizable compound is allowed to react while applying voltage.

Item 3. The method for manufacturing the liquid crystal display device according to item 2, wherein the voltage is 20 V or less.

Item 4. The method for manufacturing the liquid crystal display device according to any one of items 1 to 3, containing at least one polar compound selected from the group of compounds represented by formula (1) and compounds represented by formula (AI-1) as the polymerizable compound:

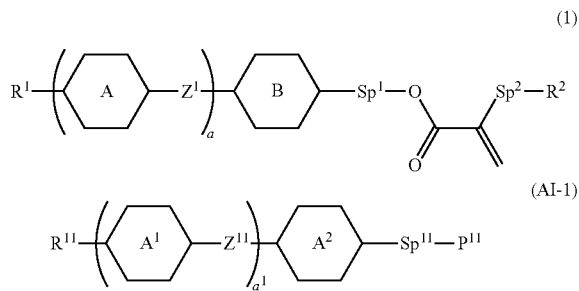

wherein, in formula (1), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $R^2$ is —OH, —OR$^0$, —NH$_2$, —NHR$^0$ or a group represented by —N(R$^0$)$_2$, in which R$^0$ is alkyl having 1 to 5 carbons, and in the alkyl, at least one piece of —CH$_2$— may be replaced by —O—, and at least one piece of —CH$_2$CH$_2$— may be replaced by —CH=CH—, and in the groups, at least one hydrogen may be replaced by fluorine; ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in the groups, at least one hydrogen may be replaced by fluorine; and a is 0, 1, 2, 3 or 4: and in formula (AI-1),
$R^{11}$ is alkyl having 1 to 15 carbons, and in $R^{11}$, at least one piece of —CH$_2$— may be replaced by —O— or —S—, at least one piece of —CH$_2$CH$_2$— may be replaced by —CH=CH— or —C≡C—, and at least one hydrogen may be replaced by halogen;

ring $A^1$ and ring $A^2$ are independently 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl or 2,3,4,7,8,9,10,11,12,13,14,15,16,17-tetradecahydrocyclopenta[a]phenanthrene-3,17-diyl, and in the rings, at least one hydrogen may be replaced by fluorine, chlorine, alkyl having 1 to 12 carbons, alkenyl having 2 to 12 carbons, alkoxy having 1 to 11 carbons or alkenyloxy having 2 to 11 carbons, and in the groups, at least one hydrogen may be replaced by fluorine or chlorine;

$a^1$ is 0, 1, 2, 3 or 4;

$Z^{11}$ is a single bond or alkylene having 1 to 6 carbons, and in $Z^{11}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by fluorine or chlorine; and $Sp^{11}$ is a single bond or alkylene having 1 to 10 carbons, and in $Sp^{11}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by halogen, and in the groups, at least one hydrogen is replaced by a group selected from the group of groups represented by formula (1a);

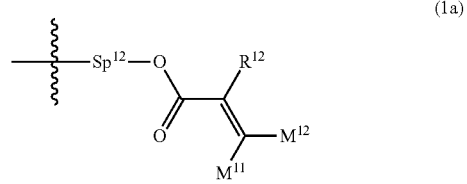

wherein, in formula (1a),
$Sp^{12}$ is a single bond or alkylene having 1 to 10 carbons, and in $Sp^{12}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by halogen;

$M^{11}$ and $M^{12}$ are independently hydrogen, halogen, alkyl having 1 to 5 carbons, or alkyl having 1 to 5 carbons in which at least one hydrogen is replaced by halogen:

$R^{12}$ is alkyl having 1 to 15 carbons, and in $R^{12}$, at least one piece of —CH$_2$— may be replaced by —O— or —S—, at least one piece of —CH$_2$CH$_2$— may be replaced by —CH=CH— or —C≡C—, and at least one hydrogen may be replaced by halogen: and in formula (AI-1),
$P^{11}$ is a group selected from the group of groups represented by formulas (1e) and (1f);

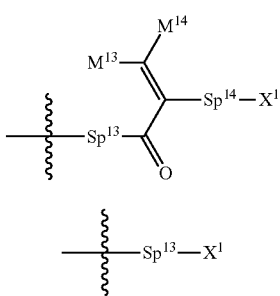

(1e)

(1f)

wherein, in formulas (1e) and (1f), $Sp^{13}$ is a single bond or alkylene having 1 to 10 carbons, and in $Sp^{13}$, at least one piece of —$CH_2$— may be replaced by —O—, —NH—, —CO—, —COO—, —OCO— or —OCOO—, and at least one piece of —$CH_2CH_2$— may be replaced by —CH=CH— or —C≡C—, and in the groups, at least one hydrogen may be replaced by halogen;

$Sp^{14}$ is independently a single bond or alkylene having 1 to 10 carbons, and in $Sp^{14}$, at least one piece of —$CH_2$— may be replaced by —O—, —NH—, —CO—, —COO—, —OCO— or —OCOO—, at least one piece of —$CH_2CH_2$— may be replaced by —CH=CH— or —C≡C—, and at least one hydrogen may be replaced by halogen;

$M^{13}$ and $M^{14}$ are independently hydrogen, halogen, alkyl having 1 to 5 carbons, or alkyl having 1 to 5 carbons in which at least one hydrogen is replaced by halogen:

$X^1$ is —OH, —$NH_2$, —$OR^{15}$, —$N(R^{15})_2$, —COOH, —SH, —$B(OH)_2$ or —$Si(R^{15})_3$; and in —$OR^{15}$, —$N(R^{15})_2$ and —$Si(R^{15})_3$, $R^{15}$ is hydrogen or alkyl having 1 to 10 carbons, and in $R^{15}$, at least one piece of —$CH_2$— may be replaced by —O—, at least one piece of —$CH_2CH_2$— may be replaced by —CH=CH—, and at least one hydrogen may be replaced by halogen.

Item 5. The method for manufacturing the liquid crystal display device according to any one of items 1 to 4, wherein at least one of the polymerizable compounds is a compound selected from the group of compounds represented by formulas (1-1) to (1-9) and compounds represented by formulas (AI-2) to (AI-21):

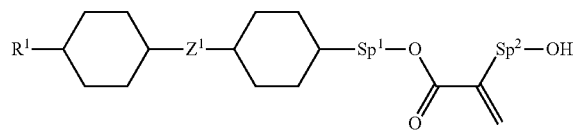

(1-1)

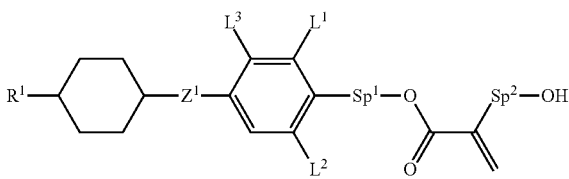

(1-2)

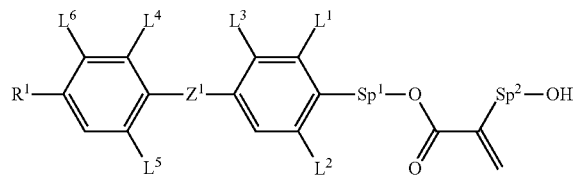

(1-3)

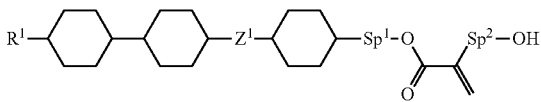

(1-4)

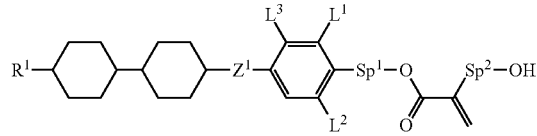

(1-5)

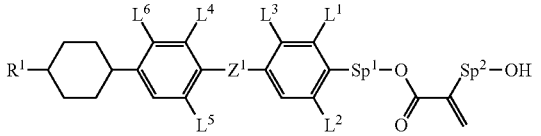

(1-6)

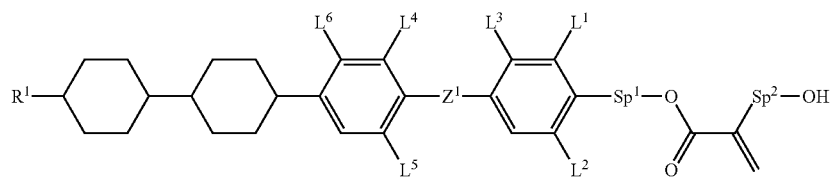

(1-7)

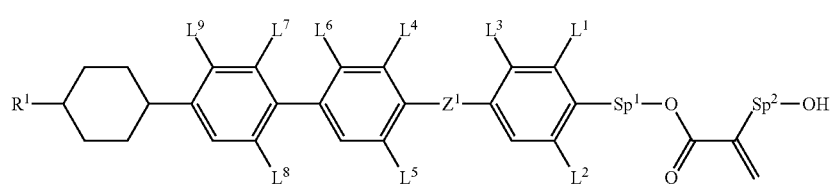

(1-8)

-continued
(1-9)
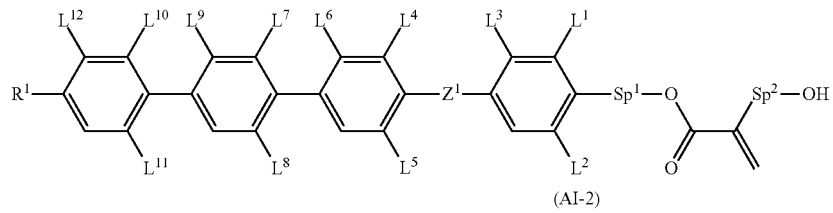
(AI-2)
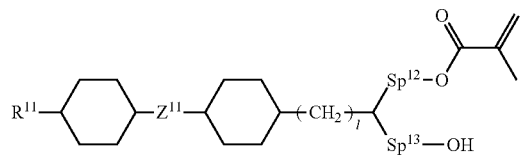
(AI-3)
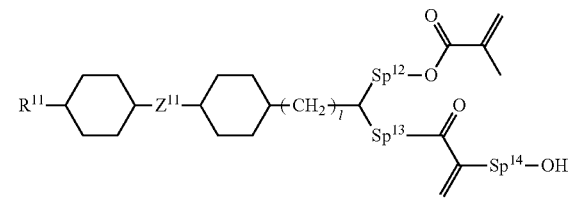
(AI-4)
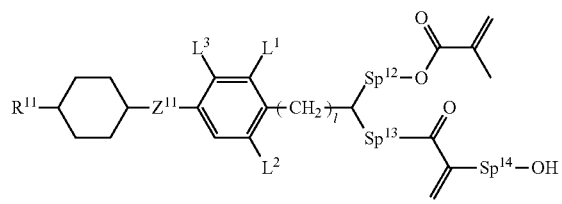
(AI-5)
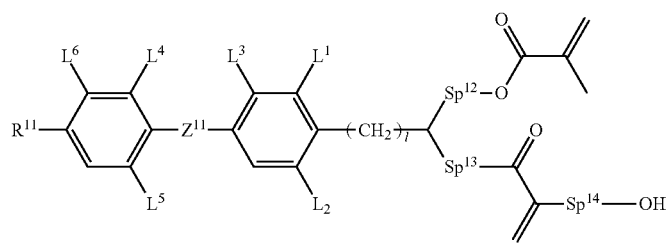
(AI-6)
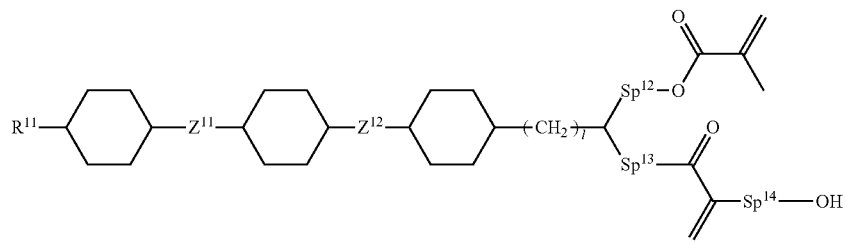
(AI-7)
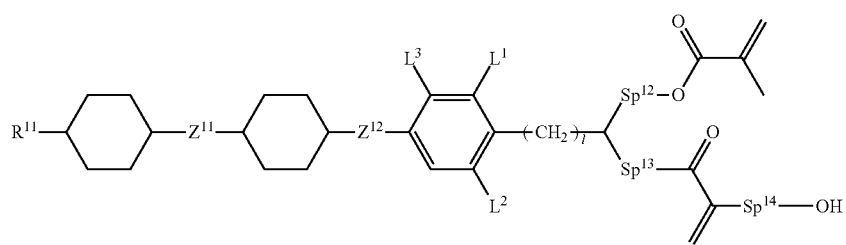
(AI-8)
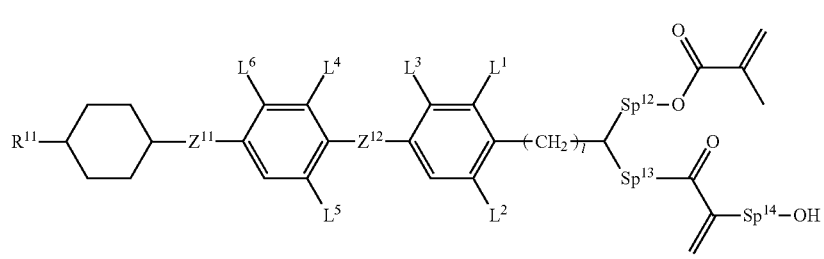
(AI-9)

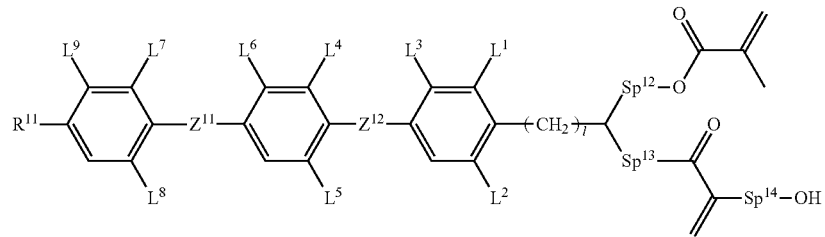
(AI-10)
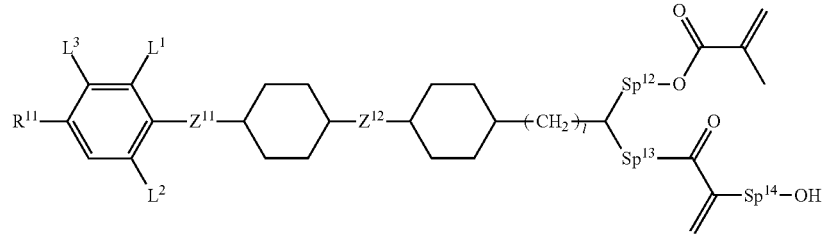
(AI-11)
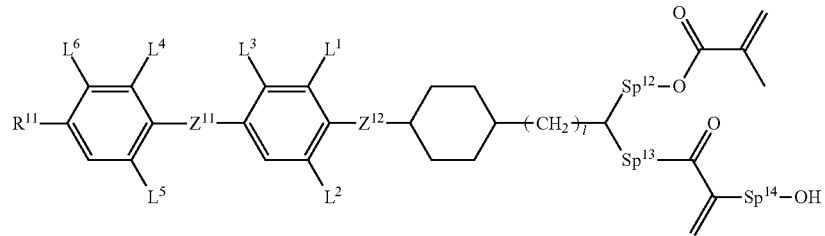
(AI-12)
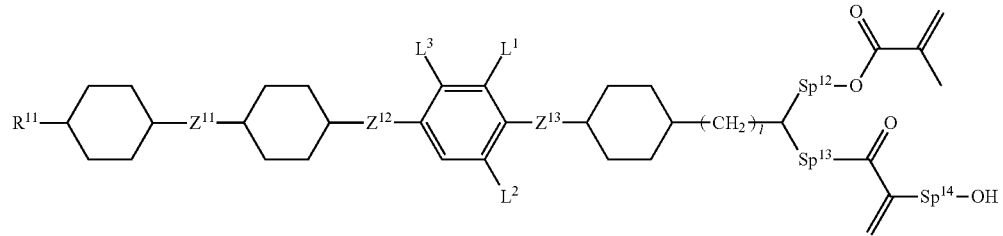
(AI-13)
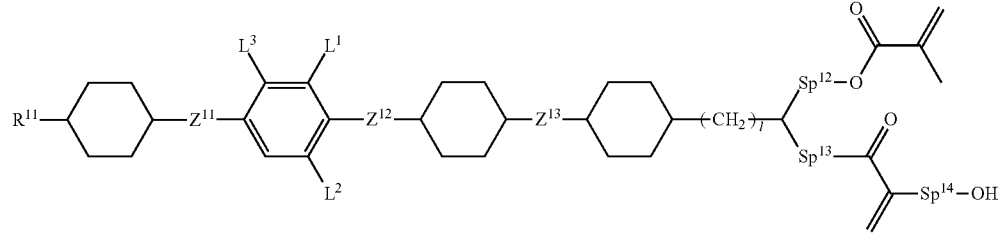
(AI-14)
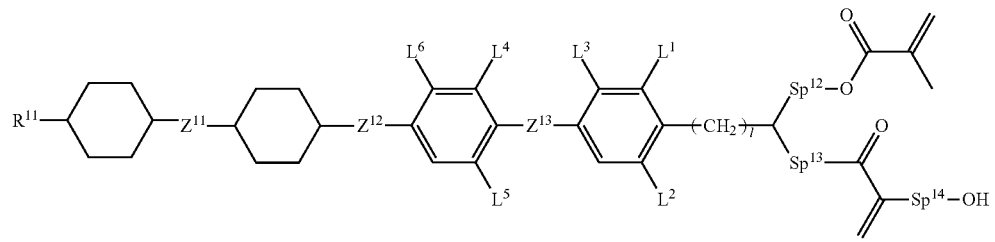
(AI-15)

-continued

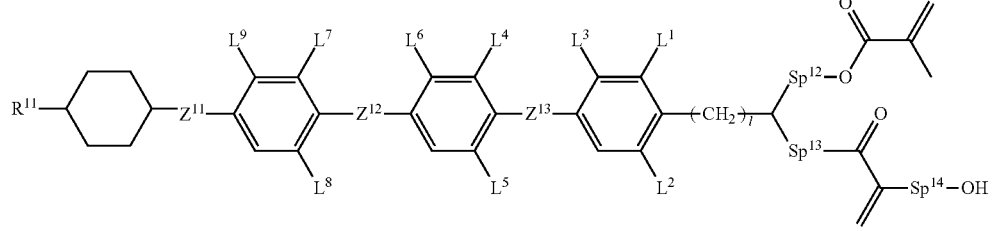
(AI-16)

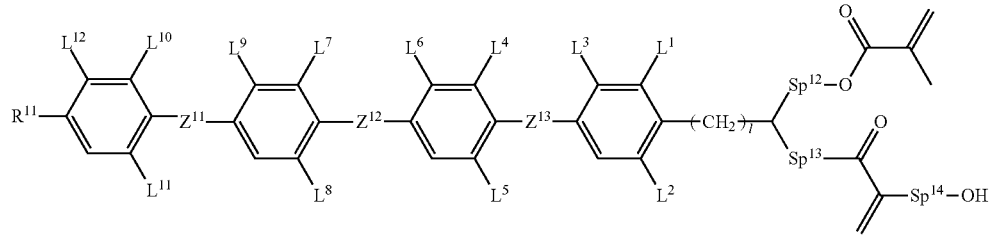
(AI-17)

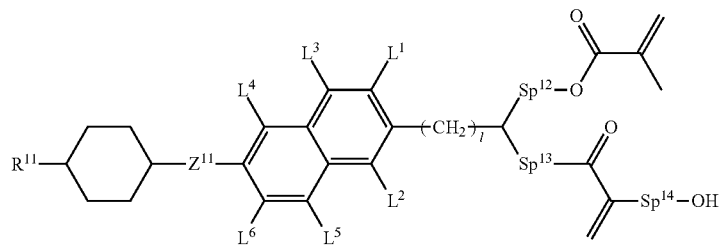
(AI-18)

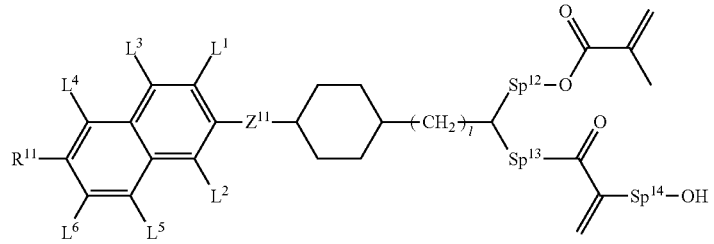
(AI-19)

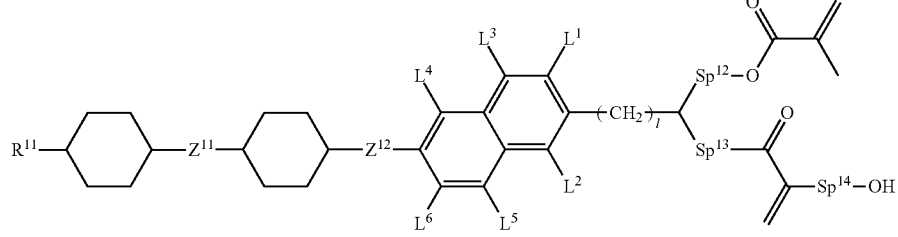
(AI-20)

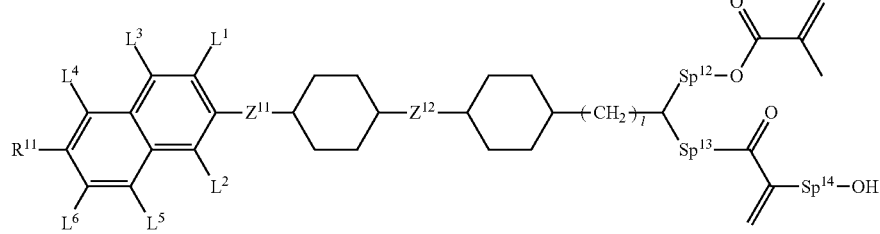
(AI-21)

wherein, in formulas (1-1) to (1-9), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; Sp$^1$ and Sp$^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in the groups, at least one hydrogen may be replaced by fluorine; and L$^1$, L$^2$, L$^3$, L$^4$, L$^5$, L$^6$, L$^7$, L$^8$, L$^9$, L$^{10}$, L$^{11}$ and L$^{12}$ are independently hydrogen, fluorine, methyl or ethyl: and in formulas (AI-2) to (AI-21), R$^{11}$ is alkyl having 1 to 10 carbons;

Z$^{11}$, Z$^{12}$ and Z$^{13}$ are independently a single bond, —CH$_2$CH$_2$— or —(CH$_2$)$_4$—;

Sp$^{12}$, Sp$^{13}$ and Sp$^{14}$ are independently a single bond or alkylene having 1 to 5 carbons, and in the alkylene, at least one piece of —CH$_2$— may be replaced by —O—;

L$^1$, L$^2$, L$^3$, L$^4$, L$^5$, L$^6$, L$^8$, L$^8$, L$^9$, L$^{10}$, L$^{11}$ and L$^{12}$ are independently hydrogen, fluorine, methyl or ethyl; and l is 1, 2, 3, 4, 5 or 6.

Item 6. The method for manufacturing the liquid crystal display device according to any one of items 1 to 5, wherein, in the liquid crystal composition, a proportion of the polymerizable compound is in the range of 0.05% by weight to 10% by weight based on the weight of the liquid crystal composition.

Item 7. The method for manufacturing the liquid crystal display device according to any one of items 1 to 6, wherein the liquid crystal composition contains at least one compound selected from the group of compounds represented by formula (2) as a first component:

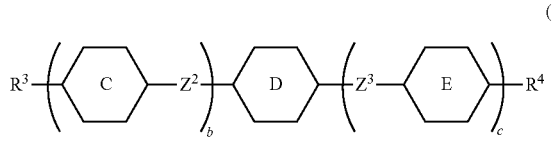

(2)

wherein, in formula (2), R$^3$ and R$^4$ are independently alkyl having 1 to 12 carbons, alkoxy having 1 to 12 carbons, alkenyl having 2 to 12 carbons or alkenyloxy having 2 to 12 carbons; ring C and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Z$^2$ and Z$^3$ are independently a single bond, —CH$_2$CH$_2$—, —CH$_2$O—, —OCH$_2$—, —COO— or —OCO—; and b is 1, 2 or 3, c is 0 or 1, and a sum of b and c is 3 or less.

Item 8. The method for manufacturing the liquid crystal display device according to any one of items 1 to 7, wherein the liquid crystal composition contains at least one compound selected from the group of compounds represented by formulas (2-1) to (2-22) as the first component:

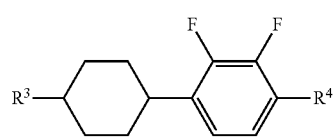

(2-1)

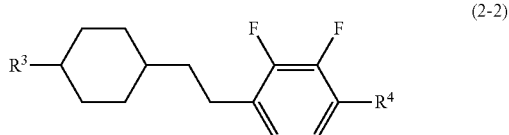

(2-2)

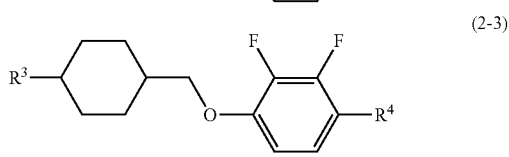

(2-3)

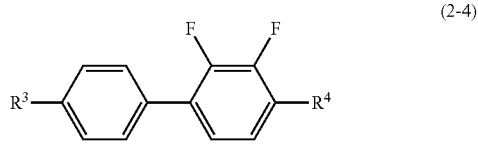

(2-4)

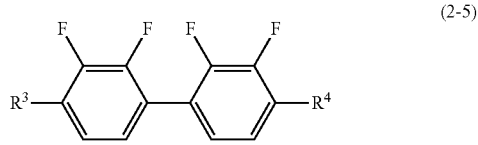

(2-5)

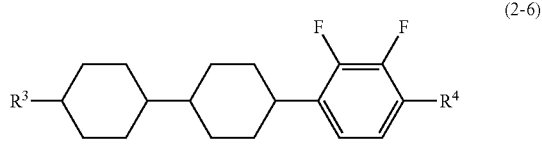

(2-6)

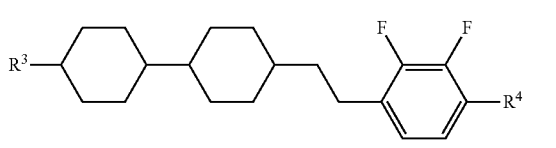

(2-7)

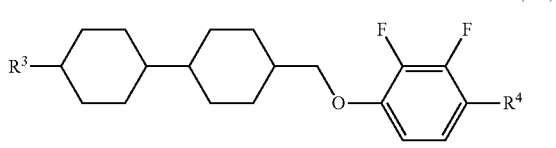

(2-8)

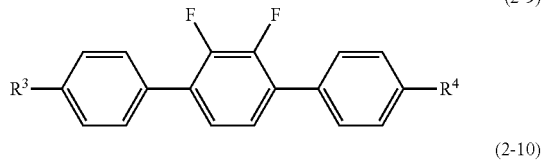

(2-9)

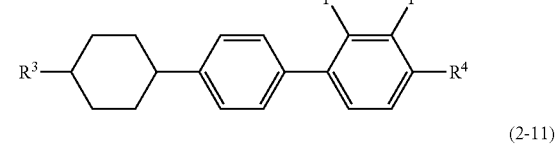

(2-10)

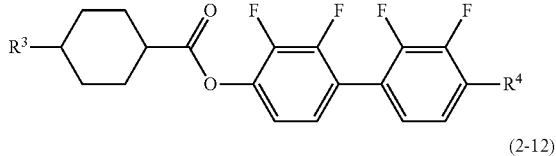

(2-11)

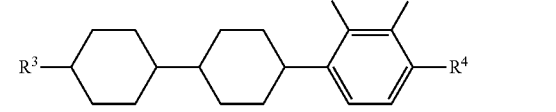

(2-12)

-continued

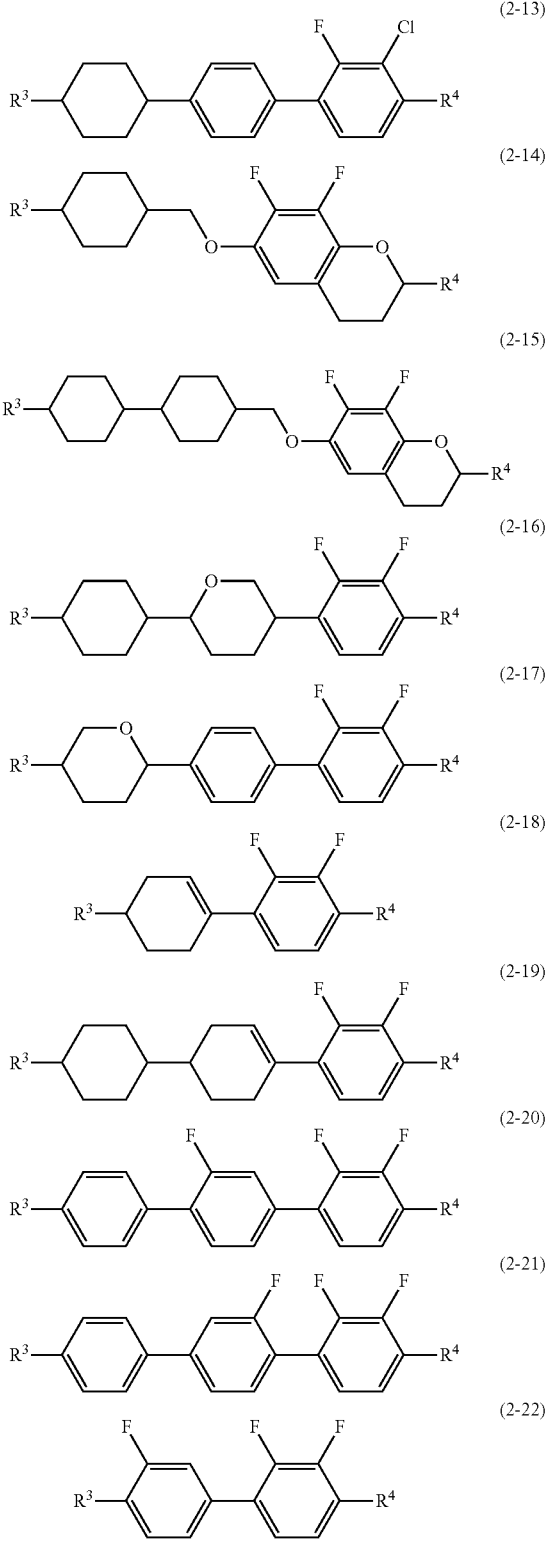

wherein, in formulas (2-1) to (2-22), $R^3$ and $R^4$ are independently alkyl having 1 to 12 carbons, alkoxy having 1 to 12 carbons, alkenyl having 2 to 12 carbons or alkenyloxy having 2 to 12 carbons.

Item 9. The method for manufacturing the liquid crystal display device according to item 7 or 8, wherein, in the liquid crystal composition, a proportion of the first component is in the range of 10% by weight to 90% by weight based on the weight of the liquid crystal composition.

Item 10. The method for manufacturing the liquid crystal display device according to any one of items 1 to 9, wherein the liquid crystal composition contains at least one compound selected from the group of compounds represented by formula (3) as a second component:

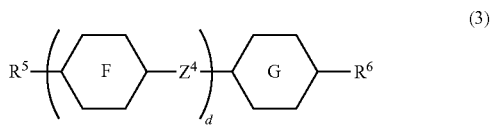

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine;

ring F and ring G are independently 1,4-cyclohexylene, 1,4-phenylene, 2-fluoro-1,4-phenylene or 2,5-difluoro-1,4-phenylene; $Z^4$ is a single bond, —CH$_2$CH$_2$—, —CH$_2$O—, —OCH$_2$—, —COO— or —OCO—; and d is 1, 2 or 3.

Item 11. The method for manufacturing the liquid crystal display device according to any one of items 1 to 10, wherein the liquid crystal composition contains at least one compound selected from the group of compounds represented by formulas (3-1) to (3-13) as the second component:

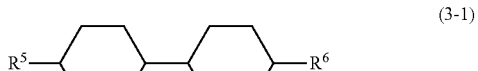

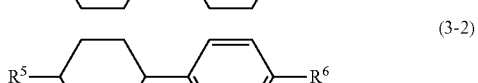

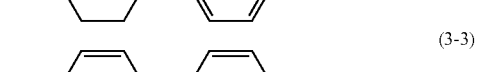

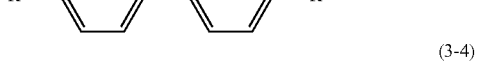

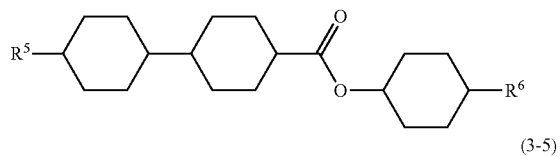

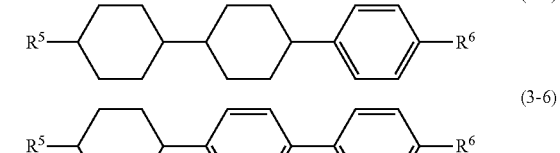

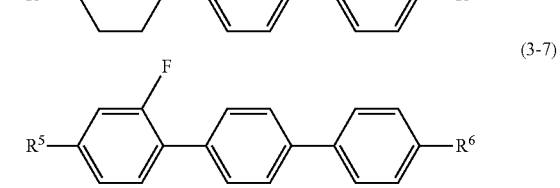

(3-8)
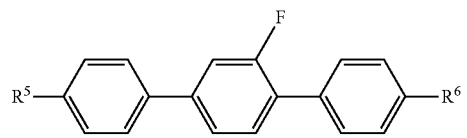

(3-9)
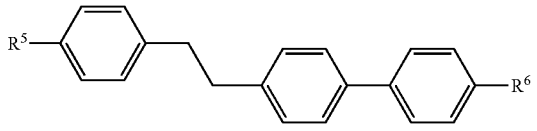

(3-10)
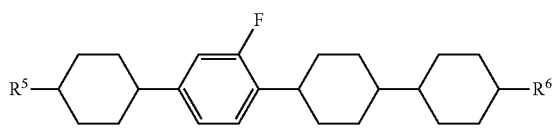

(3-11)
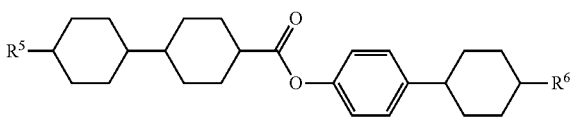

(3-12)
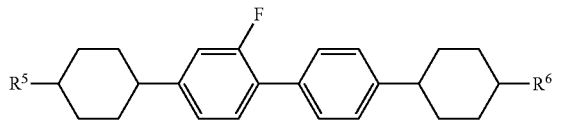

(3-13)
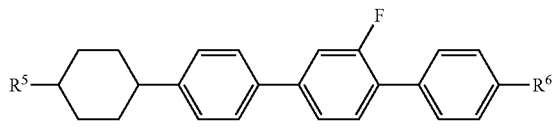

wherein, in formulas (3-1) to (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

Item 12. The method for manufacturing the liquid crystal display device according to item 10 or 11, wherein, in the liquid crystal composition, a proportion of the second component is in the range of 10% by weight to 70% by weight based on the weight of the liquid crystal composition.

Item 13. The method for manufacturing the liquid crystal display device according to any one of items 1 to 12, further containing a polymerizable compound having no polar anchor group.

Item 14. The method for manufacturing the liquid crystal display device according to any one of items 1 to 13, wherein at least one of the polymerizable compounds having no polar anchor group is a polymerizable compound selected from the group of compounds represented by formula (4):

(4)
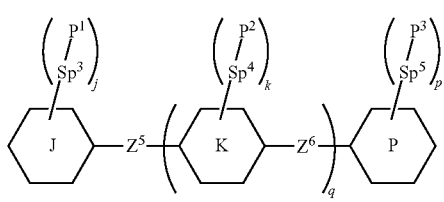

wherein, in formula (4), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^5$ and $Z^6$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are a polymerizable group; $Sp^3$, $Sp^4$ and $Sp^5$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in the groups, at least one hydrogen may be replaced by fluorine or chlorine; q is 0, 1 or 2; and j, k and p are independently 0, 1, 2, 3 or 4, and a sum of j, k and p is 1 or more.

Item 15. The method for manufacturing the liquid crystal display device according to item 14, wherein, in formula (4), $P^1$, $P^2$ and $P^3$ are independently a polymerizable group selected from the group of groups represented by formulas (P-1) to (P-5):

(P-1)
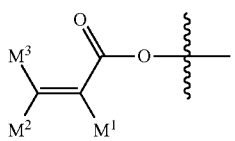

(P-2)
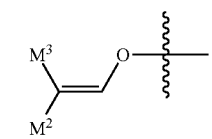

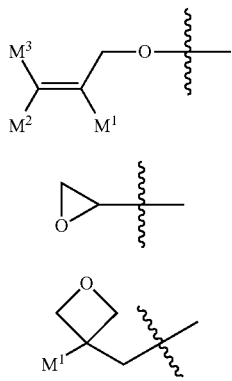
(P-3)

(P-4)

(P-5)

wherein, in formulas (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 16. The method for manufacturing the liquid crystal display device according to item 14 or 15, wherein at least one of the polymerizable compounds having no polar anchor group is a polymerizable compound selected from the group of compounds represented by formulas (4-1) to (4-28):

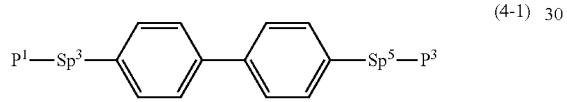
(4-1)

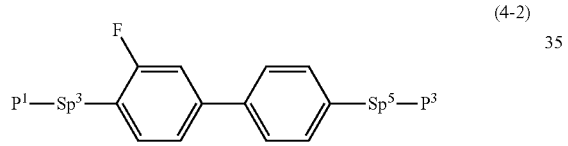
(4-2)

(4-3)

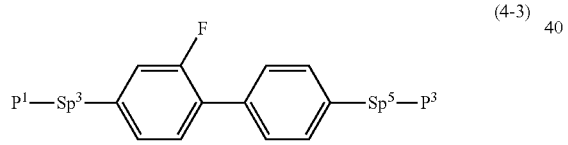
(4-4)

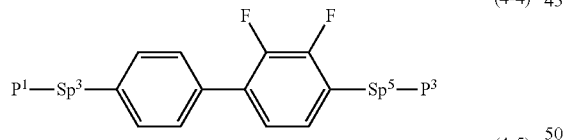
(4-5)

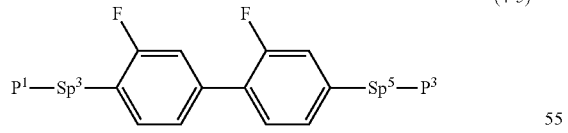
(4-6)

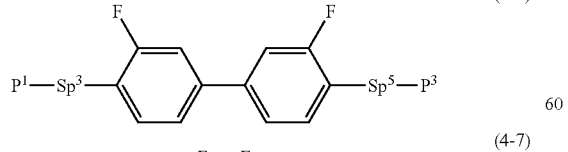
(4-7)

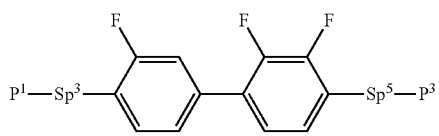
(4-8)

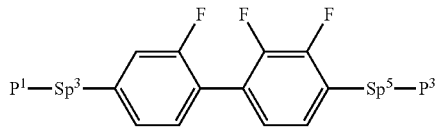
(4-9)

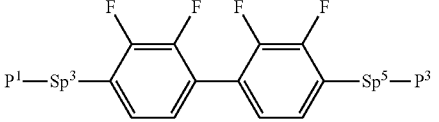
(4-10)

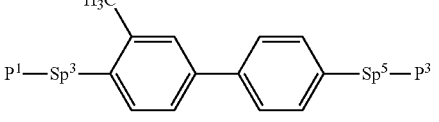
(4-11)

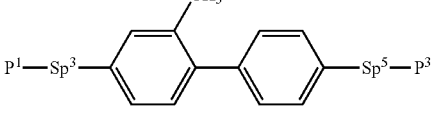
(4-12)

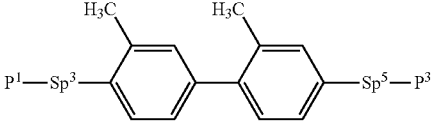
(4-13)

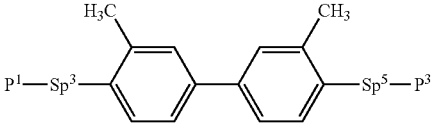
(4-14)

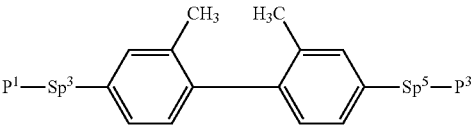
(4-15)

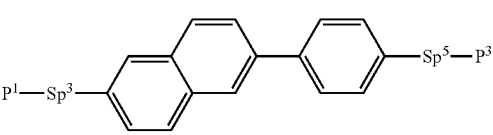
(4-16)

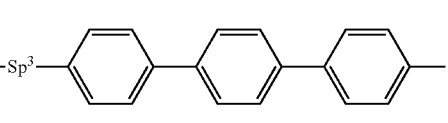
(4-17)

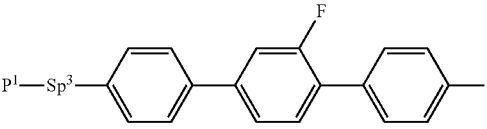
(4-18)

-continued (4-19)
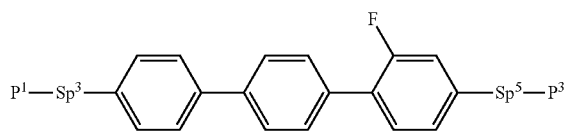

(4-20)
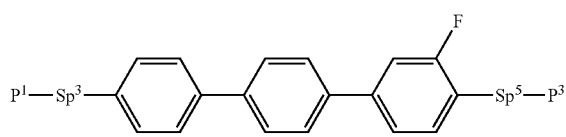

(4-21)
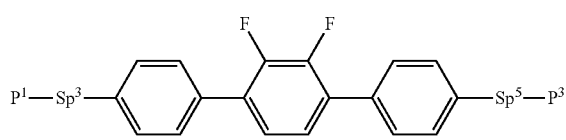

(4-22)
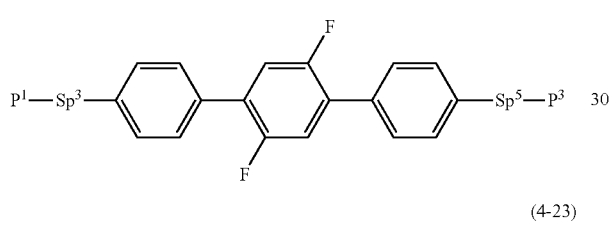

(4-23)
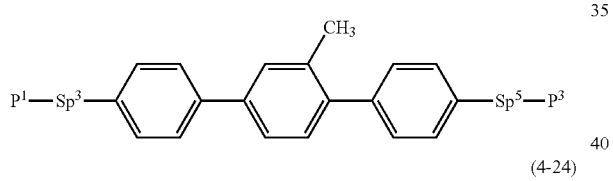

(4-24)
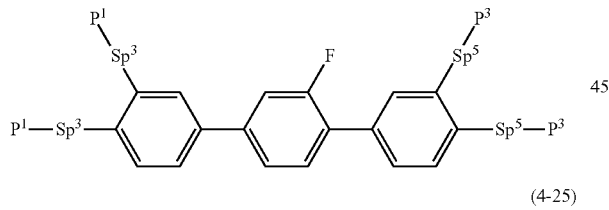

(4-25)
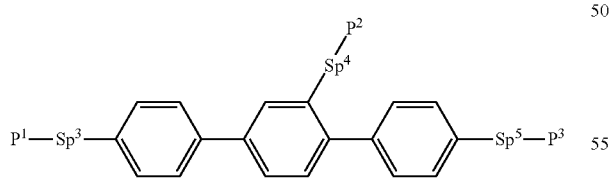

(4-26)

-continued (4-27)
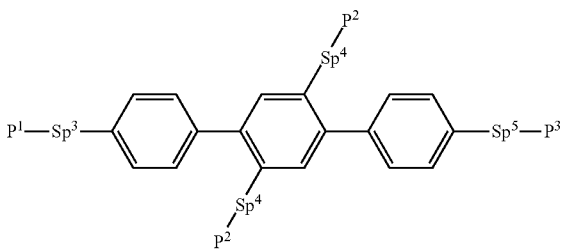

(4-28)
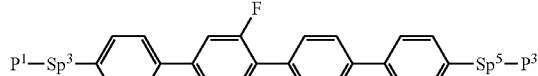

wherein, in formulas (4-1) to (4-28), $P^1$, $P^2$ and $P^3$ are independently a polymerizable group selected from the group of groups represented by formulas (P-1) to (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

(P-1)
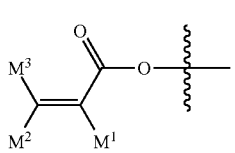

(P-2)
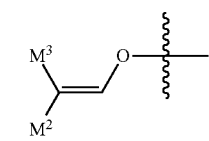

(P-3)
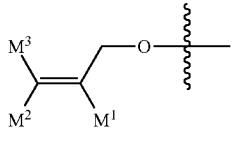

wherein $Sp^3$, $Sp^4$ and $Sp^5$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine.

Item 17. The method for manufacturing the liquid crystal display device according to any one of items 14 to 16, wherein, in the liquid crystal composition, a proportion of the polymerizable compound having no polar anchor group is in the range of 0.03% by weight to 10% by weight based on the weight of the liquid crystal composition.

Item 18. A liquid crystal display device, manufactured by the manufacturing method according to any one of items 1 to 17.

Item 19. The liquid crystal display device according to item 18, wherein an operating mode in the liquid crystal display device includes an IPS mode, a VA mode, an FFS mode or an FPA mode, and a driving mode in the liquid crystal display device includes an active matrix mode.

A composition that can be used for manufacturing the liquid crystal display device of the invention also includes the following items: (c) the composition, wherein compound (5) to compound (7) described in JP 2006-199941 A include a liquid crystal compound having positive dielectric anisotropy, and at least one compound selected from the group of the compounds described above is contained; (d) the composition, containing at least two of the polar compounds described above; (e) the composition, further containing a polar compound different from the polar compounds described above; and (f) the composition, containing one, two or at least three of additives such as the optically active compound, the antioxidant, the ultraviolet light absorber, the dye, the antifoaming agent, the polymerizable compound, the polymerization initiator, the polymerization inhibitor and the polar compound. The additives may be identical to or different from the first additive or the second additive.

The composition that can be used for manufacturing the liquid crystal display device of the invention will be described in the following order. First, a constitution of the composition will be described. Second, main characteristics of the component compounds and a main effect of the compound on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, a method for synthesizing the component compound will be described. Eighth, features of the composition will be described. Ninth, a method for manufacturing the liquid crystal display device will be described.

First, the constitution of the composition will be described. The composition of the invention is classified into composition A and composition B. Composition A may further contain any other liquid crystal compound, an additive or the like in addition to a liquid crystal compound selected from compound (2) and compound (3). An expression "any other liquid crystal compound" means a liquid crystal compound different from compound (2) and compound (3). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator, the polymerization inhibitor and the polar compound.

Composition B consists essentially of liquid crystal compounds selected from compound (2) and compound (3). An expression "essentially" means that composition B may contain the additive, but contains no any other liquid crystal compound. Composition B has the smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effect of the compound on the characteristics of the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and symbol 0 (zero) means that a value is zero or close to zero.

TABLE 2

| Characteristics of Compounds | | |
|---|---|---|
| Characteristics | Compound (2) | Compound (3) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effect of the component compound on the characteristics of the composition are as described below. Compound (1) and compound (AI-1) are adsorbed to a substrate surface by action of the polar group, and control alignment of liquid crystal molecules. In order to obtain an expected effect, compound (1) essentially needs to have high compatibility with the liquid crystal compound. Compound (1) and compound (AI-1) have a six-membered ring such as 1,4-cyclohexylene and 1,4-phenylene, and have rod-like molecular structure, and therefore are most suitable for the purpose. Compound (1) and compound (AI-1) give a polymer by polymerization. The polymer stabilizes the alignment of the liquid crystal molecules, and therefore a response time of the device is shortened and image persistence is improved. Compound (2) increases the dielectric anisotropy and decreases the minimum temperature. Compound (3) decreases the viscosity, increases the maximum temperature or decreases the minimum temperature. Compound (4) is added to the composition for the purpose of further adapting the composition to the polymer sustained alignment mode device. Compound (4) gives a polymer by polymerization. The polymer stabilizes the alignment of the liquid crystal molecules, and therefore the response time of the device is shortened and the image persistence is improved. From a viewpoint of the alignment of the liquid crystal molecules, the polymer of compound (1) and compound (AI-1) interacts with the substrate surface, and therefore can be presumed to be more effective than the polymer of compound (4).

Third, the combination of components in the composition, the preferred proportion of the components and the basis thereof will be described. A preferred combination of the components in the composition includes a combination of compound (1), compound (AI-1), compound (2) and compound (3), or a combination of compound (1), compound (AI-1), compound (2), compound (3) and compound (4).

Compound (1) and compound (AI-1) are added to the composition for the purpose of controlling the alignment of the liquid crystal molecules. A preferred proportion of compound (1) and compound (AI-1) is about 0.05% by weight or more for aligning the liquid crystal molecules, and about 10% by weight or less for preventing poor display of the device. A further preferred proportion is in the range of about 0.1% by weight to about 7% by weight. A particularly preferred proportion is in the range of about 0.5% by weight to about 5% by weight.

A preferred proportion of compound (2) is about 10% by weight or more for increasing the dielectric anisotropy, and about 90% by weight or less for decreasing the minimum temperature. A further preferred proportion is in the range of about 20% by weight to about 85% by weight. A particularly preferred proportion is in the range of about 30% by weight to about 85% by weight.

A preferred proportion of compound (3) is about 10% by weight or more for increasing the maximum temperature or decreasing the minimum temperature, and about 70% by weight or less for increasing the dielectric anisotropy. A further preferred proportion is in the range of about 15% by weight to about 65% by weight. A particularly preferred proportion is in the range of about 20% by weight to about 60% by weight.

A preferred proportion of compound (4) is about 0.03% by weight or more for increasing long term reliability of the device, and about 10% by weight or less for preventing poor display of the device. A further preferred proportion is in the range of about 0.1% by weight to about 2% by weight. A particularly preferred proportion is in the range of about 0.2% by weight to about 1.0% by weight.

Fourth, the preferred embodiment of the component compounds will be described. In formula (1), $R^2$ is a polar group. In formula (AI-1), $X^1$ is a polar group. Compound (1) and compound (AI-1) are added to the composition, and therefore are preferably stable. When compound (1) and compound (AI-1) are added to the composition, the compounds preferably do not decrease the voltage holding ratio of the device. Compound (1) and compound (AI-1) preferably have low volatility. Preferred molar mass is 130 g/mol or more. Further preferred molar mass is in the range from 150 g/mol to 1,000 g/mol.

$R^2$ is —OH, —$OR^O$, —$NH_2$, —$NHR^O$ or a group represented by —$N(R^O)_2$, in which $R^O$ is alkyl having 1 to 5 carbons, and in the alkyl, at least one piece of —$CH_2$— may be replaced by —O—, and at least one piece of —$CH_2CH_2$— may be replaced by —CH=CH—, and in the groups, at least one hydrogen may be replaced by fluorine. From a viewpoint of high solubility in the liquid crystal composition, $R^2$ is particularly preferably —OH or —$NH_2$. Then, —OH has high anchor force, and therefore is preferred to —O—, —CO— or —COO—. A group containing a plurality of hetero atoms (nitrogen, oxygen) is particularly preferred. A compound having such a polar group is effective even at a low concentration.

$X^1$ is a group represented by —OH, —$NH_2$, —$OR^{15}$, —$N(R^{15})_2$, —COOH, —SH, —$B(OH)_2$ or —$Si(R^{15})_3$, in which $R^{15}$ is hydrogen or alkyl having 1 to 10 carbons, and in the alkyl, at least one piece of —$CH_2$— may be replaced by —O—, and at least one piece of —$CH_2CH_2$— may be replaced by —CH=CH—, and in the groups, at least one hydrogen may be replaced by fluorine. From a viewpoint of high solubility in the liquid crystal composition, $X^1$ is particularly preferably —OH or —$NH_2$. Then, —OH has high anchor force, and therefore is preferred to —O—, —CO— or —COO—. A group containing a plurality of hetero atoms (nitrogen, oxygen) is particularly preferred. A compound having such a polar group is effective even at a low concentration.

$R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^1$ is alkyl having 1 to 12 carbons. $R^{11}$ is alkyl having 1 to 15 carbons, and in $R^{11}$, at least one piece of —$CH_2$— may be replaced by —O— or —S—, at least one piece of —$CH_2CH_2$— may be replaced by —CH=CH— or —C≡C—, and at least one hydrogen may be replaced by halogen; and preferred $R^{11}$ is alkyl having 1 to 15 carbons.

Ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring A or ring B is 1,4-cyclohexylene, 1,4-phenylene or 2-fluoro-1,4-phenylene. Then, a is 0, 1, 2, 3 or 4. Preferred a is 0, 1 or 2.

Ring $A^1$ and ring $A^2$ are independently 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl or 2,3,4,7,8,9,10,11,12,13,14,15,16,17-tetradecahydrocyclopenta[a]phenanthrene-3,17-diyl, and in the rings, at least one hydrogen may be replaced by fluorine, chlorine, alkyl having 1 to 12 carbons, alkenyl having 2 to 12 carbons, alkoxy having 1 to 11 carbons or alkenyloxy having 2 to 11 carbons, and in the groups, at least one hydrogen may be replaced by fluorine or chlorine; and $a^1$ is 0, 1, 2, 3 or 4.

$Z^1$ is a single bond, —$CH_2CH_2$—, —CH=CH—, —C≡C—, —COO—, —OCO—, —$CF_2O$—, —$OCF_2$—, —$CH_2O$—, —$OCH_2$— or —CF=CF—. Preferred $Z^1$ is a single bond, —$CH_2CH_2$—, —$CH_2O$—, —$OCH_2$—, —COO— or —OCO—. Further preferred $Z^1$ is a single bond. $Z^{11}$ is a single bond or alkylene having 1 to 6 carbons, and in $Z^1$, at least one piece of —$CH_2$— may be replaced by —O—, —CO—, —COO—, —OCO— or —OCOO—, at least one piece of —$CH_2CH_2$— may be replaced by —CH=CH— or —C≡C—, and at least one hydrogen may be replaced by fluorine or chlorine. Further preferred $Z^{11}$ is a single bond.

$Sp^1$ and $Sp^2$ are independently a single bond or alkylene having 1 to 7 carbons, and in the alkylene, at least one piece of —$CH_2$— may be replaced by —O—, —COO— or —OCO—, and at least one piece of —$CH_2CH_2$— may be replaced by —CH=CH—, and in the groups, at least one hydrogen may be replaced by fluorine. Preferred $Sp^1$ or $Sp^2$ is a single bond.

$Sp^1$ is a single bond or alkylene having 1 to 10 carbons, and in $Sp^{11}$, at least one piece of —$CH_2$— may be replaced by —O—, —CO—, —COO—, —OCO— or —OCOO—, at least one piece of —$CH_2CH_2$— may be replaced by —CH=CH— or —C≡C—, and at least one hydrogen may be replaced by halogen, and in the groups, at least one hydrogen is replaced by a group selected from the group of groups represented by formula (1a);

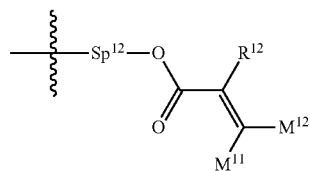

(1a)

wherein, in formula (1a), $Sp^{12}$ is a single bond or alkylene having 1 to 10 carbons, and in $Sp^{12}$, at least one piece of —$CH_2$— may be replaced by —O—, —CO—, —COO—, —OCO— or —OCOO—, at least one piece of —$CH_2CH_2$— may be replaced by —CH=CH— or —C≡C—, and at least one hydrogen may be replaced by halogen;

$M^{11}$ and $M^{12}$ are independently hydrogen, halogen, alkyl having 1 to 5 carbons, or alkyl having 1 to 5 carbons in which at least one hydrogen is replaced by halogen; and $R^{12}$ is alkyl having 1 to 15 carbons, and in $R^{12}$, at least one piece of —$CH_2$— may be replaced by —O— or —S—, at least one piece of —$CH_2CH_2$— may be replaced by —CH=CH— or —C≡C—, and at least one hydrogen may be replaced by halogen. Preferred $Sp^1$ is a single bond.

$P^{11}$ is a group selected from the group of groups represented by formulas (1e) and (1f);

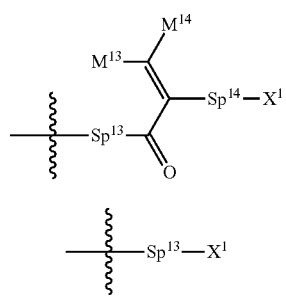

(1e)

(1f)

wherein, in formulas (1e) and (1f), $Sp^{13}$ is a single bond or alkylene having 1 to 10 carbons, and in $Sp^{13}$, at least one piece of —$CH_2$— may be replaced by —O—, —NH—, —CO—, —COO—, —OCO— or —OCOO—, and at least one piece of —$CH_2CH_2$— may be replaced by —CH=CH— or —C≡C—, and in the groups, at least one hydrogen may be replaced by halogen;

$Sp^{14}$ is independently a single bond or alkylene having 1 to 10 carbons, and in $Sp^{14}$, at least one piece of —$CH_2$— may be replaced by —O—, —NH—, —CO—, —COO—, —OCO— or —OCOO—, at least one piece of —$CH_2CH_2$— may be replaced by —CH=CH— or —C≡C—, and at least one hydrogen may be replaced by halogen;

$M^{13}$ and $M^{14}$ are independently hydrogen, halogen, alkyl having 1 to 5 carbons, or alkyl having 1 to 5 carbons in which at least one hydrogen is replaced by halogen:

$X^1$ is —OH, —$NH_2$, —$OR^{15}$, —$N(R^{15})_2$, —COOH, —SH, —$B(OH)_2$ or —$Si(R^{15})_3$; and in —$OR^{15}$, —$N(R^{15})_2$ and —$Si(R^{15})_3$, $R^{15}$ is hydrogen or alkyl having 1 to 10 carbons, and in $R^{15}$, at least one piece of —$CH_2$— may be replaced by —O—, at least one piece of —$CH_2CH_2$— may be replaced by —CH=CH—, and at least one hydrogen may be replaced by halogen.

In formulas (1-1) to (1-9), $L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl. Preferred $L^1$ to $L^{12}$ are hydrogen, fluorine or methyl. Further preferred L to $L^{12}$ are hydrogen or fluorine.

In formulas (2) and (3), $R^3$ and $R^4$ are independently alkyl having 1 to 12 carbons, alkoxy having 1 to 12 carbons, alkenyl having 2 to 12 carbons or alkenyloxy having 2 to 12 carbons. Preferred $R^3$ or $R^4$ is alkyl having 1 to 12 carbons for increasing stability to ultraviolet light or heat, and alkoxy having 1 to 12 carbons for increasing the dielectric anisotropy. $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^5$ or $R^6$ is alkenyl having 2 to 12 carbons for decreasing the viscosity, and alkyl having 1 to 12 carbons for increasing the stability to ultraviolet light or heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Specific examples of preferred alkyl in which at least one hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Specific examples of preferred alkenyl in which at least one hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring C and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl. Specific examples of preferred "1,4-phenylene in which at least one hydrogen is replaced by fluorine or chlorine" include 2-fluoro-1,4-phenylene, 2,3-difluoro-1,4-phenylene or 2-chloro-3-fluoro-1,4-phenylene. Preferred ring C or ring E is 1,4-cyclohexylene for decreasing the viscosity, tetrahydropyran-2,5-diyl for increasing the dielectric anisotropy, and 1,4-phenylene for increasing the optical anisotropy. With regard to a configuration of 1,4-cyclohexylene, trans is preferred to cis for increasing the maximum temperature. Tetrahydropyran-2,5-diyl includes:

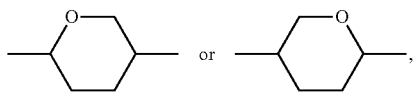

and preferably

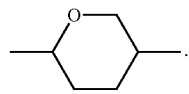

Ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring D is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy.

Ring F and ring G are independently 1,4-cyclohexylene, 1,4-phenylene, 2-fluoro-1,4-phenylene or 2,5-difluoro-1,4-phenylene. Preferred ring F or ring G is 1,4-cyclohexylene for decreasing the viscosity or increasing the maximum temperature, and 1,4-phenylene for decreasing the minimum temperature. With regard to a configuration of 1,4-cyclohexylene, trans is preferred to cis for increasing the maximum temperature.

$Z^2$ and $Z^3$ are independently a single bond, —$CH_2CH_2$—, —$CH_2O$—, —$OCH_2$—, —COO— or —OCO—. Preferred $Z^2$ or $Z^3$ is a single bond for decreasing the viscosity, —$CH_2CH_2$— for decreasing the minimum temperature, and —$CH_2O$— or —$OCH_2$— for increasing the dielectric anisotropy. $Z^4$ is a single bond, —$CH_2CH_2$—, —$CH_2O$—, —$OCH_2$—, —COO— or —OCO—. Preferred $Z^4$ is a single bond for decreasing the viscosity, —$CH_2CH_2$— for decreasing the minimum temperature, and —COO— or —OCO— for increasing the maximum temperature.

Then, b is 1, 2 or 3, c is 0 or 1, and a sum of b and c is 3 or less. Preferred b is 1 for decreasing the viscosity, and 2 or 3 for increasing the maximum temperature. Preferred c is 0 for decreasing the viscosity, and 1 for decreasing the minimum temperature. Then, d is 1, 2 or 3. Preferred d is 1 for decreasing the viscosity, and 2 or 3 for increasing the maximum temperature.

In formula (4), $P^1$, $P^2$ and $P^3$ are independently a polymerizable group. Preferred $P^1$, $P^2$ or $P^3$ is a polymerizable group selected from the group of groups represented by formula (P-1) to formula (P-5). Further preferred $P^1$, $P^2$ or $P^3$ is a group represented by formula (P-1), formula (P-2) or formula (P-3). Particularly preferred $P^1$, $P^2$ or $P^3$ is a group represented by formula (P-1) or formula (P-2). Most preferred $P^1$, $P^2$ or $P^3$ is a group represented by formula (P-1). A preferred group represented by formula (P-1) is —OCO—CH=$CH_2$ or —OCO—C($CH_3$)=$CH_2$. A wavy line in formula (P-1) to formula (P-5) represents a site to form a bonding.

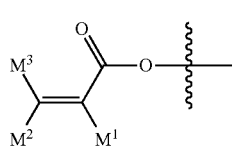 (P-1)

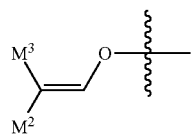 (P-2)

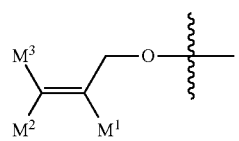 (P-3)

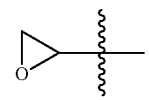 (P-4)

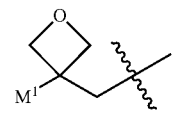 (P-5)

In formulas (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^3$, $Sp^4$ and $Sp^5$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in the groups, at least one hydrogen may be replaced by fluorine or chlorine. Preferred $Sp^3$, $Sp^4$ or $Sp^5$ is a single bond, —$CH_2CH_2$—, —$CH_2O$—, —$OCH_2$—, —COO—, —OCO—, —CO—CH=CH— or —CH=CH—CO—. Further preferred $Sp^3$, $Sp^4$ or $Sp^5$ is a single bond.

Ring J and ring P are independently cyclohexyl, cyclohexenyl, phenyl, l-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring J or ring P is phenyl. Ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring K is 1,4-phenylene or 2-fluoro-1,4-phenylene.

$Z^5$ and $Z^6$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C($CH_3$)=CH—, —CH=C ($CH_3$)— or —$C(CH_3)$=$C(CH_3)$—, and in the groups, at least one hydrogen may be replaced by fluorine or chlorine. Preferred $Z^5$ or $Z^6$ is a single bond, —$CH_2CH_2$—, —$CH_2O$—, —$OCH_2$—, —COO— or —OCO—. Further preferred $Z^5$ or $Z^6$ is a single bond.

Then, q is 0, 1, or 2. Preferred q is 0 or 1. Then, j, k and p are independently 0, 1, 2, 3 or 4, and a sum of j, k and p is 1 or more. Preferred j, k or p is 1 or 2.

Fifth, the preferred component compound will be described. Preferred compound (1) includes compound (1-1) to compound (1-9) described in item 5. In the compounds, at least one of the first additives preferably includes compound (1-1), compound (1-2), compound (1-3), compound (1-5) or compound (1-6). At least two of the first additives preferably include a combination of compound (1-1) and compound (1-2) or a combination of compound (1-1) and compound (1-4).

Preferred compound (AI-1) includes compound (AI-2) to compound (AI-21) described in item 5. In the compounds, at least one of the first additives preferably includes compound (AI-2), compound (AI-3), compound (AI-5), compound (AI-6) or compound (AI-7). At least two of the first additives preferably include a combination of compound (AI-2) and compound (AI 3) or a combination of compound (AI-2) and compound (AI-5). Further, a combination of preferred compounds in compound (1) and compound (AI-1) is preferred.

Preferred compound (2) includes compound (2-1) to compound (2-22) described in item 8. In the compounds, at least one of the first components preferably includes compound (2-1), compound (2-3), compound (2-4), compound (2-6), compound (2-8) or compound (2-10). At least two of the first components preferably include a combination of compound (2-1) and compound (2-6), a combination of compound (2-1) and compound (2-10), a combination of compound (2-3) and compound (2-6), a combination of compound (2-3) and compound (2-10), a combination of compound (2-4) and compound (2-6) or a combination of compound (2-4) and compound (2-8).

Preferred compound (3) includes compound (3-1) to compound (3-13) described in item 11. In the compounds, at least one of the second components preferably includes compound (3-1), compound (3-3), compound (3-5), compound (3-6), compound (3-8) or compound (3-9). At least two of the second components preferably include a combination of compound (3-1) and compound (3-3), a combination of compound (3-1) and compound (3-5) or a combination of compound (3-1) and compound (3-6).

Preferred compound (4) includes compound (4-1) to compound (4-28) described in item 16. In the compounds, at least one of the second additives preferably includes compound (4-1), compound (4-2), compound (4-24), compound (4-25), compound (4-26) or compound (4-27). At least two of the second additives preferably include a combination of compound (4-1) and compound (4-2), a combination of compound (4-1) and compound (4-18), a combination of compound (4-2) and compound (4-24), a combination of compound (4-2) and compound (4-25), a combination of compound (4-2) and compound (4-26), a combination of compound (4-25) and compound (4-26) or a combination of compound (4-18) and compound (4-24).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor and the polar compound. The optically active compound is added to the composition for the purpose of inducing a helical structure in the liquid crystal molecules to give a twist angle. Specific examples of such a compound include compound (5-1) to compound (5-5). A preferred proportion of the optically active compound is about 5% by weight or less. A further preferred proportion is in the range of about 0.01% by weight to about 2% by weight.

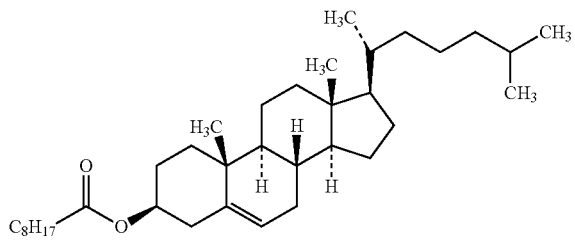

(5-1)

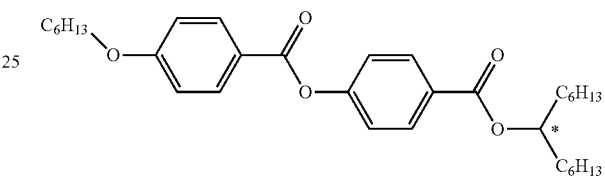

(5-2)

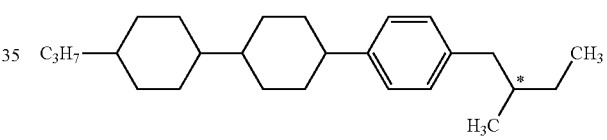

(5-3)

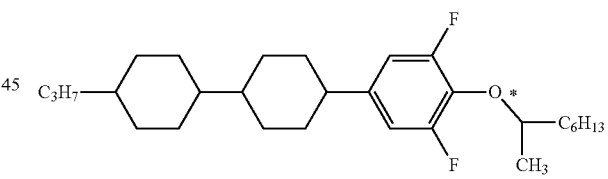

(5-4)

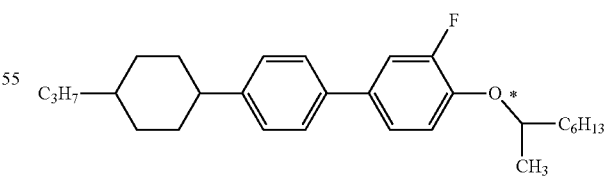

(5-5)

The antioxidant is added to the composition for preventing a decrease in the specific resistance caused by heating in air, or for maintaining a large voltage holding ratio at room temperature and also at a temperature close to the maximum temperature even after the device has been used for a long period of time. Specific examples of a preferred antioxidant include compound (6) in which n is an integer from 1 to 9.

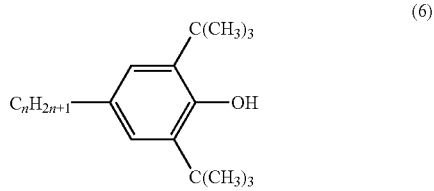

(6)

In compound (6), preferred n is 1, 3, 5, 7 or 9. Further preferred n is 7. Compound (6) where n is 7 is effective in maintaining a large voltage holding ratio at room temperature and also at a temperature close to the maximum temperature even after the device has been used for a long period of time because such compound (6) has a small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding a decrease in the maximum temperature or an increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range of about 1 ppm to about 500 ppm.

The polymerizable compound is used to be adapted for a polymer sustained alignment (PSA) mode device. Compound (1), compound (AI-1) and compound (4) are suitable for the purpose. Any other polymerizable compound that is different from compound (1), compound (AI-1) and compound (4) may be added to the composition together with compound (1), compound (AI-1) and compound (4). Specific examples of any other preferred polymerizable compound include a compound such as acrylate, methacrylate, a vinyl compound, a vinyloxy compound, propenyl ether, an epoxy compound (oxirane, oxetane) and vinyl ketone. Further preferred examples include acrylate or methacrylate. A preferred proportion of compound (1), compound (AI-1) and compound (4) is about 10% by weight or more based on the total weight of the polymerizable compound. A further preferred proportion is about 50% by weight or more. A particularly preferred proportion is about 80% by weight or more. A particularly preferred proportion is also 100% by weight. Reactivity of a polymerizable compound and a pretilt angle of the liquid crystal molecules can be adjusted by changing a kind of compound (1), compound (AI-1) and compound (4), or by combining any other polymerizable compounds with compound (1), compound (AI-1) and compound (4) at a suitable ratio. The short response time of the device can be achieved by optimizing the pretilt angle. Alignment of the liquid crystal molecules is stabilized, and therefore a large contrast ratio and a long service life can be achieved.

The polymerizable compound is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photopolymerization initiator, is suitable for radical polymerization. A preferred proportion of the photopolymerization initiator is in the range of about 0.1% by weight to about 5% by weight based on the total weight of the polymerizable compound. A further preferred proportion is in the range of about 1% by weight to about 3% by weight.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

The polar compound includes an organic compound having polarity. Here, the polar compound includes no compound having an ionic bond. An atom such as oxygen, sulfur and nitrogen is further electrically negative, and tends to have a partial negative charge. Carbon and hydrogen are neutral, or tend to have a partial positive charge. Polarity results from a non-uniform distribution of a partial electric charge between different kinds of atoms in the compound. For example, the polar compound has at least one of partial structures such as —OH, —COOH, —SH, —NH$_2$, >NH and >N—.

Seventh, the method for synthesizing the component compounds will be described. The compound can be prepared according to a known method. Examples of the synthetic methods are described. A method for synthesizing compound (1) and compound (AI-1) is described in a section of Examples. Compound (2-1) is prepared according to a method described in JP H2-503441 A. Compound (3-5) is prepared according to a method described in JP S57-165328 A. Compound (4-18) is prepared according to a method described in JP H7-101900 A. A part of compound (6) is commercially available. A compound in which n in formula (6) is 1 is available from Sigma-Aldrich Corporation. Compound (6) in which n is 7 or the like is prepared according to a method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to a publicly known method using the thus obtained compounds. For example, the component compounds are mixed and dissolved in each other by heating.

Eighth, the features of the composition will be described. Most of the compositions have a minimum temperature of about −10° C. or lower, a maximum temperature of about 70° C. or higher, and optical anisotropy in the range of about 0.07 to about 0.20. A composition having optical anisotropy in the range of about 0.08 to about 0.25 may be prepared by controlling a proportion of the component compounds or by mixing any other liquid crystal compound. Further, a composition having optical anisotropy in the range of about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, or as the optically active composition by adding the optically active compound.

The composition can be used in the AM device. The composition can also be used in a PM device. The composition can also be used in an AM device and a PM device each having a mode such as the PC mode, the TN mode, the STN mode, the ECB mode, the OCB mode, the IPS mode, the FFS mode, the VA mode and the FPA mode. Use in an AM device having the TN mode, the OCB mode, the IPS mode or the FFS mode is particularly preferred. In the AM device having the IPS mode or the FFS mode, the alignment of the liquid crystal molecules when no voltage is applied may be parallel or perpendicular to a glass substrate. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, or a polymer dispersed (PD) device in which a three-dimensional network polymer is formed in the composition.

Ninth, the method for manufacturing the liquid crystal display device will be described. First, one example of a method for manufacturing a conventional polymer sustained alignment mode device will be described.

A device having two substrates called an array substrate and a color filter substrate is assembled. The substrates each have an alignment film. At least one of the substrates has an electrode layer. A liquid crystal compound is mixed to prepare a liquid crystal composition. A polymerizable compound is added to the composition. An additive may be further added thereto when necessary. The composition is injected into the device. The device is irradiated with light while voltage is applied to the device. Ultraviolet light is preferred. The polymerizable compound is polymerized by irradiation with light. A composition containing a polymer is formed by the polymerization. The polymer sustained alignment mode device is manufactured by such a procedure.

In the above procedure, when voltage is applied, the liquid crystal molecules are aligned by action of the alignment film and an electric field. Molecules of the polymerizable compound are also aligned according to the above alignment. The polymerizable compound is polymerized by ultraviolet light in the above state, and therefore a polymer maintaining the alignment is formed. A response time in the device is shortened by an effect of the polymer. The image persistence is caused due to poor operation in the liquid crystal molecules, and therefore the persistence is also simultaneously improved by the effect of the polymer. In addition, the polymerizable compound in the composition can be polymerized in advance, and the composition can also be arranged between the substrates of the liquid crystal display device.

When compound (1) and compound (AI-1), namely, the polar compound having the polymerizable group, are used as the polymerizable compound, the alignment film is unnecessary for the substrates of the device. A device having no alignment film is manufactured according to the procedure described in the second to the present paragraph.

In the procedure, compound (1) and compound (AI-1) are arranged on the substrate because the polar group interacts with a surface of the substrate. The liquid crystal molecules are aligned according to the above arrangement. When voltage is applied, the alignment of the liquid crystal molecules is further promoted. The polymerizable group is polymerized by ultraviolet light in the above state, and therefore a polymer in which the alignment is maintained is formed. The alignment of the liquid crystal molecules is additionally stabilized by an effect of the polymer, and a response time in the device is shortened. The image persistence is caused due to poor operation in the liquid crystal molecules, and therefore the persistence is also simultaneously improved by the effect of the polymer.

A method for manufacturing the liquid crystal display device of the invention will be described. The polar compound and the polymerizable compound are added to the liquid crystal composition in a predetermined proportion, and the resulting mixture is injected in vacuum into a device having no alignment film in which a distance (cell gap) between glass substrates is 3.5 micrometers. While predetermined voltage is applied to the device when necessary, the device is irradiated with ultraviolet light having a specific wavelength distribution using a UV lamp (UV1) for a predetermined period of time, and thus the polar compound and the polymerizable compound are polymerized, and the pretilt angle is provided for the device. Subsequently, an unreacted polar compound and an unreacted polymerizable compound are polymerized by irradiating the device with ultraviolet light using a UV lamp (UV2) for a predetermined period of time.

In the method for manufacturing the liquid crystal display device according to the invention, an energy amount for polymerization can be optimized by suitably controlling a wavelength distribution of ultraviolet light to be irradiated upon polymerization, and the polar compound and the polymerizable compound can be efficiently polymerized by preventing the damage onto the component compounds in the composition. With regard to promotion of a polymerization reaction, the polymerization reaction is promoted by ultraviolet light having a short wavelength in comparison with ultraviolet light having a long wavelength, but an influence on the component compounds is large. Reactivity of the polymerizable compound can be efficiently adjusted, and an influence on the liquid crystal compound can be reduced by suitably controlling the wavelength distribution of ultraviolet light. An alignment control layer formed of a polymer is formed by polymerization of the polymerizable compound. If the polymerizable compound includes only a polar compound of compound (1) and compound (AI-1), the alignment control layer by the polar compound is formed, and if the polymerizable compound includes the polar compound and the polymerizable compound of compound (4), the alignment control layer by both thereof is formed, and if any other polymerizable compound is further added thereto, the alignment control layer formed of the polymer containing both is formed.

Specifically, an accumulated light quantity ($J/cm^2$) ratio at wavelengths of 254 nanometers and 313 nanometers to be irradiated is adjusted to 10 or more. Thus, reactivity of the polymerizable compound can be efficiently adjusted, and an influence on the liquid crystal compound can be reduced. Specific examples of the influence on the liquid crystal compound include degradation and decomposition of the compound. The accumulated light quantity (J/cm$^2$) ratio at wavelengths of 254 nanometers and 313 nanometers to be irradiated is preferably adjusted to 50 to 150, and further preferably adjusted to 50 to 130. According to such a preferred range, when a quantity of ultraviolet light at a wavelength of 254 nanometers is large, the reactivity of the polymerizable compound is high, but various electric characteristics of the component compounds are estimated to be damaged, and reduction of the quantity of ultraviolet light at a wavelength of 254 nanometers to a smallest possible level is considered as optimum polymerization conditions. An accumulated light quantity J of ultraviolet light can be determined by a multiplication: illumination (unit: mW/cm$^2$)×irradiation time (unit: sec) of ultraviolet light.

Upon allowing the polymerizable compound to react, the compound is preferably manufactured while applying voltage. Applied voltage is 1 to 30 V, but is preferably adjusted to 20 V or less, and further preferably adjusted to 1 to 15 V. The alignment of the liquid crystal molecules can be stabilized and the pretilt angle of the liquid crystal device can be further controlled by irradiating the compound with ultraviolet light while applying voltage. If the applied voltage becomes more than 25 V, the pretilt angle becomes more than 5 degrees or more, and such a case is not preferred. If the applied voltage is less than 1 V being a lower limit, the pretilt angle cannot be efficiently provided for the device. The influence on the component compounds can be reduced and the pretilt angle can be efficiently provided for the device by a distribution and the energy amount of irradiation ultraviolet light, and the applied voltage, and such factors are found to play an important role on quality of the device.

EXAMPLES

The invention will be described in greater detail by way of Examples. The invention is not limited by the Examples. The invention includes a mixture of composition M1 and composition M2. The invention also includes a mixture prepared by mixing at least two of compositions in Examples. A compound prepared was identified by methods such as an NMR analysis. Characteristics of the compound, the composition and a device were measured by methods described below.

NMR analysis: For measurement, DRX-500 made by Bruker BioSpin Corporation was used. In H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. In 19F-NMR measurement, CFCl$_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by a method as described below. A mixture of liquid crystal compounds is analyzed by gas chromatograph (FID). An area ratio of each peak in the gas chromatogram corresponds to the ratio of the liquid crystal compounds. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85× (measured value of a base liquid crystal)}/0.15. When a smectic phase (or crystals) precipitated at the ratio thereof at 250° C., a ratio of the compound to the base liquid crystal was changed step by step in the order of (10% by weight:90% by weight), (5% by weight:95% by weight) and (1% by weight:99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

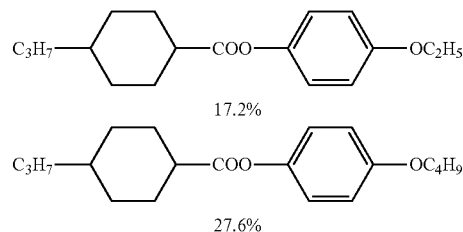

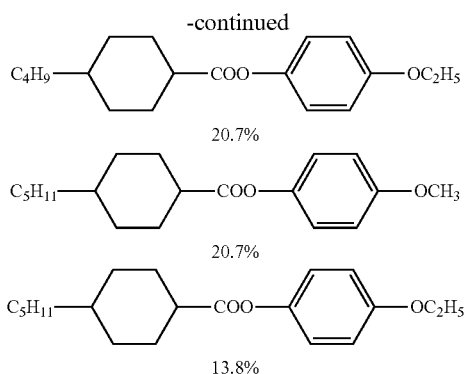

20.7%

20.7%

13.8%

Measuring method: Characteristics were measured according to methods described below. Most of the methods are described in the Standard of Japan Electronics and Information Technology Industries Association (hereinafter, abbreviated as JEITA) discussed and established in JEITA (JEITA ED-2521B), or a modification of the methods was also used. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from the nematic phase to an isotropic liquid was measured. A maximum temperature of the nematic phase may be occasionally abbreviated as "maximum temperature."

(2) Minimum temperature of nematic phase ($T_C$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_C$ was expressed as $T_C$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was injected into a VA device in which a distance (cell gap) between two glass substrates was 20 micrometers. Voltage was applied stepwise to the device in the range of 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. Dielectric anisotropy required for the calculation was measured according to a method described in measurement (6).

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δε; measured at 25° C.): A value of dielectric anisotropy was calculated from an equation: Δε=ε∥−ε⊥. A dielectric constant (ε∥ and ε⊥) was measured as described below.

(1) Measurement of dielectric constant (ε∥): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (ε∥) of liquid crystal molecules in a major axis direction was measured.

(2) Measurement of dielectric constant (ε⊥): A polyimide solution was applied to a well-cleaned glass substrate. After calcining the glass substrate, rubbing treatment was applied to the alignment film obtained. A sample was injected into a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

(7) Threshold voltage (Vth; measured at 25° C.; V): For measurement, an LCD5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and a quantity of light transmitted through the device was measured. A voltage-transmittance curve was prepared, in which the maximum quantity of light corresponds to 100% transmittance and the minimum quantity of light corresponds to 0% transmittance. A threshold voltage is expressed in terms of voltage at 10% transmittance.

(8) Voltage holding ratio (VHR; measured at 60° C.; %): Pulse voltage (60 microseconds at 0.1 V) was applied to a prepared device to charge the device. A decaying voltage was measured for 1666.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Pretilt angle (degree): Spectroscopic Ellipsometer M-2000U (made by J. A. Woollam Co., Inc.) was used for measurement of a pretilt angle.

Synthesis Example 1

Compound (PC-1) was prepared according to the method described below.

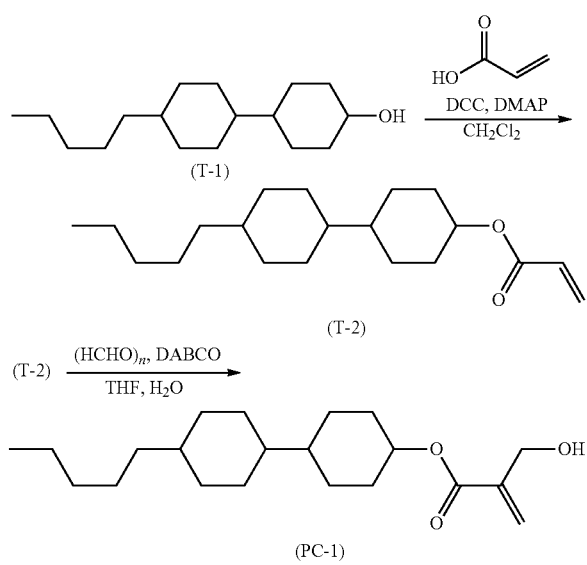

First Step

Compound (T-1) (25.0 g), acrylic acid (7.14 g), 4-dimethylaminopyridine (DMAP; 1.21 g) and dichloromethane (300 mL) were put in a reaction vessel, and the resulting mixture was cooled down to 0° C. A dichloromethane (125 mL) solution of 1,3-dicyclohexylcarbodiimnide (DCC, 24.5 g) was slowly added dropwise thereto, and the resulting mixture was stirred for 12 hours while returning to room temperature. An insoluble matter was filtered off, and then the resulting reaction mixture was poured into water, and an aqueous layer was subjected to extraction with dichloromethane. A combined organic layer was washed with brine and dried over anhydrous magnesium sulfate. The solution was concentrated under reduced pressure, and the residue was purified by silica gel chromatography (heptane:toluene=2:1 in a volume ratio). The residue was further purified by recrystallization from Solmix (registered trademark) A-11 to obtain compound (T-2) (11.6 g; 38%). In addition, Solmix (registered trademark) A-11 is a mixture of ethanol (85.5%), methanol (13.4%) and isopropyl alcohol (1.1%), and was purchased from Japan Alcohol Trading Co., Ltd.

Second Step

Paraformaldehyde (2.75 g), 1,4-diazabicyclo[2.2.2]octane (DABCO, 4.62 g) and water (40 mL) were put in a reaction vessel, and the resulting mixture was stirred at room temperature for 15 minutes. Thereto, a THF (90 mL) solution of compound (T-2) (6.31 g) was added dropwise, and stirred at room temperature for 72 hours. The resulting reaction mixture was poured into water, and an aqueous layer was subjected to extraction with ethyl acetate. A combined organic layer was washed with brine and dried over anhydrous magnesium sulfate. The solution was concentrated under reduced pressure, and the residue was purified by silica gel chromatography (toluene:ethyl acetate=5:1 in a volume ratio). The residue was further purified by recrystallization (heptane:toluene=1:1 in a volume ratio) to obtain compound (PC-1) (1.97 g; 29%).

Compound (PC-1)

$^1$H-NMR: Chemical shift δ (ppm; CDCl$_3$): 6.23 (s, 1H), 5.79 (d, J=1.2 Hz, 1H), 4.79-4.70 (m, 1H), 4.32 (d, J=6.7 Hz, 2H), 2.29 (t, J=6.7 Hz, 1H), 2.07-2.00 (m, 2H), 1.83-1.67 (m, 6H), 1.42-1.18 (m, 8H), 1.18-0.91 (m, 9H), 0.91-0.79 (m, 5H).

Synthesis Example 2

Synthesis of Compound (AIO-3)

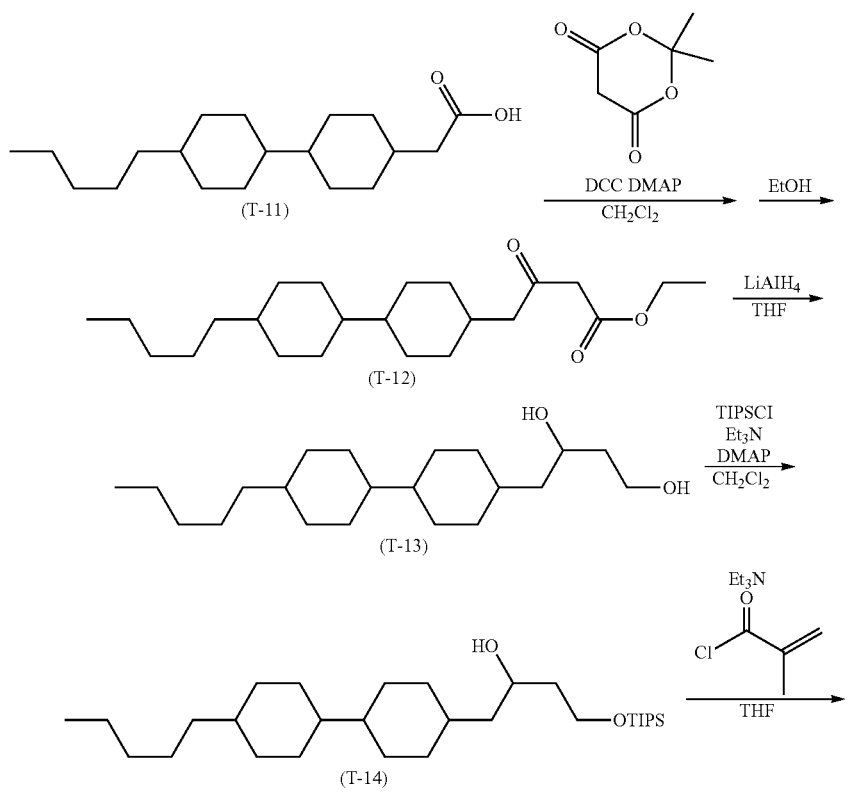

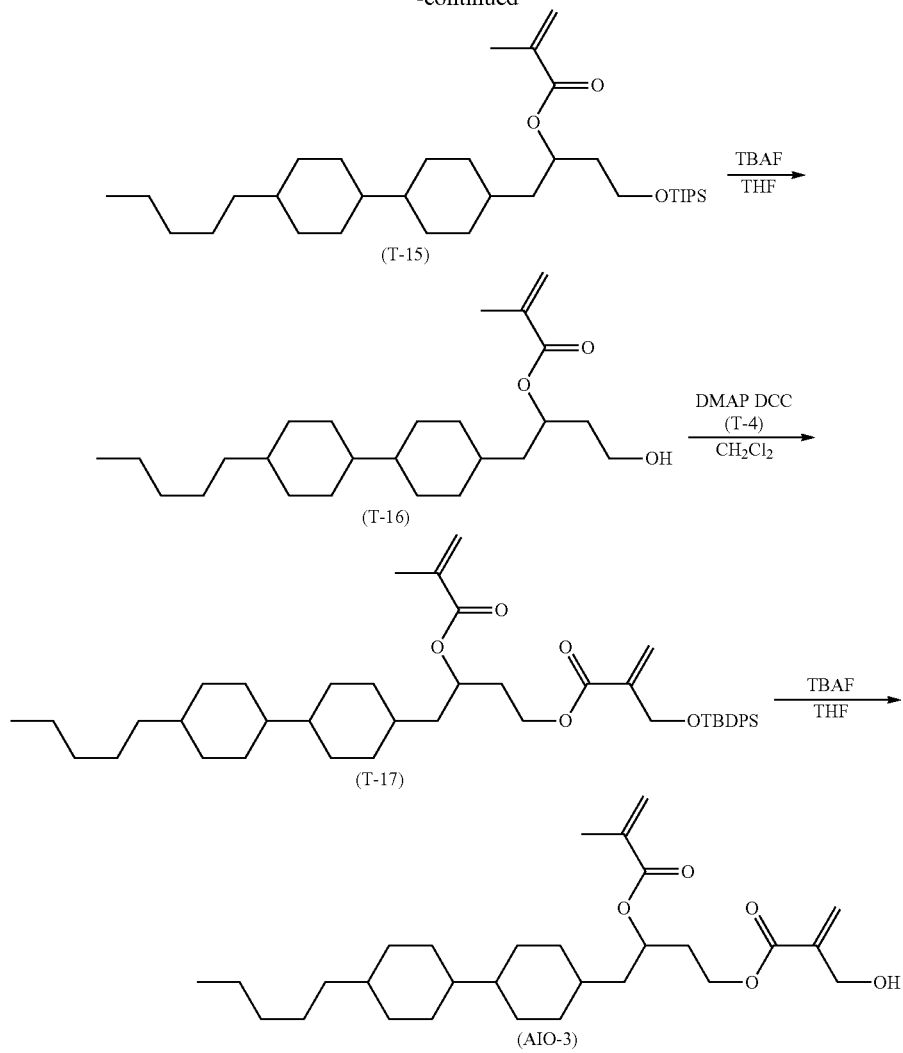

First Step

Compound (T-11) (15.0 g), N,N-dimethyl-4-aminopyridine (DMAP) (9.33 g), Meldrum's acid (9.54 g) and dichloromethane (250 mL) were put in a reaction vessel, and the resulting mixture was cooled down to 0° C. N,N'-dicyclohexylcarbodiimide (DCC) (15.7 g) was slowly added thereto, and the resulting mixture was stirred for 12 hours while returning to room temperature. An insoluble matter was filtered off, and then the resulting reaction mixture was poured into water, and an aqueous layer was subjected to extraction with dichloromethane. A combined organic layer was washed with brine and dried over anhydrous magnesium sulfate. The solution was concentrated under reduced pressure. The residue and ethanol (250 mL) were put in a reaction vessel, and the resulting mixture was stirred at 70° C. An insoluble matter was filtered off, and then the resulting reaction mixture was poured into water, and an aqueous layer was subjected to extraction with ethyl acetate. A combined organic layer was washed with brine and dried over anhydrous magnesium sulfate. The solution was concentrated under reduced pressure, and the residue was purified by silica gel chromatography (heptane:toluene=1:1 in a volume ratio) to obtain compound (T-12) (10.2 g; 55%).

Second Step

Lithium aluminum hydride (0.6 g) and THF (100 mL) were put in a reaction vessel, and the resulting mixture was cooled with ice. A THF (100 mL) solution of compound (T-12) (10.2 g) was slowly added thereto, and the resulting mixture was stirred for 3 hours while returning to room temperature. An insoluble matter was filtered off, and then the resulting reaction mixture was poured into water, and an aqueous layer was subjected to extraction with ethyl acetate. A combined organic layer was washed with brine and dried over anhydrous magnesium sulfate. The solution was concentrated under reduced pressure, and the residue was purified by silica gel chromatography (toluene:ethyl acetate=1:1 in a volume ratio) to obtain compound (T-13) (7.35 g; 81%).

Third Step

Compound (T-13) (7.35 g), triethylamine (3.75 mL), N,N-dimethyl-4-aminopyridine (DMAP) (0.27 g) and dichloromethane (200 mL) were put in a reaction vessel, and the resulting mixture was cooled down to 0° C. TIPSCl (triisopropylsilyl chloride) (5.05 mL) was slowly added dropwise thereto, and the resulting mixture was stirred for 24 hours while returning to room temperature. An insoluble matter was filtered off, and then the resulting reaction mixture was poured into water, and an aqueous layer was subjected to extraction with ethyl acetate. A combined organic layer was washed with brine and dried over anhydrous magnesium sulfate. The solution was concentrated under reduced pressure, and the residue was purified by silica gel chromatography (toluene:ethyl acetate=19:1 in a volume ratio) to obtain compound (T-14) (6.50 g; 60%).

Fourth Step

Compound (T-14) (6.50 g), triethylamine (3.77 mL) and THF (200 mL) were put in a reaction vessel, and the resulting mixture was cooled down to 0° C. Methacryloyl chloride (2.00 mL) was slowly added dropwise thereto, and the resulting mixture was stirred for 4 hours while returning to room temperature. An insoluble matter was filtered off, and then the resulting reaction mixture was poured into water, and an aqueous layer was subjected to extraction with toluene. A combined organic layer was washed with brine and dried over anhydrous magnesium sulfate. The solution was concentrated under reduced pressure, and the residue was purified by silica gel chromatography (toluene:heptane=1:1 in a volume ratio) to obtain compound (T-15) (4.70 g; 63%).

Fifth Step

Compound (T-15) (4.70 g) and THF (100 mL) were put in a reaction vessel, and the resulting mixture was cooled down to 0° C. TBAF (1.00 M; THF solution; 10.3 mL) was slowly added thereto, and the resulting mixture was stirred for 1 hour while returning to room temperature. The resulting reaction mixture was poured into water, and an aqueous layer was subjected to extraction with ethyl acetate. A combined organic layer was washed with brine and dried over anhydrous magnesium sulfate. The solution was concentrated under reduced pressure, and the residue was purified by silica gel chromatography (toluene:ethyl acetate=9:1 in a volume ratio) to obtain compound (T-16) (1.50 g; 45%).

Sixth Step

Compound (T-17) (1.51 g; 55%) was obtained by using compound (T-16) (1.50 g) as a raw material in a manner similar to the technique in the fourth step in Synthesis Example 2.

Seventh Step

Compound (AIO-3) (0.45 g; 45%) was obtained by using compound (T-17) (1.51 g) as a raw material in a manner similar to the technique in the fifth step in Synthesis Example 2.

An NMR analysis value of the resulting compound (AIO-3) was as described below.

$^1$H-NMR: Chemical shift δ (ppm; CDCl$_3$): 6.25 (s, 1H), 6.09 (s, 1H), 5.82 (d, J=1.1 Hz, 1H), 5.55 (s, 1H), 5.22-5.17 (m, 1H), 4.32-4.26 (m, 3H), 4.17-4.12 (m, 3H), 2.50 (s, 1H), 2.03-1.89 (m, 5H), 1.83-1.58 (m, 9H), 1.41-1.08 (m, 11H), 0.96-0.78 (m, 13H).

Physical properties of compound (AIO-3) were as described below.

Transition temperature: C 61.2 I.

Examples of the composition will be described below. The component compounds were represented using symbols according to definitions in Table 3 described below. In Table 3, the configuration of 1,4-cyclohexylene is trans. A parenthesized number next to a symbolized compound represents a chemical formula to which the compound belongs. A symbol (-) means any other liquid crystal compound. A proportion (percentage) of the liquid crystal compound is expressed in terms of weight percent (% by weight) based on the weight of the liquid crystal composition containing no additive. Values of characteristics of the composition were summarized in a last part.

TABLE 3

Method for description of compounds using symbols
R—(A$_1$)—Z$_1$— ... —Z$_n$—(A$_n$)—R'

| 1) Left-terminal group R— | Symbol |
|---|---|
| FC$_n$H$_{2n}$— | Fn- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| C$_m$H$_{2m+1}$CF$_2$C$_n$H$_{2n}$— | m(CF2)n- |
| CH$_2$=CHCOO— | AC— |
| CH$_2$=C(CH$_3$)COO— | MAC— |

| 2) Right-terminal group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | —VFF |
| —OCOCH=CH$_2$ | —AC |
| —OCOC(CH$_3$)=CH$_2$ | —MAC |

| 3) Bonding group —Z$_n$— | Symbol |
|---|---|
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |
|  | ch |

| 4) Ring structure —A$_n$— | Symbol |
|---|---|
|  | H |
| 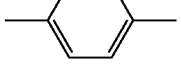 | B |
| 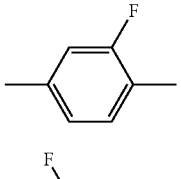 | B(F) |
| 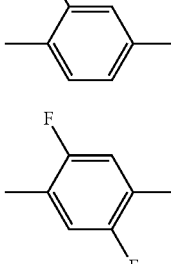 | B(2F) |
| (additional structure) | B(2F,5F) |

TABLE 3-continued

Method for description of compounds using symbols
R—(A₁)—Z₁— . . . —Zₙ—(Aₙ)—R'

| Structure | Symbol |
|---|---|
| 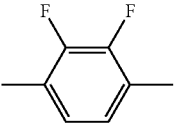 | B(2F,3F) |
|  | B(2F,3Cl) |
| 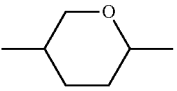 | dh |
| 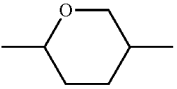 | Dh |
| 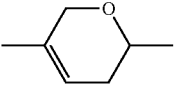 | dpr |
| 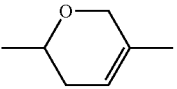 | Dpr |
| 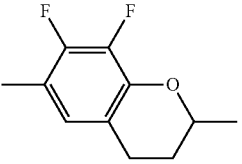 | Cro(7F,8F) |

5) Examples of description

Example 1 V—HHB(2F,3F)—O2
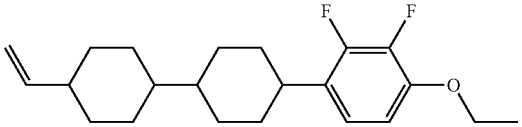 [SMILES: C=CC1CCC(C2CCC(c3ccc(OCC)c(F)c3F)CC2)CC1]

Example 2 5-DprB(2F,3F)—O2
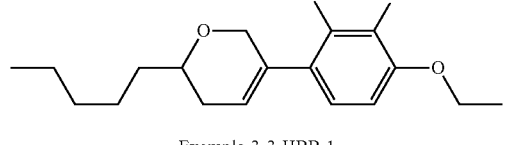

Example 3 3-HBB-1
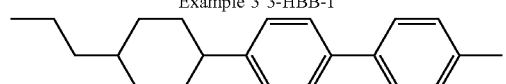

Example 4 AC—BB—AC
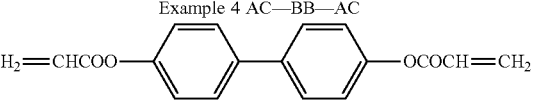

Examples of a Device

1. Raw Material

A composition to which a polar compound and a polymerizable compound were added was injected into a device having no alignment film. After the device was irradiated with ultraviolet light, VHR and a pretilt angle in the device were examined. A raw material will be described first. The raw material was appropriately selected from compositions (M51) to (M58) and (M1) to (M18), polar compounds (PC-1) to (PC-12) and (preAIO-1) to (AIO-4) and polymerizable compounds (RM-1) to (RM-9). The composition is as described below.

| Composition M51 | | |
|---|---|---|
| 3-HB(2F,3F)—O2 | (2-1) | 9% |
| 5-HB(2F,3F)—O2 | (2-1) | 11% |
| 2-HHB(2F,3F)-1 | (2-6) | 9.5% |
| 3-HHB(2F,3F)-1 | (2-6) | 10.5% |
| 3-HHB(2F,3F)—O2 | (2-6) | 10.5% |
| 5-HHB(2F,3F)—O2 | (2-6) | 9.5% |
| 2-HBB(2F,3F)—O2 | (2-10) | 12% |
| 3-HH-5 | (3-1) | 9.5% |
| 5-HB-3 | (3-1) | 13.5% |
| 5-HH—O1 | (3-1) | 5% |

NI = 79.5° C.;
Δn = 0.091;
Δε = −3.4;
Vth = 2.1 V;
η = 26.3 mPa · s.

| Composition M52 | | |
|---|---|---|
| 3-HB(2F,3F)—O2 | (2-1) | 15.5% |
| 3-HHB(2F,3F)—O3 | (2-6) | 8% |
| 4-HHB(2F,3F)—O2 | (2-6) | 10% |
| 2-BB(2F,3F)-3 | (2-9) | 8.75% |
| 2-HBB(2F,3F)—O2 | (2-10) | 5.5% |
| 3-HBB(2F,3F)—O2 | (2-10) | 11.5% |
| 2-HH-3 | (3-1) | 24.5% |
| 3-HH-4 | (3-1) | 9.25% |
| 3-HB—O2 | (3-2) | 7% |

NI = 76.1° C.;
Δn = 0.097;
Δε = −2.7;
Vth = 2.2 V;
η = 25.3 mPa · s.

| Composition M53 | | |
|---|---|---|
| 3-HB(2F,3F)—O2 | (2-1) | 18% |
| 3-HHB(2F,3F)—O2 | (2-6) | 9% |
| 2-HBB(2F,3F)—O2 | (2-10) | 6% |
| 3-HBB(2F,3F)—O2 | (2-10) | 10% |
| 4-HBB(2F,3F)—O2 | (2-10) | 8% |
| 2-HH-3 | (3-1) | 25% |
| 3-HH-4 | (3-1) | 10% |
| 1-BB-3 | (3-3) | 5% |
| 3-HBB-2 | (3-6) | 9% |

NI = 76.1° C.;
Δn = 0.100;
Δε = −2.5;
Vth = 2.4 V;
η = 16.1 mPa · s.

| Composition M54 | | |
|---|---|---|
| 3-HB(2F,3F)—O2 | (2-1) | 12% |
| 3-BB(2F,3F)—O2 | (2-4) | 10% |
| 5-BB(2F,3F)—O2 | (2-4) | 4% |
| 3-HDhB(2F,3F)—O2 | (2-13) | 12% |
| 3-dhBB(2F,3F)—O2 | (2-16) | 8% |
| 2-HH-3 | (3-1) | 20% |
| 3-HH-4 | (3-1) | 6% |
| 3-HB—O2 | (3-2) | 3% |
| 3-HHB—O1 | (3-5) | 3% |
| 3-HHB-1 | (3-5) | 6% |
| 3-HHB-3 | (3-5) | 6% |
| 3-HBB-2 | (3-6) | 10% |

NI = 75.8° C.;
Δn = 0.101;
Δε = −2.7;
Vth = 2.3 V;
η = 18.3 mPa · s.

| Composition M55 | | |
|---|---|---|
| 3-BB(2F,3F)—O2 | (2-4) | 12% |
| 5-BB(2F,3F)—O2 | (2-4) | 6% |
| 2-HH10B(2F,3F)—O2 | (2-8) | 10% |
| 3-HH10B(2F,3F)—O2 | (2-8) | 16% |
| 2-HH-3 | (3-1) | 20% |
| 3-HH-4 | (3-1) | 8% |
| 3-HB—O2 | (3-2) | 4% |
| 1-BB-5 | (3-3) | 5% |
| 3-HHB-1 | (3-5) | 6% |
| 3-HHB-3 | (3-5) | 5% |
| 3-HBB-2 | (3-6) | 8%. |

NI = 76.9° C.;
Δn = 0.100;
Δε = −2.7;
Vth = 2.4 V;
η = 16.2 mPa · s.

| Composition M56 | | |
|---|---|---|
| 3-HB(2F,3F)—O2 | (2-1) | 18% |
| 3-HHB(2F,3F)—O2 | (2-6) | 9% |
| 5-HHB(2F,3F)—O2 | (2-6) | 4% |
| 2-BB(2F,3F)B-3 | (2-9) | 9% |
| 2-HBB(2F,3F)—O2 | (2-10) | 10% |
| 3-HBB(2F,3F)—O2 | (2-10) | 10% |
| 3-HH—V | (3-1) | 40% |

NI = 74.8° C.;
Δn = 0.101;
Δε = −2.8;
Vth = 2.3 V;
η = 14.1 mPa · s.

| Composition M57 | | |
|---|---|---|
| V-HB(2F,3F)—O2 | (2-1) | 14% |
| V-HHB(2F,3F)—O2 | (2-6) | 9% |
| V-HHB(2F,3F)—O4 | (2-6) | 8% |
| V-HBB(2F,3F)—O2 | (2-10) | 10% |
| V-HBB(2F,3F)—O4 | (2-10) | 10% |
| 2-HH-3 | (3-1) | 25% |
| 3-HH-4 | (3-1) | 10% |
| 1-BB-5 | (3-3) | 5% |
| 3-HBB-2 | (3-6) | 9% |

NI = 75.4° C.;
Δn = 0.100;
Δε = −2.6;
Vth = 2.3 V;
η = 15.3 mPa · s.

| Composition M58 | | |
|---|---|---|
| 3-HB(2F,3F)—O2 | (2-1) | 17% |
| 3-HHB(2F,3F)—O2 | (2-6) | 10% |
| 2-HBB(2F,3F)—O2 | (2-10) | 6% |
| 3-HBB(2F,3F)—O2 | (2-10) | 10% |
| 4-HBB(2F,3F)—O2 | (2-10) | 8% |
| 2-HH-3 | (3-1) | 25% |
| 3-HH-4 | (3-1) | 10% |
| 7-HB-1 | (3-2) | 5% |
| 2-BBB(2F)-5 | (3-7) | 9% |

NI = 76.0° C.;
Δn = 0.101;
Δε = −2.6;
Vth = 2.3 V;
η = 17.2 mPa · s.

| Composition M1 | | |
|---|---|---|
| 3-HB(2F,3F)—O2 | (2-1) | 10% |
| 5-HB(2F,3F)—O2 | (2-1) | 7% |
| 2-BB(2F,3F)—O2 | (2-4) | 7% |
| 3-BB(2F,3F)—O2 | (2-4) | 7% |
| 3-B(2F,3F)B(2F,3F)—O2 | (2-5) | 3% |
| 2-HHB(2F,3F)—O2 | (2-6) | 5% |
| 3-HHB(2F,3F)—O2 | (2-6) | 10% |
| 2-HBB(2F,3F)—O2 | (2-10) | 8% |
| 3-HBB(2F,3F)—O2 | (2-10) | 10% |
| 2-HH-3 | (3-1) | 14% |
| 3-HB—O1 | (3-2) | 5% |
| 3-HHB-1 | (3-5) | 3% |
| 3-HHB—O1 | (3-5) | 3% |
| 3-HHB-3 | (3-5) | 4% |
| 2-BB(F)B-3 | (3-8) | 4% |

NI = 73.2° C.;
Tc < −20° C.;
Δn = 0.113;
Δε = −4.0;
Vth = 2.18 V;
η = 22.6 mPa · s.

| Composition M2 | | |
|---|---|---|
| 3-HB(2F,3F)—O4 | (2-1) | 6% |
| 3-H2B(2F,3F)—O2 | (2-2) | 8% |
| 3-H1OB(2F,3F)—O2 | (2-3) | 4% |
| 3-BB(2F,3F)—O2 | (2-4) | 7% |
| 2-HHB(2F,3F)—O2 | (2-6) | 7% |
| 3-HHB(2F,3F)—O2 | (2-6) | 7% |
| 3-HH2B(2F,3F)—O2 | (2-7) | 7% |
| 5-HH2B(2F,3F)—O2 | (2-7) | 4% |
| 2-HBB(2F,3F)—O2 | (2-10) | 5% |
| 3-HBB(2F,3F)—O2 | (2-10) | 5% |
| 4-HBB(2F,3F)—O2 | (2-10) | 6% |
| 2-HH-3 | (3-1) | 12% |
| 1-BB-5 | (3-3) | 12% |
| 3-HHB-1 | (3-5) | 4% |
| 3-HHB—O1 | (3-5) | 3% |
| 3-HBB-2 | (3-6) | 3% |

NI = 82.8° C.;
Tc < −30° C.;
Δn = 0.118;
Δε = −4.4;
Vth = 2.13 V;
η = 22.5 mPa · s.

| Composition M3 | | |
|---|---|---|
| 3-HB(2F,3F)—O2 | (2-1) | 7% |
| 5-HB(2F,3F)—O2 | (2-1) | 7% |
| 3-BB(2F,3F)—O2 | (2-4) | 8% |

| Composition M3 | | |
|---|---|---|
| 3-HHB(2F,3F)—O2 | (2-6) | 5% |
| 5-HHB(2F,3F)—O2 | (2-6) | 4% |
| 3-HH1OB(2F,3F)—O2 | (2-8) | 4% |
| 2-BB(2F,3F)B-3 | (2-9) | 5% |
| 2-HBB(2F,3F)—O2 | (2-10) | 3% |
| 3-HBB(2F,3F)—O2 | (2-10) | 8% |
| 4-HBB(2F,3F)—O2 | (2-10) | 5% |
| 5-HBB(2F,3F)—O2 | (2-10) | 8% |
| 3-HH-V | (3-1) | 27% |
| 3-HH-V1 | (3-1) | 6% |
| V-HHB-1 | (3-5) | 3% |

NI = 78.1° C.;
Tc < −30° C.;
Δn = 0.107;
Δε = −3.2;
Vth = 2.02 V;
η = 15.9 mPa · s.

| Composition M4 | | |
|---|---|---|
| 3-HB(2F,3F)—O2 | (2-1) | 10% |
| 5-HB(2F,3F)—O2 | (2-1) | 10% |
| 3-H2B(2F,3F)—O2 | (2-2) | 8% |
| 5-H2B(2F,3F)—O2 | (2-2) | 8% |
| 2-HBB(2F,3F)—O2 | (2-10) | 6% |
| 3-HBB(2F,3F)—O2 | (2-10) | 8% |
| 4-HBB(2F,3F)—O2 | (2-10) | 7% |
| 5-HBB(2F,3F)—O2 | (2-10) | 7% |
| 3-HDhB(2F,3F)—O2 | (2-16) | 5% |
| 3-HH-4 | (3-1) | 14% |
| V-HHB-1 | (3-5) | 10% |
| 3-HBB-2 | (3-6) | 7% |

NI = 88.5° C.;
Tc < −30° C.;
Δn = 0.108;
Δε = −3.8;
Vth = 2.25 V;
η = 24.6 mPa · s;
VHR-1 = 99.1%;
VHR-2 = 98.2%;
VHR-3 = 97.8%.

| Composition M5 | | |
|---|---|---|
| 3-HB(2F,3F)—O2 | (2-1) | 7% |
| 3-HB(2F,3F)—O4 | (2-1) | 8% |
| 3-H2B(2F,3F)—O2 | (2-2) | 8% |
| 3-BB(2F,3F)—O2 | (2-4) | 10% |
| 2-HHB(2F,3F)—O2 | (2-6) | 4% |
| 3-HHB(2F,3F)—O2 | (2-6) | 7% |
| 3-HHB(2F,3F)-1 | (2-6) | 6% |
| 2-HBB(2F,3F)—O2 | (2-10) | 6% |
| 3-HBB(2F,3F)—O2 | (2-10) | 6% |
| 4-HBB(2F,3F)—O2 | (2-10) | 5% |
| 5-HBB(2F,3F)—O2 | (2-10) | 4% |
| 3-HEB(2F,3F)B(2F,3F)—O2 | (2-11) | 3% |
| 3-H1OCro(7F,8F)-5 | (2-14) | 3% |
| 3-HDhB(2F,3F)—O2 | (2-16) | 5% |
| 3-HH—O1 | (3-1) | 5% |
| 1-BB-5 | (3-3) | 4% |
| V-HHB-1 | (3-5) | 4% |
| 5-HB(F)BH-3 | (3-12) | 5% |

NI = 81.1° C.;
Tc < −30° C.;
Δn = 0.119;
Δε = −4.5;
Vth = 1.69 V;
η = 31.4 mPa · s.

| Composition M6 | | |
|---|---|---|
| 3-HB(2F,3F)—O4 | (2-1) | 15% |
| 3-HBB(2F,3F)—O2 | (2-10) | 8% |
| 4-HBB(2F,3F)—O2 | (2-10) | 5% |
| 5-HBB(2F,3F)—O2 | (2-10) | 7% |
| 3-dhBB(2F,3F)—O2 | (2-17) | 5% |
| 3-chB(2F,3F)—O2 | (2-18) | 7% |
| 2-HchB(2F,3F)—O2 | (2-19) | 8% |
| 5-HH-V | (3-1) | 18% |
| 7-HB-1 | (3-2) | 5% |
| V-HHB-1 | (3-5) | 7% |
| V2-HHB-1 | (3-5) | 7% |
| 3-HBB(F)B-3 | (3-13) | 8% |

NI = 98.8° C.;
Tc < −30° C.;
Δn = 0.111;
Δε = −3.2;
Vth = 2.47 V;
η = 23.9 mPa · s.

| Composition M7 | | |
|---|---|---|
| 3-H2B(2F,3F)—O2 | (2-2) | 18% |
| 5-H2B(2F,3F)—O2 | (2-2) | 17% |
| 3-HHB(2F,3Cl)—O2 | (2-12) | 5% |
| 3-HBB(2F,3Cl)—O2 | (2-13) | 8% |
| 5-HBB(2F,3Cl)—O2 | (2-13) | 7% |
| 3-HDhB(2F,3F)—O2 | (2-16) | 5% |
| 3-HH-V | (3-1) | 11% |
| 3-HH-VFF | (3-1) | 7% |
| F3-HH-V | (3-1) | 10% |
| 3-HHEH-3 | (3-4) | 4% |
| 3-HB(F)HH-2 | (3-10) | 4% |
| 3-HHEBH-3 | (3-11) | 4% |

NI = 77.5° C.;
Tc < −30° C.;
Δn = 0.084;
Δε = −2.6;
Vth = 2.43 V;
η = 22.8 mPa · s.

| Composition M8 | | |
|---|---|---|
| 3-HB(2F,3F)—O2 | (2-1) | 8% |
| 3-H2B(2F,3F)—O2 | (2-2) | 10% |
| 3-BB(2F,3F)—O2 | (2-4) | 10% |
| 2O-BB(2F,3F)—O2 | (2-4) | 3% |
| 2-HHB(2F,3F)—O2 | (2-6) | 4% |
| 3-HHB(2F,3F)—O2 | (2-6) | 7% |
| 2-HHB(2F,3F)-1 | (2-6) | 5% |
| 2-BB(2F,3F)B-3 | (2-9) | 6% |
| 2-BB(2F,3F)B-4 | (2-9) | 6% |
| 2-HBB(2F,3F)—O2 | (2-10) | 4% |
| 3-HBB(2F,3F)—O2 | (2-10) | 7% |
| 3-HH1OCro(7F,8F)-5 | (2-15) | 4% |
| 3-HDhB(2F,3F)—O2 | (2-16) | 6% |
| 3-dhBB(2F,3F)—O2 | (2-17) | 4% |
| 3-HH-V | (3-1) | 11% |
| 1-BB-5 | (3-3) | 5% |

NI = 70.6° C.;
Tc < −20° C.;
Δn = 0.129;
Δε = −4.3;
Vth = 1.69 V;
η = 27.0 mPa · s.

| Composition M9 | | |
|---|---|---|
| 3-HB(2F,3F)—O4 | (2-1) | 14% |
| 3-H1OB(2F,3F)—O2 | (2-3) | 3% |

-continued

| Composition M9 | | |
|---|---|---|
| 3-BB(2F,3F)—O2 | (2-4) | 10% |
| 2-HHB(2F,3F)—O2 | (2-6) | 7% |
| 3-HHB(2F,3F)—O2 | (2-6) | 7% |
| 3-HH1OB(2F,3F)—O2 | (2-8) | 6% |
| 2-HBB(2F,3F)—O2 | (2-10) | 4% |
| 3-HBB(2F,3F)—O2 | (2-10) | 6% |
| 4-HBB(2F,3F)—O2 | (2-10) | 4% |
| 3-HH-V | (3-1) | 14% |
| 1-BB-3 | (3-3) | 3% |
| 3-HHB-1 | (3-5) | 4% |
| 3-HHB—O1 | (3-5) | 4% |
| V-HBB-2 | (3-6) | 4% |
| 1-BB(F)B-2V | (3-8) | 6% |
| 5-HBBH-1O1 | (—) | 4% |

NI = 93.0° C.;
Tc < −30° C.;
Δn = 0.123;
Δε = −4.0;
Vth = 2.27 V;
η = 29.6 mPa · s.

| Composition M10 | | |
|---|---|---|
| 3-HB(2F,3F)—O4 | (2-1) | 6% |
| 3-H2B(2F,3F)—O2 | (2-2) | 8% |
| 3-H1OB(2F,3F)—O2 | (2-3) | 5% |
| 3-BB(2F,3F)—O2 | (2-4) | 10% |
| 2-HHB(2F,3F)—O2 | (2-6) | 7% |
| 3-HHB(2F,3F)—O2 | (2-6) | 7% |
| 5-HHB(2F,3F)—O2 | (2-6) | 7% |
| 2-HBB(2F,3F)—O2 | (2-10) | 4% |
| 3-HBB(2F,3F)—O2 | (2-10) | 7% |
| 5-HBB(2F,3F)—O2 | (2-10) | 6% |
| 3-HH-V | (3-1) | 11% |
| 1-BB-3 | (3-3) | 6% |
| 3-HHB-1 | (3-5) | 4% |
| 3-HHB—O1 | (3-5) | 4% |
| 3-HBB-2 | (3-6) | 4% |
| 3-B(F)BB-2 | (3-7) | 4% |

NI = 87.6° C.;
Tc < −30° C.;
Δn = 0.126;
Δε = −4.5;
Vth = 2.21 V;
η = 25.3 mPa · s.

| Composition M11 | | |
|---|---|---|
| 3-HB(2F,3F)—O4 | (2-1) | 6% |
| 3-H2B(2F,3F)—O2 | (2-2) | 8% |
| 3-H1OB(2F,3F)—O2 | (2-3) | 4% |
| 3-BB(2F,3F)—O2 | (2-4) | 7% |
| 2-HHB(2F,3F)—O2 | (2-6) | 6% |
| 3-HHB(2F,3F)—O2 | (2-6) | 10% |
| 5-HHB(2F,3F)—O2 | (2-6) | 8% |
| 2-HBB(2F,3F)—O2 | (2-10) | 5% |
| 3-HBB(2F,3F)—O2 | (2-10) | 7% |
| 5-HBB(2F,3F)—O2 | (2-10) | 5% |
| 2-HH-3 | (3-1) | 12% |
| 1-BB-3 | (3-3) | 6% |
| 3-HHB-1 | (3-5) | 3% |
| 3-HHB—O1 | (3-5) | 4% |
| 3-HBB-2 | (3-6) | 6% |
| 3-B(F)BB-2 | (3-7) | 3% |

NI = 93.0° C.;
Tc < −20° C.;
Δn = 0.124;
Δε = −4.5;
Vth = 2.22 V;
η = 25.0 mPa · s.

| Composition M12 | | |
|---|---|---|
| 3-HB(2F,3F)—O2 | (2-1) | 7% |
| 5-HB(2F,3F)—O2 | (2-1) | 7% |
| 3-BB(2F,3F)—O2 | (2-4) | 8% |
| 3-HHB(2F,3F)—O2 | (2-6) | 4% |
| 5-HHB(2F,3F)—O2 | (2-6) | 5% |
| 3-HH1OB(2F,3F)—O2 | (2-8) | 5% |
| 2-BB(2F,3F)B-3 | (2-9) | 4% |
| 2-HBB(2F,3F)—O2 | (2-10) | 3% |
| 3-HBB(2F,3F)—O2 | (2-10) | 8% |
| 4-HBB(2F,3F)—O2 | (2-10) | 5% |
| 5-HBB(2F,3F)—O2 | (2-10) | 8% |
| 3-HH-V | (3-1) | 33% |
| V-HHB-1 | (3-5) | 3% |

NI = 76.4° C.;
Tc < −30° C.;
Δn = 0.104;
Δε = −3.2;
Vth = 2.06 V;
η = 15.6 mPa · s.

| Composition M13 | | |
|---|---|---|
| 2-H1OB(2F,3F)—O2 | (2-3) | 6% |
| 3-H1OB(2F,3F)—O2 | (2-3) | 4% |
| 3-BB(2F,3F)—O2 | (2-4) | 3% |
| 2-HH1OB(2F,3F)—O2 | (2-8) | 14% |
| 2-HBB(2F,3F)—O2 | (2-10) | 7% |
| 3-HBB(2F,3F)—O2 | (2-10) | 11% |
| 5-HBB(2F,3F)—O2 | (2-10) | 9% |
| 2-HH-3 | (3-1) | 5% |
| 3-HH-VFF | (3-1) | 30% |
| 1-BB-3 | (3-3) | 5% |
| 3-HHB-1 | (3-5) | 3% |
| 3-HBB-2 | (3-6) | 3% |

NI = 78.3° C.;
Tc < −20° C.;
Δn = 0.103;
Δε = −3.2;
Vth = 2.17 V;
η = 17.7 mPa · s.

| Composition M14 | | |
|---|---|---|
| 3-HB(2F,3F)—O2 | (2-1) | 5% |
| 5-HB(2F,3F)—O2 | (2-1) | 7% |
| 3-BB(2F,3F)—O2 | (2-4) | 8% |
| 3-HHB(2F,3F)—O2 | (2-6) | 5% |
| 5-HHB(2F,3F)—O2 | (2-6) | 4% |
| 3-HH1OB(2F,3F)—O2 | (2-8) | 5% |
| 2-BB(2F,3F)B-3 | (2-9) | 4% |
| 2-HBB(2F,3F)—O2 | (2-10) | 3% |
| 3-HBB(2F,3F)—O2 | (2-10) | 9% |
| 4-HBB(2F,3F)—O2 | (2-10) | 4% |
| 5-HBB(2F,3F)—O2 | (2-10) | 8% |
| 3-HH-V | (3-1) | 27% |
| 3-HH-V1 | (3-1) | 6% |
| V-HHB-1 | (3-5) | 5% |

NI = 81.2° C.;
Tc < −20° C.;
Δn = 0.107;
Δε = −3.2;
Vth = 2.11 V;
η = 15.5 mPa · s.

| Composition M15 | | |
|---|---|---|
| 3-H2B (2F, 3F)—O2 | (2-2) | 7% |
| 3-HHB (2F, 3F)—O2 | (2-6) | 8% |
| 3-HH1OB (2F, 3F)—O2 | (2-8) | 5% |

Composition M15

| | | |
|---|---|---|
| 2-BB (2F, 3F)B-3 | (2-9) | 7% |
| 2-BB(2F,3F)B-4 | (2-9) | 7% |
| 3-HDhB(2F,3F)—O2 | (2-16) | 3% |
| 5-HDhB(2F,3F)—O2 | (2-16) | 4% |
| 2-HchB(2F,3F)—O2 | (2-19) | 8% |
| 4-HH-V | (3-1) | 15% |
| 3-HH-V1 | (3-1) | 6% |
| 1-HH-2V1 | (3-1) | 6% |
| 3-HH-2V1 | (3-1) | 4% |
| V2-BB-1 | (3-3) | 5% |
| 1V2-BB-1 | (3-3) | 5% |
| 3-HHB-1 | (3-5) | 6% |
| 3-HB(F)BH-3 | (3-12) | 4% |

NI = 88.7° C.;
Tc < −30° C.;
Δn = 0.115;
Δε = −1.9;
Vth = 2.82 V;
η = 17.3 mPa · s.

Composition M16

| | | |
|---|---|---|
| V2-H2B(2F,3F)—O2 | (2-2) | 8% |
| V2-H1OB(2F,3F)—O4 | (2-3) | 4% |
| 3-BB(2F,3F)—O2 | (2-4) | 7% |
| 2-HHB(2F,3F)—O2 | (2-6) | 7% |
| 3-HHB(2F,3F)—O2 | (2-6) | 7% |
| 3-HH2B(2F,3F)—O2 | (2-7) | 7% |
| 5-HH2B(2F,3F)—O2 | (2-7) | 4% |
| V-HH2B(2F,3F)—O2 | (2-7) | 6% |
| V2-HBB(2F,3F)—O2 | (2-10) | 5% |
| V-HBB(2F,3F)—O2 | (2-10) | 5% |
| V-HBB(2F,3F)—O4 | (2-10) | 6% |
| 2-HH-3 | (3-1) | 12% |
| 1-BB-5 | (3-3) | 12% |
| 3-HHB-1 | (3-5) | 4% |
| 3-HHB—O1 | (3-5) | 3% |
| 3-HBB-2 | (3-6) | 3% |

NI = 89.9° C.;
Tc < −20° C.;
Δn = 0.122;
Δε = −4.2;
Vth = 2.16 V;
η = 23.4 mPa · s.

Composition M17

| | | |
|---|---|---|
| 3-HB(2F,3F)—O2 | (2-1) | 3% |
| V-HE(2F,3F)—O2 | (2-1) | 3% |
| V2-HB(2F,3F)—O2 | (2-1) | 5% |
| 5-H2B(2F,3F)—O2 | (2-2) | 5% |
| V2-BB(2F,3F)—O2 | (2-4) | 3% |
| 1V2-BB(2F,3F)—O2 | (2-4) | 3% |
| 3-HHB(2F,3F)—O2 | (2-6) | 6% |
| V-HHB(2F,3F)—O2 | (2-6) | 6% |
| V-HHB(2F,3F)—O4 | (2-6) | 5% |
| V2-HHB(2F,3F)—O2 | (2-6) | 4% |
| V2-BB(2F,3F)B-1 | (2-9) | 4% |
| V2-HBB(2F,3F)—O2 | (2-10) | 5% |
| V-HBB(2F,3F)—O2 | (2-10) | 4% |
| V-HBB(2F,3F)—O4 | (2-10) | 5% |
| V-HHB(2F,3C1)—O2 | (2-12) | 3% |
| 3-HH-V | (3-1) | 27% |
| 3-HH-V1 | (3-1) | 6% |
| V-HHB-1 | (3-5) | 3% |

NI = 77.1° C.;
Tc < −20° C.;
Δn = 0.101;
Δε = −3.0;
Vth = 2.04 V;
η = 13.9 mPa · s.

Composition M18

| | | |
|---|---|---|
| V-HB(2F,3F)—O2 | (2-1) | 10% |
| V2-HB(2F,3F)—O2 | (2-1) | 10% |
| 2-H1OB(2F,3F)—O2 | (2-3) | 3% |
| 3-H1OB(2F,3F)—O2 | (2-3) | 3% |
| 2O-BB(2F,3F)—O2 | (2-4) | 3% |
| V2-BB(2F,3F)—O2 | (2-4) | 8% |
| V2-HHB(2F,3F)—O2 | (2-6) | 5% |
| 2-HBB(2F,3F)—O2 | (2-10) | 3% |
| 3-HBB(2F,3F)—O2 | (2-10) | 3% |
| V-HBB(2F,3F)—O2 | (2-10) | 6% |
| V-HBB(2F,3F)—O4 | (2-10) | 8% |
| V-HHB(2F,3C1)—O2 | (2-12) | 7% |
| 3-HH-4 | (3-1) | 14% |
| V-HHB-1 | (3-5) | 10% |
| 3-HBB-2 | (3-6) | 7% |

NI = 75.9° C.;
Tc < −20° C.;
Δn = 0.114;
Δε = −3.9;
Vth = 2.20 V;
η = 24.7 mPa · s.

The first additive includes polar compounds (PC-1) to (PC-12) and (preAIO-1) to (AIO-4).

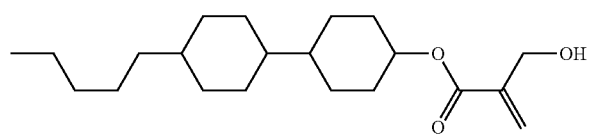

(PC-1)

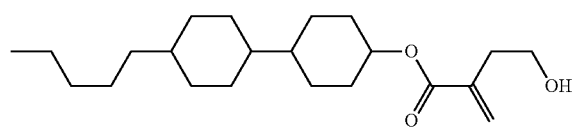

(PC-2)

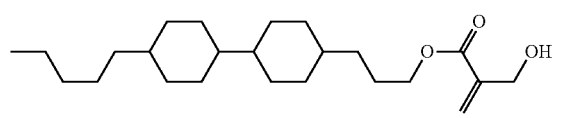

(PC-3)

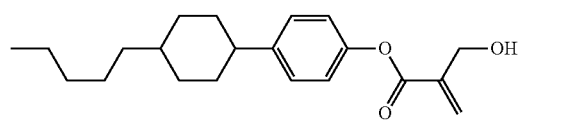

(PC-4)

-continued
(PC-5)
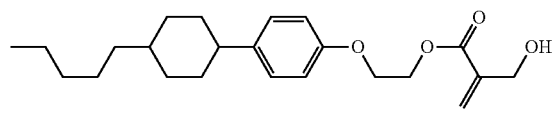
(PC-6)
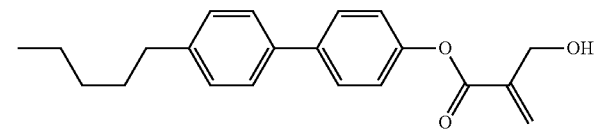
(PC-7)
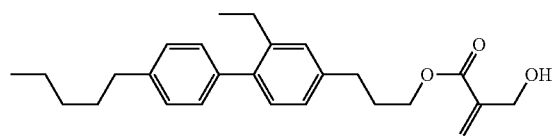
(PC-8)
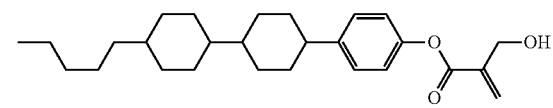
(PC-9)
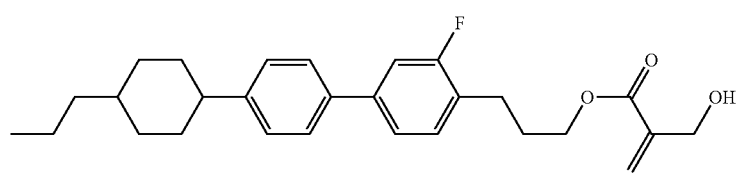
(PC-10)
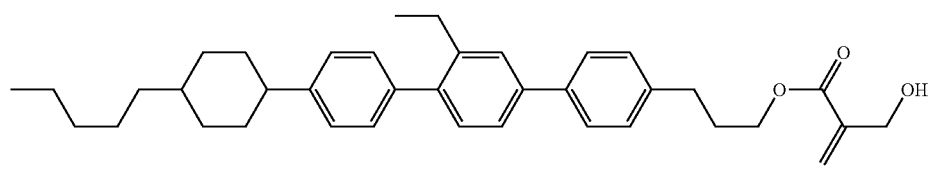
(PC-11)
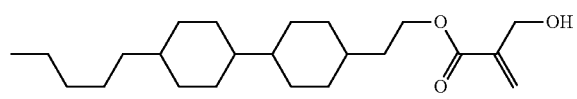
(PC-12)
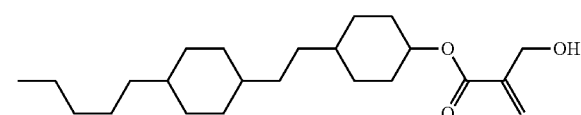
preAIO-1
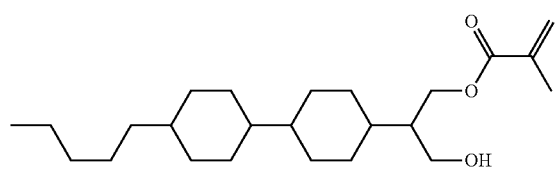
AIO-1
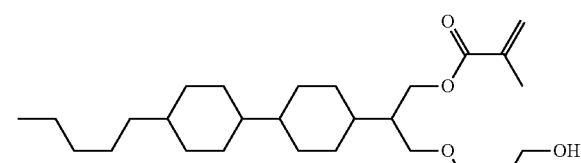
AIO-3
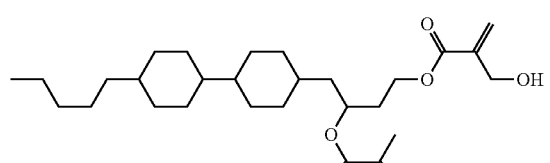
preAIO-3
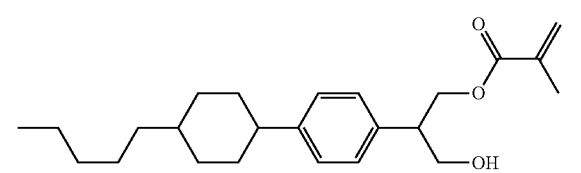
AIO-5
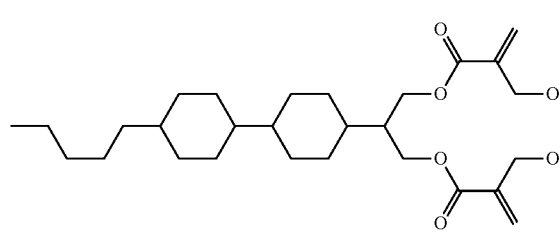
preAIO-3
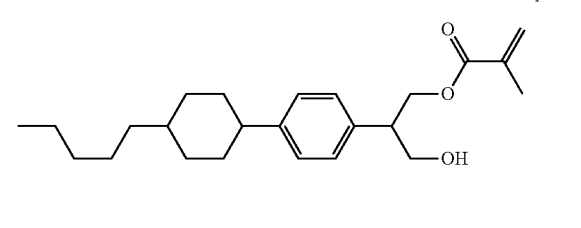

AIO-4

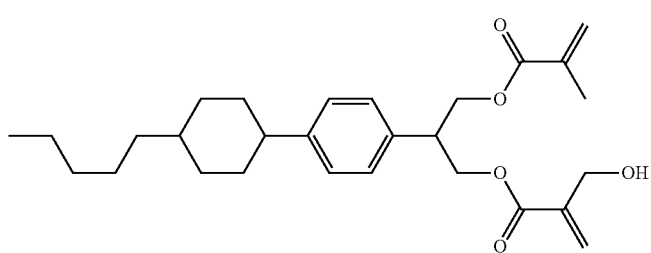

The second additive includes polymerizable compounds (RM-1) to (RM-9).

(RM-1)

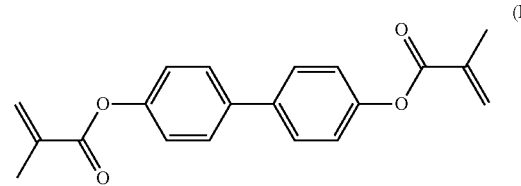

(RM-2)

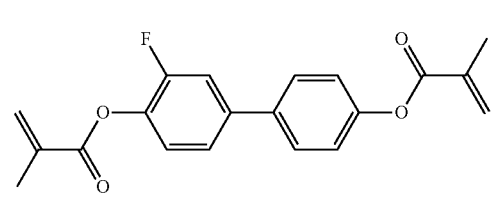

(RM-3)

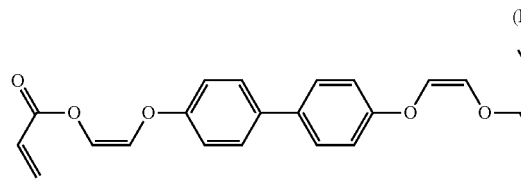

(RM-4)

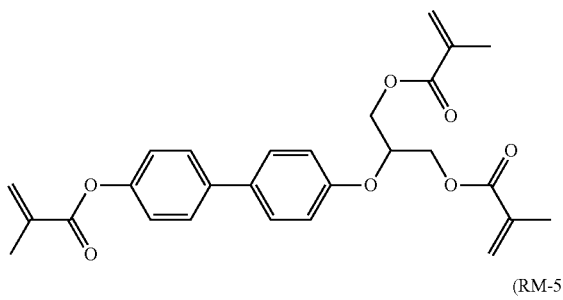

(RM-5)

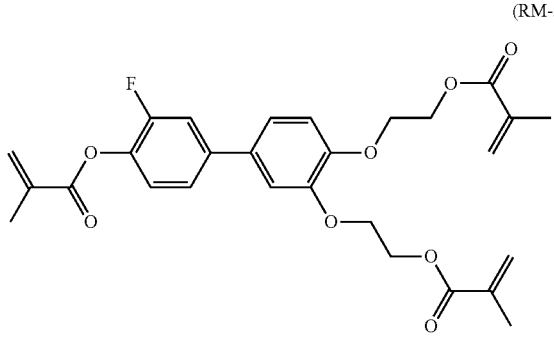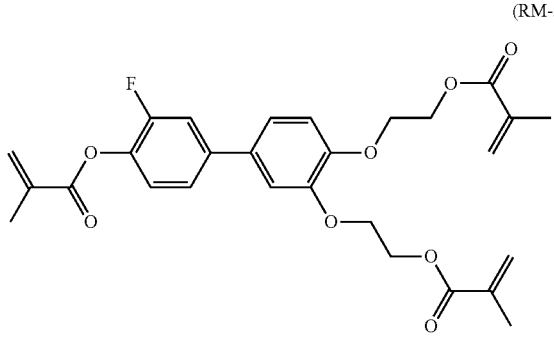

(RM-6)

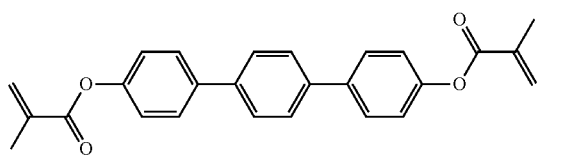

(RM-7)

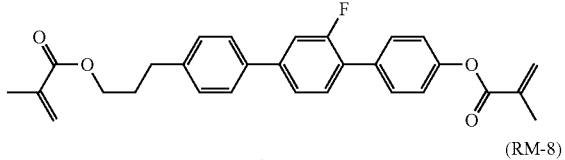

(RM-8)

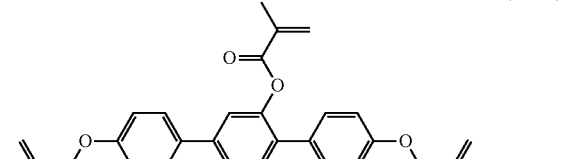

(RM-9)

2. Vertical Alignment of Liquid Crystal Molecules

Example 1

Polar compound (PC-1) was added to composition (M51) in a proportion of 1% by weight, and further polymerizable compound (RM-1) was added thereto in a proportion of 0.3% by weight. The resulting mixture was injected in vacuum into a device having no alignment film in which a distance (cell gap) between two glass substrates was 3.5 micrometers. Polar compound (PC-1) was polymerized by irradiating the device with ultraviolet light (1.4 J/cm$^2$) using light source 1 of a UV1 light source described in the following Table 4. Subsequently, in order to allow an unreacted polar compound and an unreacted polymerizable compound to react, the device was irradiated with ultraviolet light (15 J/cm$^2$) using a UV2 light source (black light; F40T10/BL U-355). Then, VHR and a pretilt angle in the device were measured according to the method mentioned above. VHR was 86.4% and the pretilt angle was 0.9 degree.

TABLE 4

Kind of UV1 light source

| UV1 light source | Lamp | Quantity of light/ mW/cm² 254 nm | Quantity of light/ mW/cm² 313 nm | Accumulated light quantity ratio 313/254 |
|---|---|---|---|---|
| Light source 1 | Metal halide lamp M08-L41C (made by EYE GRAPHICS Co., Ltd.) | 0.02 | 2.4 | 120 |
| Light source 2 | Black light F40T10/BL U-355 (made by EYE GRAPHICS Co., Ltd.) | 0.02 | 1.5 | 75 |
| Light source 3 | Black light F40T10/BL U-335 (made by EYE GRAPHICS Co., Ltd.) | 0.03 | 2.2 | 73 |
| Light source 4 | Metal halide lamp M08-L41C (made by EYE GRAPHICS Co., Ltd.) | 0.72 | 44 | 61 |
| Light source 5 | Metal halide lamp M08-L41C (made by EYE GRAPHICS Co., Ltd.) | 22.0 | 50 | 2.3 |
| Light source 6 | Metal halide lamp M08-L41C (made by EYE GRAPHICS Co., Ltd.) | 27.5 | 50 | 1.8 |

Measurement of a quantity of light: Accumulated UV Meter UIT-250 made by USHIO INC.

Examples 2 to 39 and Comparative Examples 1 to 27

In Examples 2 to 39 and Comparative Examples 1 to 27, a device having no alignment film was prepared in a manner similar to Example 1 except that a mixture prepared by adding a polar compound and a polymerizable compound to the composition shown in Table 5 and cell preparation conditions were applied as shown in Table 5. VHR and a pretilt angle were measured in a manner similar to the method in Example 1. The results are summarized in Table 5, including Example 1.

TABLE 5

Evaluation results

| Example | Light source | Accumulated light quantity ratio (313 nm/ 254 nm) | Irradiation (@313 nm) | Applied voltage | Liquid crystal composition | Polar compound Compound | Polar compound Amount of addition | Polymerizable compound Compound | Polymerizable compound Amount of addition | VHR | Pt angle |
|---|---|---|---|---|---|---|---|---|---|---|---|
| Example 1 | Light source 1 | 120 | 1.4 J/cm² | 14.4 V | M51 | PC-1 | 1 wt % | RM-1 | 0.3 wt % | 86.4 | 0.9 |
| Example 2 | | | | | M53 | PC-2 | 3 wt % | RM-6 | 0.2 wt % | 95.0 | 1.5 |
| Example 3 | | | | | M53 | PC-3 | 3 wt % | RM-6 | 0.2 wt % | 83.7 | 4.8 |
| Example 4 | | | | | M53 | PC-4 | 3 wt % | RM-6 | 0.2 wt % | 81.0 | 3.2 |
| Example 5 | | | | | M53 | PC-9 | 3 wt % | RM-6 | 0.2 wt % | 80.2 | 0.8 |
| Example 6 | | | | | M54 | PC-2 | 3 wt % | RM-6 | 0.2 wt % | 96.0 | 3.6 |
| Example 7 | | | | | M55 | PC-2 | 3 wt % | RM-2 | 0.3 wt % | 92.3 | 0.7 |
| Example 8 | | | | | M55 | PC-2 | 3 wt % | RM-3 | 0.2 wt % | 96.2 | 3.0 |
| Example 9 | | | | | M56 | PC-2 | 3 wt % | RM-6 | 0.2 wt % | 84.1 | 4.7 |
| Example 10 | | | | | M57 | PC-2 | 3 wt % | RM-6 | 0.2 wt % | 82.6 | 4.2 |
| Example 11 | | | | | M54 | PC-2 | 3 wt % | — | — | 88.5 | 2.2 |
| Example 12 | Light source 2 | 75 | 1.6 J/cm² | 10.4 V | M51 | PC-1 | 1 wt % | RM-1 | 0.3 wt % | 93.5 | 1.1 |
| Example 13 | | | | | M52 | PC-1 | 2 wt % | RM-1 | 0.3 wt % | 91.9 | 1.0 |
| Example 14 | | | | | M53 | PC-2 | 3 wt % | RM-6 | 0.2 wt % | 90.0 | 2.8 |
| Example 15 | | | | | M54 | PC-2 | 3 wt % | RM-6 | 0.2 wt % | 95.1 | 2.9 |
| Example 16 | | | | | M55 | PC-2 | 3 wt % | RM-2 | 0.3 wt % | 89.9 | 0.8 |
| Example 17 | | | | | M58 | PC-2 | 3 wt % | RM-6 | 0.2 wt % | 95.7 | 4.4 |
| Example 18 | Light source 3 | 73 | 1.9 J/cm² | 10.4 V | M51 | PC-1 | 1 wt % | RM-1 | 0.3 wt % | 92.5 | 1.0 |
| Example 19 | | | | | M53 | PC-2 | 3 wt % | RM-6 | 0.2 wt % | 89.6 | 3.0 |
| Example 20 | | | | | M53 | PC-5 | 3 wt % | RM-6 | 0.2 wt % | 81.2 | 4.3 |
| Example 21 | | | | | M54 | PC-2 | 3 wt % | RM-6 | 0.2 wt % | 88.7 | 2.8 |
| Example 22 | | | | | M54 | PC-2 | 3 wt % | RM-3 | 0.2 wt % | 90.5 | 3.5 |
| Example 23 | | | | | M58 | PC-2 | 3 wt % | RM-6 | 0.2 wt % | 93.1 | 4.2 |
| Example 24 | Light source 4 | 61 | 2.5 J/cm² | 7.6 V | M51 | PC-1 | 1 wt % | RM-1 | 0.3 wt % | 85.2 | 1.2 |
| Example 25 | | | | | M53 | PC-2 | 3 wt % | RM-6 | 0.2 wt % | 85.4 | 3.8 |
| Example 26 | | | | | M54 | PC-2 | 3 wt % | RM-6 | 0.2 wt % | 83.1 | 2.0 |
| Example 27 | | | | | M55 | PC-2 | 3 wt % | RM-3 | 0.2 wt % | 88.7 | 4.7 |
| Example 28 | | | | | M55 | PC-2 | 3 wt % | RM-4 | 0.2 wt % | 85.1 | 4.3 |
| Example 29 | Light source 2 | 75 | 1.6 J/cm² | 0.0 V | M54 | PC-2 | 3 wt % | RM-3 | 0.2 wt % | 94.4 | 0 |
| Example 30 | | | | | M54 | PC-11 | 3 wt % | RM-3 | 0.2 wt % | 93.4 | 0 |
| Example 31 | | | | | M54 | PC-12 | 3 wt % | RM-3 | 0.2 wt % | 91.9 | 0 |
| Example 32 | Light source 1 | 120 | 7.2 J/cm² | 14.4 V | M51 | AIO-1 | 3 wt % | — | — | 92.3 | 1.5 |
| Example 33 | | | | | M53 | AIO-4 | 3 wt % | RM-3 | 0.3 wt % | 91.8 | 1.0 |

TABLE 5-continued

Evaluation results

| Example | Cell preparation condition | | | | Liquid crystal composition | Polar compound | | Polymerizable compound | | VHR | Pt angle |
|---|---|---|---|---|---|---|---|---|---|---|---|
| | Light source | Accumulated light quantity ratio (313 nm/254 nm) | Irradiation (@313 nm) | Applied voltage | | Compound | Amount of addition | Compound | Amount of addition | | |
| Example 34 | Light source 2 | 75 | 3.7 J/cm² | 10.4 V | M51 | AIO-3 | 3 wt % | — | — | 92.2 | 1.7 |
| Example 35 | Light source 2 | 73 | 2.5 J/cm² | 10.4 V | M51 | preAIO-3 | 5 wt % | — | — | 94.1 | 2.4 |
| Example 36 | Light source 3 | | | | M54 | AIO-5 | 0.3 wt % | — | — | 92.2 | 2.8 |
| Example 37 | Light source 3 | 75 | 3.7 J/cm² | 0.0 V | M54 | preAIO-1 | 3 wt % | RM-3 | 0.3 wt % | 86.1 | 0 |
| Example 38 | source | | | | M54 | AIO-3 | 3 wt % | — | — | 81.8 | 0 |
| Example 39 | 2 | | | | M52 | AIO-1 | 3 wt % | — | — | 84.9 | 0 |
| Comparative Example 1 | Light source 5 | 2.3 | 2.5 J/cm² | 7.6 V | M51 | PC-1 | 1 wt % | RM-1 | 0.3 wt % | 65.3 | 1.2 |
| Comparative Example 2 | | | | | M52 | PC-1 | 2 wt % | RM-1 | 0.3 wt % | 24.3 | 0.4 |
| Comparative Example 3 | | | | | M53 | PC-2 | 3 wt % | RM-6 | 0.2 wt % | 79.6 | 4.2 |
| Comparative Example 4 | | | | | M53 | PC-3 | 3 wt % | RM-6 | 0.2 wt % | 18.3 | 2.2 |
| Comparative Example 5 | | | | | M53 | PC-4 | 3 wt % | RM-6 | 0.2 wt % | 11.2 | 4.3 |
| Comparative Example 6 | | | | | M54 | PC-2 | 3 wt % | RM-6 | 0.2 wt % | 58.0 | 1.6 |
| Comparative Example 7 | | | | | M55 | PC-2 | 3 wt % | RM-3 | 0.2 wt % | 76.5 | 4.6 |
| Comparative Example 8 | | | | | M55 | PC-2 | 3 wt % | RM-4 | 0.2 wt % | 75.1 | 4.0 |
| Comparative Example 9 | | | | | M56 | PC-2 | 3 wt % | RM-6 | 0.2 wt % | 15.4 | 1.6 |
| Comparative Example 10 | Light source 6 | 1.8 | 2.5 J/cm² | 7.6 V | M51 | PC-1 | 1 wt % | RM-1 | 0.3 wt % | 42.0 | 0.6 |
| Comparative Example 11 | | | | | M53 | PC-5 | 3 wt % | RM-6 | 0.2 wt % | 14.5 | 3.0 |
| Comparative Example 12 | | | | | M53 | PC-9 | 3w1% | RM-6 | 0.2 wt % | 14.8 | 0.6 |
| Comparative Example 13 | | | | | M54 | PC-2 | 3 wt % | RM-6 | 0.2 wt % | 40.2 | 2.3 |
| Comparative Example 14 | | | | | M54 | PC-2 | 3 wt % | RM-3 | 0.2 wt % | 61.1 | 3.0 |
| Comparative Example 15 | | | | | M55 | PC-2 | 3 wt % | RM-2 | 0.3 wt % | 69.5 | 4.6 |
| Comparative Example 16 | | | | | M55 | PC-2 | 3 wt % | RM-3 | 0.2 wt % | 74.7 | 4.8 |
| Comparative Example 17 | | | | | M57 | PC-2 | 3 wt % | RM-6 | 0.2 wt % | 14.5 | 2.3 |
| Comparative Example 18 | | | | | M58 | PC-2 | 3 wt % | RM-6 | 0.2 wt % | 62.3 | 3.7 |
| Comparative Example 19 | | | | | M54 | PC-2 | 3 wt % | — | — | 66.5 | 1.6 |
| Comparative Example 20 | Light source 1 | 120 | 1.4 J/cm² | 25.6 V | M53 | PC-2 | 3 wt % | RM-6 | 0.2 wt % | 92.7 | 5.9 |
| Comparative Example 21 | | | | 30.0 V | M53 | PC-2 | 3 wt % | RM-6 | 0.2 wt % | 92.8 | >10 |
| Comparative Example 22 | Light source 2 | 75 | 1.6 J/cm² | 25.6 V | M54 | PC-2 | 3 wt % | RM-6 | 0.2 wt % | 94.8 | 6.2 |
| Comparative Example 23 | | | | 30.0 V | M54 | PC-2 | 3 wt % | RM-6 | 0.2 wt % | 94.6 | >10 |
| Comparative Example 24 | Light source 3 | 73 | 1.9 J/cm² | 30.0 V | M53 | PC-2 | 3 wt % | RM-6 | 0.2 wt % | 89.3 | >10 |
| Comparative Example 25 | | | | | M54 | PC-2 | 3 wt % | RM-3 | 0.2 wt % | 90.5 | >10 |
| Comparative Example 26 | Light source 4 | 61 | 2.5 J/cm² | 30.0 V | M53 | PC-2 | 3 wt % | RM-6 | 0.2 wt % | 85.4 | >10 |
| Comparative Example 27 | | | | | M55 | PC-2 | 3 wt % | RM-4 | 0.2 wt % | 84.6 | 6.9 |

The similar results were obtained also in compositions M1 to M18.

As shown in Table 5, in Examples 1 to 39, a kind of the composition or the polar compound was changed, but the device showed 80% or more in VHR, and 0 to 5 degrees in the pretilt angle. The above results indicate that VHR was satisfactory even without the alignment film in the device, and the pretilt angle suitable for display was obtained. On the other hand, in Comparative Examples 1 to 19, VHR was 80% or less, and in Comparative Examples 20 to 27, a pretilt angle was more than 5 degrees. Accordingly, characteristics of an irradiation light source is found to play a role important for quality of the device.

INDUSTRIAL APPLICABILITY

A liquid crystal display device obtained according to the invention can further satisfactorily hold characteristics of a composition, and therefore can be preferably used as a component of various electronic devices such as a liquid crystal projector and a liquid crystal television.

What is claimed is:

1. A method for manufacturing a liquid crystal display device, wherein, upon manufacturing the liquid crystal display device including a pair of substrates that have no alignment film and arranged to face each other, and including a liquid crystal composition containing a liquid crystal compound and a polymerizable compound as a liquid crystal layer formed between the substrates formed of an electrode group formed on either one or both of surfaces faced by each of the pair of substrates, in which at least one of the polymerizable compounds is a compound having a polar anchor group, wherein the polymerizable compound is allowed to react under conditions of 10 or more in an accumulated light quantity ratio of 313 nm/254 nm at 254 nanometers and 313 nanometers to form an alignment control layer.

2. The method for manufacturing the liquid crystal display device according to claim 1, wherein the polymerizable compound is allowed to react while applying voltage.

3. The method for manufacturing the liquid crystal display device according to claim 2, wherein the voltage is 20 V or less.

4. The method for manufacturing the liquid crystal display device according to claim 1, containing at least one polar compound selected from the group of compounds represented by formula (1) and compounds represented by formula (AI-1) as the polymerizable compound:

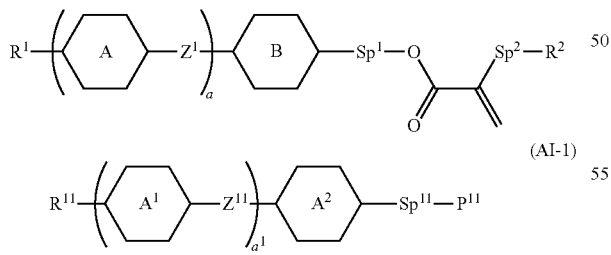

wherein, in formula (1), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $R^2$ is —OH, —OR°, —NH$_2$, —NHR° or a group represented by —N(R°)$_2$, in which R° is alkyl having 1 to 5 carbons, and in the alkyl, at least one piece of —CH$_2$— may be replaced by —O—, and at least one piece of —CH$_2$CH$_2$— may be replaced by —CH=CH—, and in the groups, at least one hydrogen may be replaced by fluorine; ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ is a single bond, —CH$_2$CH$_2$—, —CH=CH—, —C≡C—, —COO—, —OCO—, —CF$_2$O—, —OCF$_2$—, —CH$_2$O—, —OCH$_2$— or —CF=CF—; Sp' and $Sp^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in the groups, at least one hydrogen may be replaced by fluorine; and a is 0, 1, 2, 3 or 4; and in formula (AI-1), $R^{11}$ is alkyl having 1 to 15 carbons, and in $R^{11}$, at least one piece of —CH$_2$— may be replaced by —O— or —S—, at least one piece of —CH$_2$CH$_2$— may be replaced by —CH=CH— or —C≡C—, and at least one hydrogen may be replaced by halogen;

ring $A^1$ and ring $A^2$ are independently 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl or 2,3,4,7,8,9,10,11,12,13,14,15,16,17-tetradecahydrocyclopenta[a]phenanthrene-3,17-diyl, and in the rings, at least one hydrogen may be replaced by fluorine, chlorine, alkyl having 1 to 12 carbons, alkenyl having 2 to 12 carbons, alkoxy having 1 to 11 carbons or alkenyloxy having 2 to 11 carbons, and in the groups, at least one hydrogen may be replaced by fluorine or chlorine;

$a^1$ is 0, 1, 2, 3 or 4;

$Z^{11}$ is a single bond or alkylene having 1 to 6 carbons, and in $Z^{11}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by fluorine or chlorine; and $Sp^{11}$ is a single bond or alkylene having 1 to 10 carbons, and in $Sp^{11}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by halogen, and in the groups, at least one hydrogen is replaced by a group selected from the group of groups represented by formula (1a);

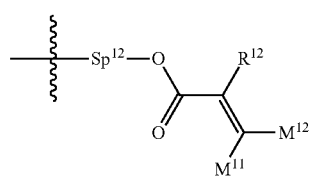
(1a)

wherein, in formula (1a),
Sp$^{12}$ is a single bond or alkylene having 1 to 10 carbons, and in Sp$^{12}$, at least one piece of —CH$_2$— may be replaced by —O—, —CO—, —COO—, —OCO— or —OCOO—, at least one piece of —CH$_2$CH$_2$— may be replaced by —CH=CH— or and at least one hydrogen may be replaced by halogen;
and M$^{12}$ are independently hydrogen, halogen, alkyl having 1 to 5 carbons, or alkyl having 1 to 5 carbons in which at least one hydrogen is replaced by halogen:
R$^{12}$ is alkyl having 1 to 15 carbons, and in R$^{12}$, at least one piece of —CH$_2$— may be replaced by —O— or —S—, at least one piece of —CH$_2$CH$_2$— may be replaced by —CH=CH— or —C≡C—, and at least one hydrogen may be replaced by halogen: and in formula (AI-1),
P$^{11}$ is a group selected from the group of groups represented by formulas (1e) and (1f);

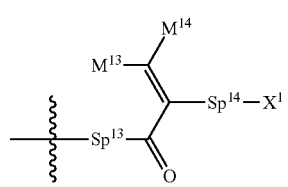
(1e)

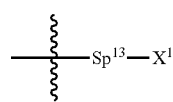
(1f)

wherein, in formulas (1e) and (1f),
Sp$^{13}$ is a single bond or alkylene having 1 to 10 carbons, and in Sp$^{13}$, at least one piece of —CH$_2$— may be replaced by —O—, —NH—, —CO—, —COO—, —OCO— or —OCOO—, and at least one piece of —CH$_2$CH$_2$— may be replaced by —CH=CH— or —C≡C—, and in the groups, at least one hydrogen may be replaced by halogen;
Sp$^{14}$ is independently a single bond or alkylene having 1 to 10 carbons, and in Sp$^{14}$, at least one piece of —CH$_2$— may be replaced by —O—, —NH—, —CO—, —COO—, —OCO— or —OCOO—, at least one piece of —CH$_2$CH$_2$— may be replaced by —CH=CH— or —C≡C—, and at least one hydrogen may be replaced by halogen;
M$^{13}$ and M$^{14}$ are independently hydrogen, halogen, alkyl having 1 to 5 carbons, or alkyl having 1 to 5 carbons in which at least one hydrogen is replaced by halogen:
X$^1$ is —OH, —NH$_2$, —OR$^{15}$, —N(R$^{15}$)$_2$, —COOH, —SH, —B(OH)$_2$ or —Si(R$^{15}$)$_3$; and
in —OR$^{15}$, —N(R$^{15}$)$_2$ and —Si(R$^{15}$)$_3$,
R$^{15}$ is hydrogen or alkyl having 1 to 10 carbons, and in R$^{15}$, at least one piece of —CH$_2$— may be replaced by —O—, at least one piece of —CH$_2$CH$_2$— may be replaced by —CH=CH—, and at least one hydrogen may be replaced by halogen.

5. The method for manufacturing the liquid crystal display device according to claim 1, wherein at least one of the polymerizable compounds is a compound selected from the group of compounds represented by formulas (1-1) to (1-9) and compounds represented by formulas (AI-2) to (AI-21):

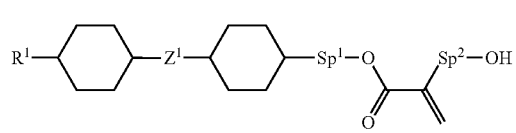
(1-1)

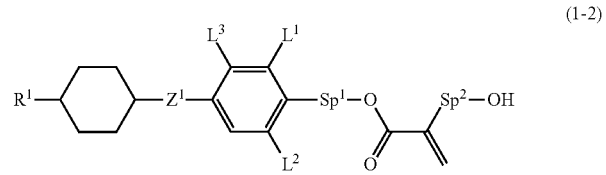
(1-2)

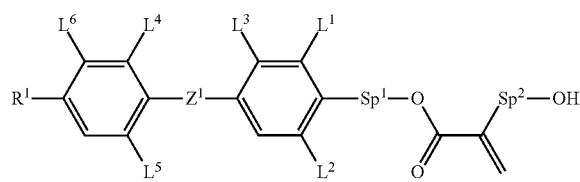
(1-3)

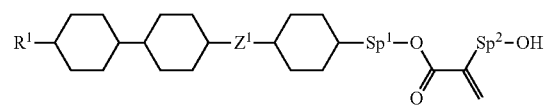
(1-4)

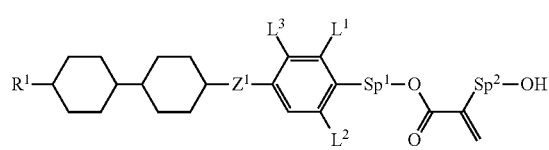
(1-5)

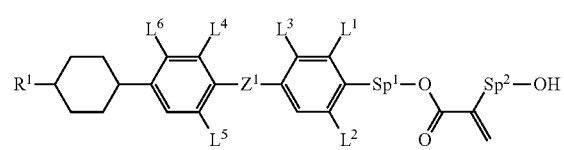
(1-6)

(1-7)
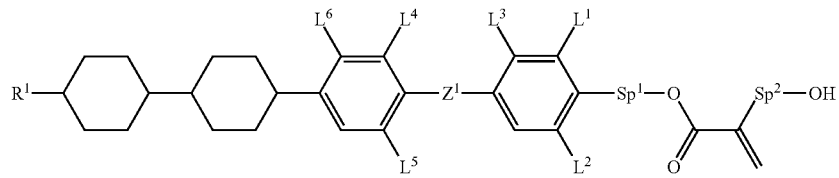
(1-8)
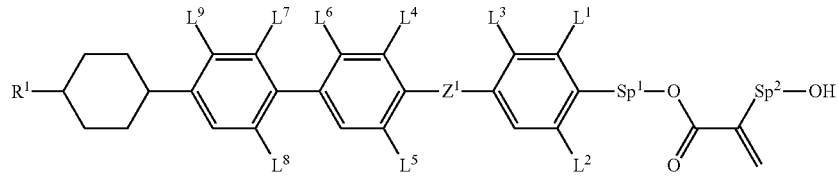
(1-9)
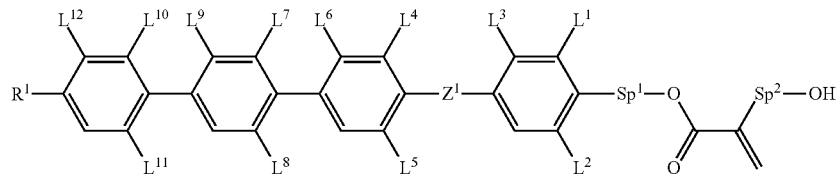
(AI-2) (AI-3)
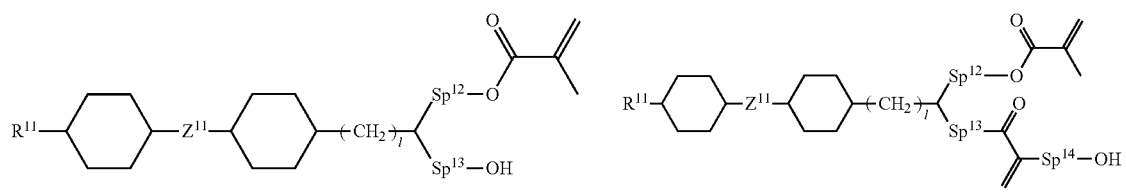
(AI-4) (AI-5)
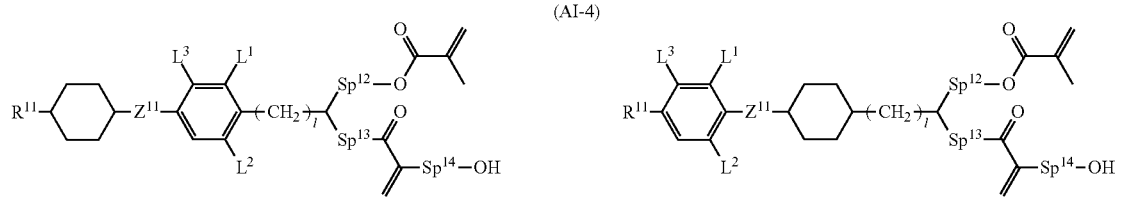
(AI-6)
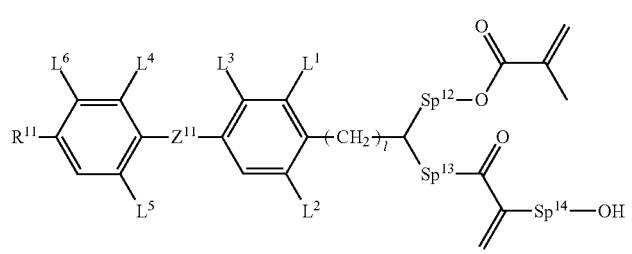
(AI-7)
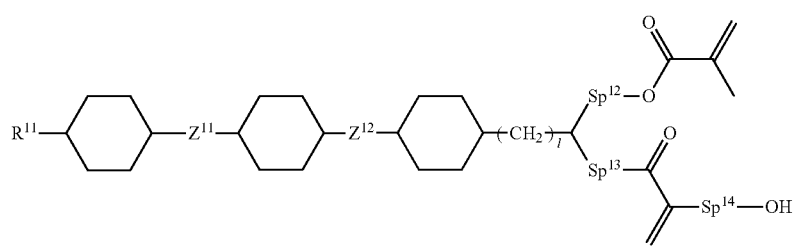

-continued
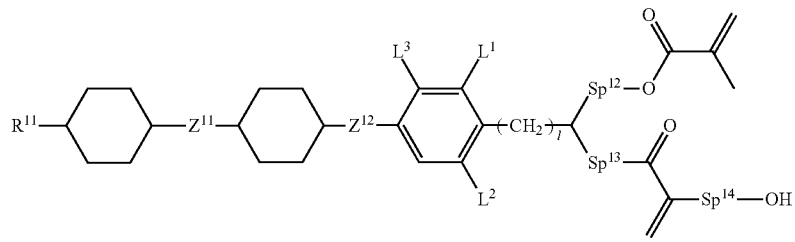
(AI-8)
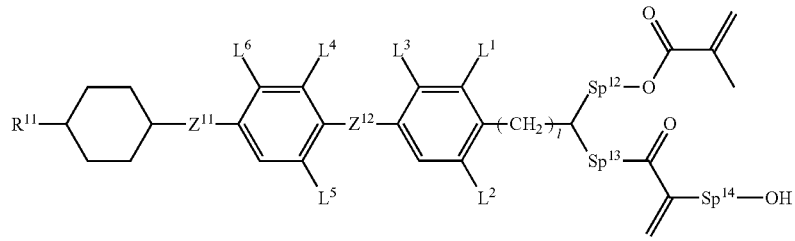
(AI-9)
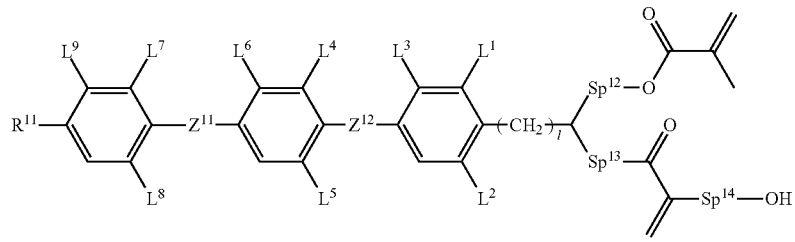
(AI-10)
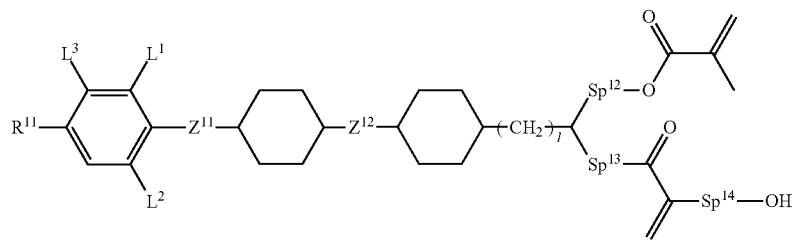
(AI-11)
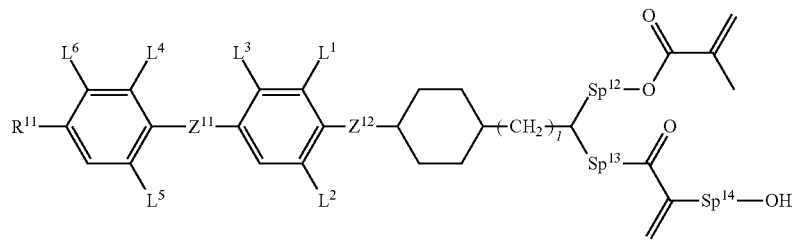
(AI-12)
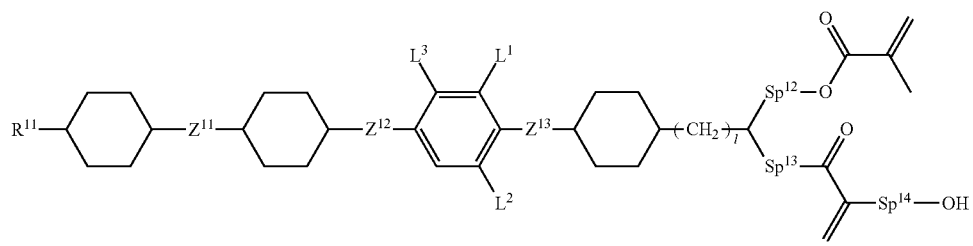
(AI-13)

-continued
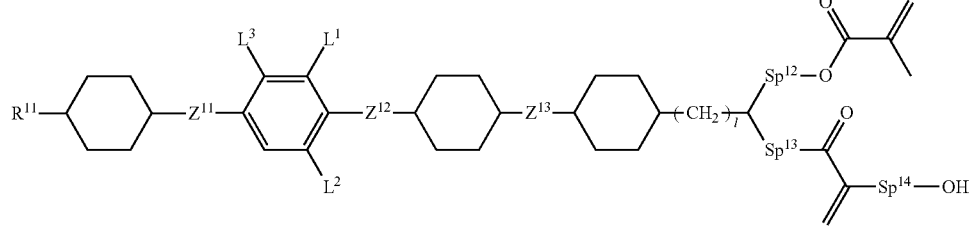
(AI-14)
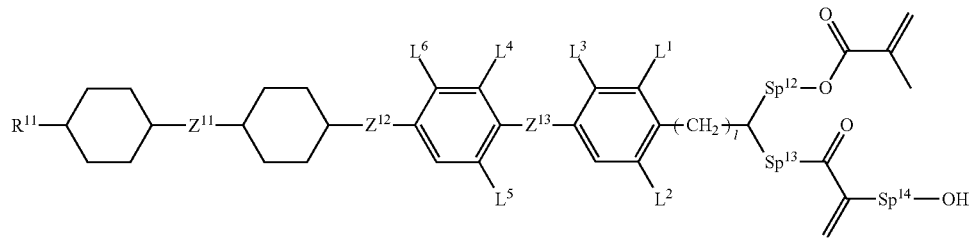
(AI-15)
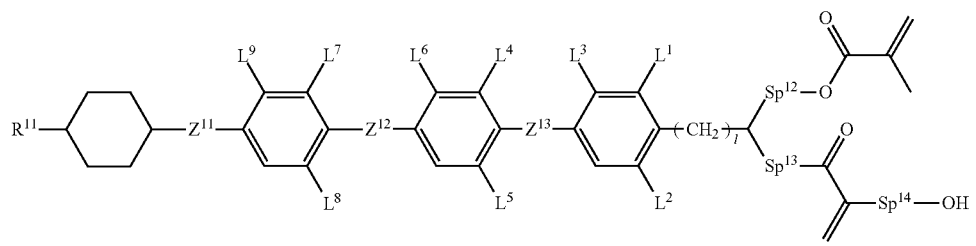
(AI-16)
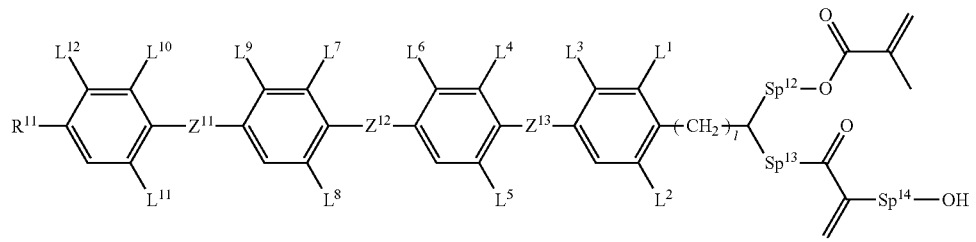
(AI-17)
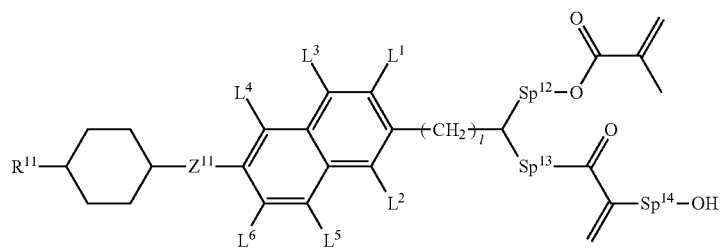
(AI-18)
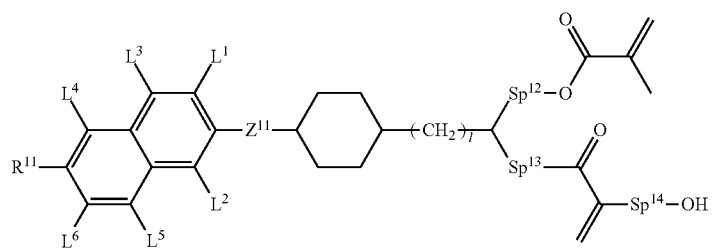
(AI-19)

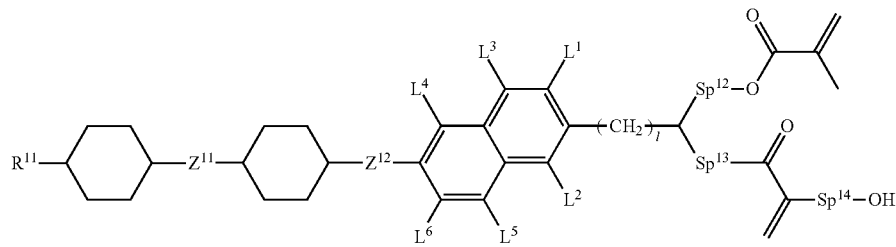

(AI-20)

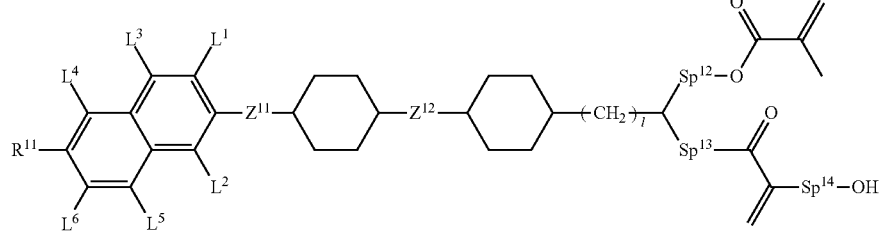

(AI-21)

wherein, in formulas (1-1) to (1-9), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $Z^1$ is a single bond, —CH$_2$CH$_2$—, —CH=CH—, —COO—, —OCO—, —CF$_2$O—, —OCF$_2$—, —CH$_2$O—, —OCH$_2$— or —CF=CF—; Sp' and $Sp^2$ are independently a single bond or alkylene having 1 to 7 carbons, and in the alkylene, at least one piece of —CH$_2$— may be replaced by —O—, —COO— or —OCO—, and at least one piece of —CH$_2$CH$_2$— may be replaced by —CH=CH—, and in the groups, at least one hydrogen may be replaced by fluorine; and $L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl: and in formulas (AI-2) to (AI-21), $R^{11}$ is alkyl having 1 to 10 carbons;

$Z^{11}$, $Z^{12}$ and $Z^{13}$ are independently a single bond, —CH$_2$CH$_2$— or —(CH$_2$)$_4$—;

$Sp^{12}$, $Sp^{13}$ and $Sp^{14}$ are independently a single bond or alkylene having 1 to 5 carbons, and in the alkylene, at least one piece of —CH$_2$— may be replaced by —O—;

$L^1$, $L^2$, $L^3$, $L^4$, $L^5$, $L^6$, $L^7$, $L^8$, $L^9$, $L^{10}$, $L^{11}$ and $L^{12}$ are independently hydrogen, fluorine, methyl or ethyl; and l is 1, 2, 3, 4, 5 or 6.

6. The method for manufacturing the liquid crystal display device according claim 1, wherein, composition, a proportion of the polymerizable compound is in the range of 0.05% by weight to 10% by weight based on the weight of the liquid crystal composition.

7. The method for manufacturing the liquid crystal display device according to claim 1, wherein the liquid crystal composition contains at least one compound selected from the group of compounds represented by formula (2) as a first component:

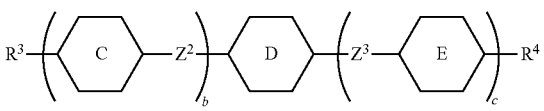

(2)

wherein, in formula (2), $R^3$ and $R^4$ are independently alkyl having 1 to 12 carbons, alkoxy having 1 to 12 carbons, alkenyl having 2 to 12 carbons or alkenyloxy having 2 to 12 carbons; ring C and ring E are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^2$ and $Z^3$ are independently a single bond, —CH$_2$CH$_2$—, —CH$_2$O—, —OCH$_2$—, —COO— or —OCO—; and b is 1, 2 or 3, c is 0 or 1, and a sum of b and c is 3 or less.

8. The method for manufacturing the liquid crystal display device according to claim 7, wherein the liquid crystal composition contains at least one compound selected from the group of compounds represented by formulas (2-1) to (2-22) as the first component:

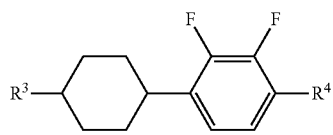

(2-1)

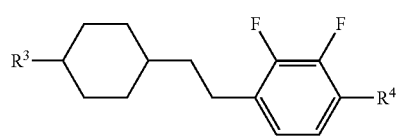

(2-2)

-continued

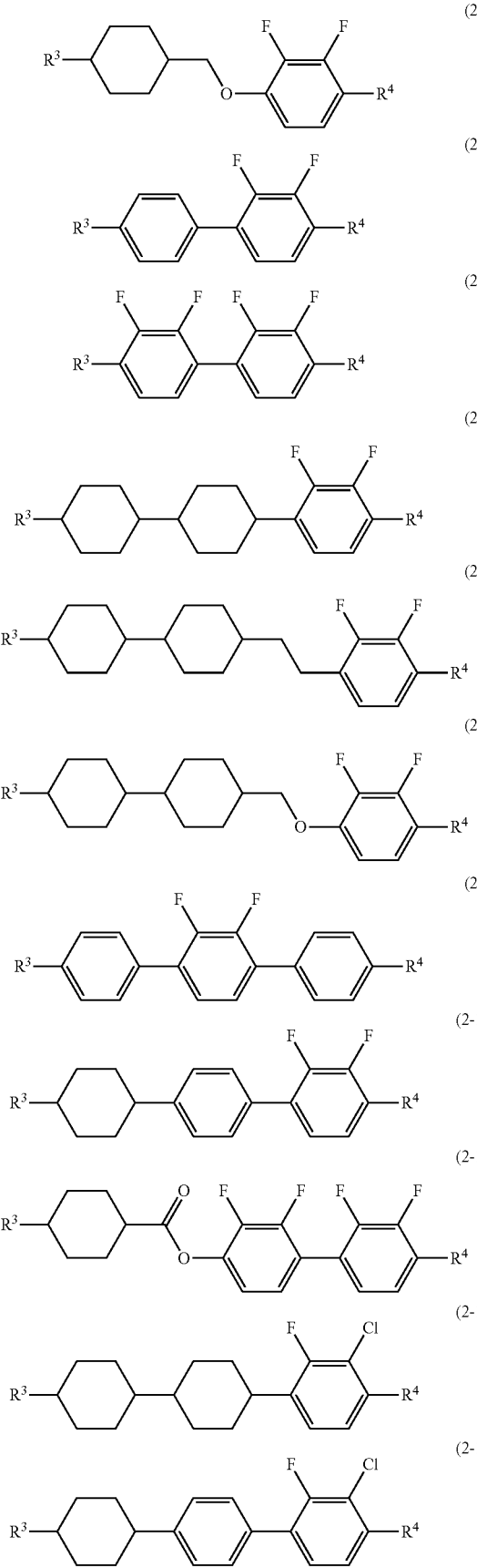

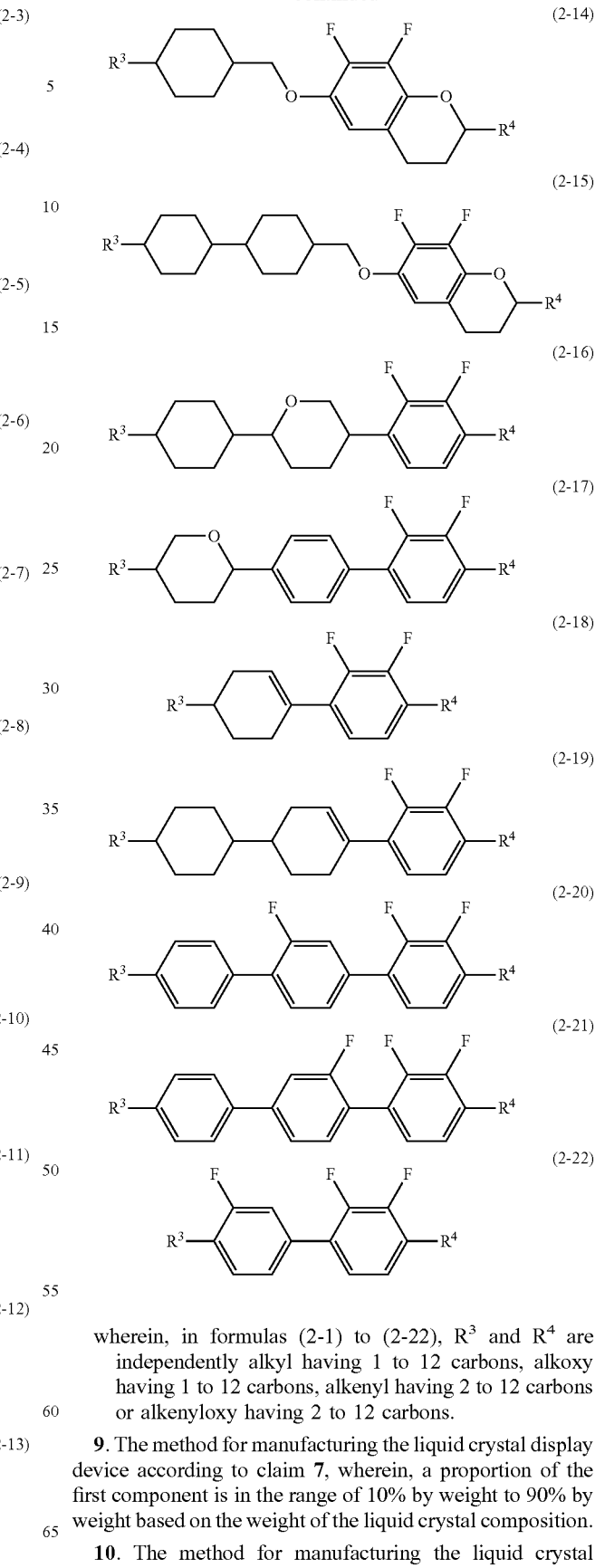

wherein, in formulas (2-1) to (2-22), $R^3$ and $R^4$ are independently alkyl having 1 to 12 carbons, alkoxy having 1 to 12 carbons, alkenyl having 2 to 12 carbons or alkenyloxy having 2 to 12 carbons.

9. The method for manufacturing the liquid crystal display device according to claim 7, wherein, a proportion of the first component is in the range of 10% by weight to 90% by weight based on the weight of the liquid crystal composition.

10. The method for manufacturing the liquid crystal display device according to claim 1, wherein the liquid crystal composition contains at least one compound selected from the group of compounds represented by formula (3) as a second component:

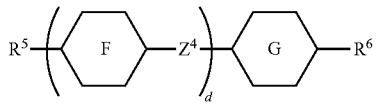
(3)

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring F and ring G are independently 1,4-cyclohexylene, 1,4-phenylene, 2-fluoro-1,4-phenylene or 2,5-difluoro-1,4-phenylene; $Z^4$ is a single bond, —CH₂CH₂—, —CH₂O—, —OCH₂—, —COO— or —OCO—; and d is 1, 2 or 3.

11. The method for manufacturing the liquid crystal display device according to claim 10, wherein the liquid crystal composition contains at least one compound selected from the group of compounds represented by formulas (3-1) to (3-13) as the second component:

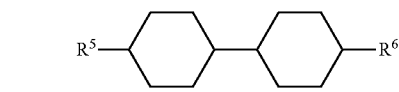
(3-1)

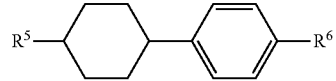
(3-2)

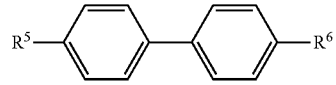
(3-3)

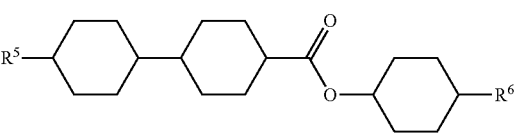
(3-4)

(3-5)

(3-6)

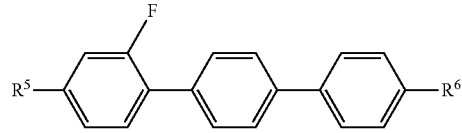
(3-7)

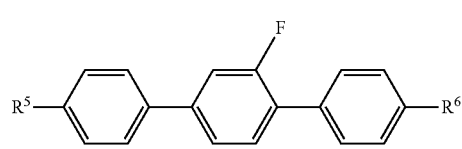
(3-8)

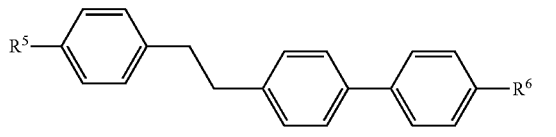
(3-9)

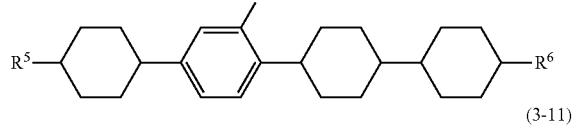
(3-10)

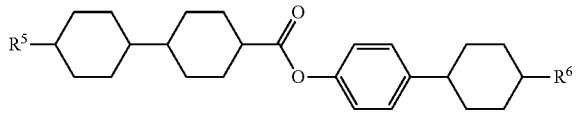
(3-11)

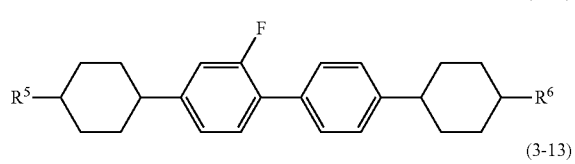
(3-12)

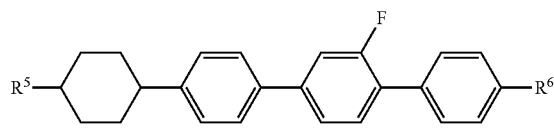
(3-13)

wherein, in formulas (3-1) to (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

12. The method for manufacturing the liquid crystal display device according to claim 10, wherein a proportion of the second component is in the range of 10% by weight to 70% by weight based on the weight of the liquid crystal composition.

13. The method for manufacturing the liquid crystal display device according to claim 1, further containing a polymerizable compound having no polar anchor group.

14. The method for manufacturing the liquid crystal display device according to claim 13, wherein at least one of the polymerizable compound having no polar anchor group is a polymerizable compound selected from the group of compounds represented by formula (4):

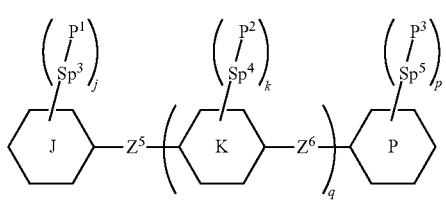
(4)

wherein, in formula (4), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^5$ and $Z^6$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C(CH_3)=CH—, —CH=C(CH_3)— or —C(CH_3)=C(CH_3)—, and in the groups, at least one hydrogen may be replaced by fluorine or chlorine; $P^1$, $P^2$ and $P^3$ are a polymerizable group; $Sp^a$, $Sp^4$ and $Sp^y$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in the groups, at least one hydrogen may be replaced by fluorine or chlorine; q is 0, 1 or 2; and j, k and p are independently 0, 1, 2, 3 or 4, and a sum of j, k and p is 1 or more.

15. The method for manufacturing the liquid crystal display device according to claim 14, wherein, in formula (4), $P^1$ $P^2$ and $P^3$ are independently a polymerizable group selected from the group of groups represented by formulas (P-1) to (P-5):

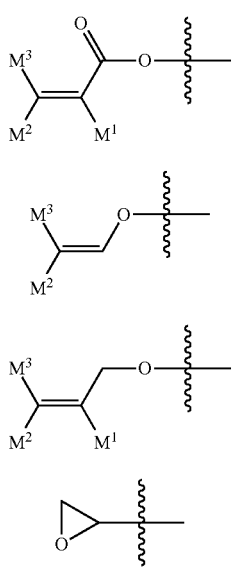

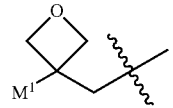

wherein, in formulas (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

16. The method for manufacturing the liquid crystal display device according to claim 14, wherein at least one of the polymerizable compounds having no polar anchor group is a polymerizable compound selected from the group of compounds represented by formulas (4-1) to (4-28):

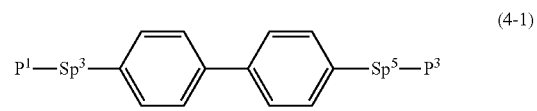

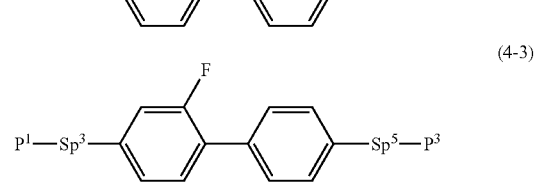

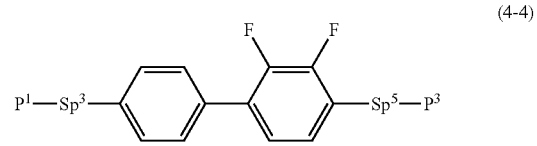

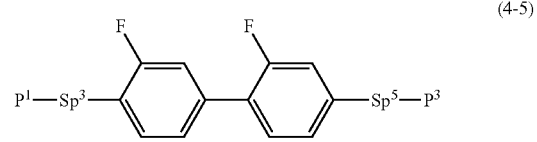

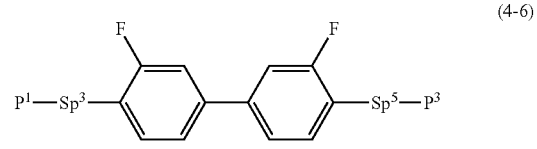

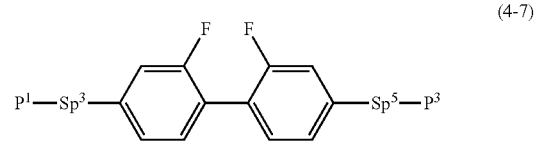

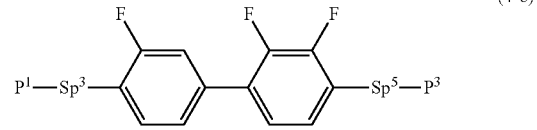

(4-9) 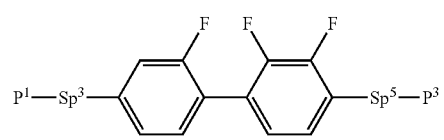
(4-10) 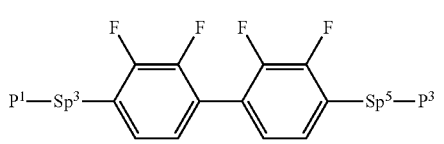
(4-11) 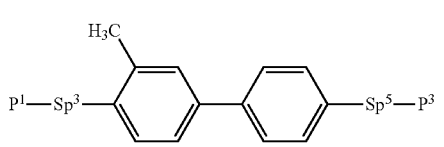
(4-12) 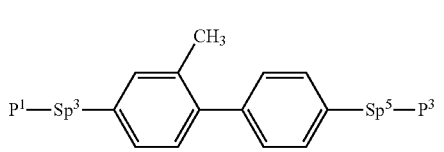
(4-13) 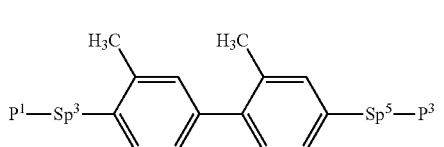
(4-14) 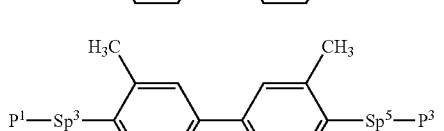
(4-15) 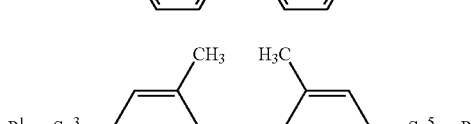
(4-16) 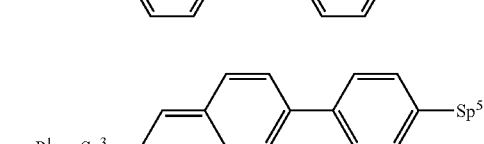
(4-17) 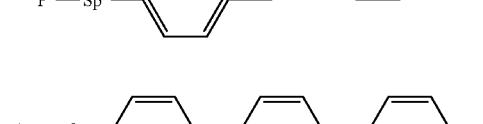
(4-18) 
(4-19) 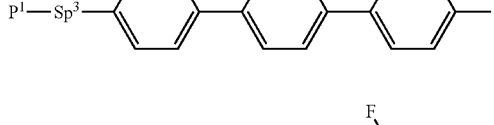
(4-20) 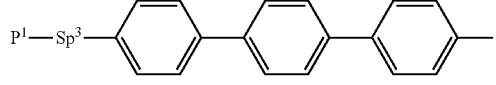
(4-21) 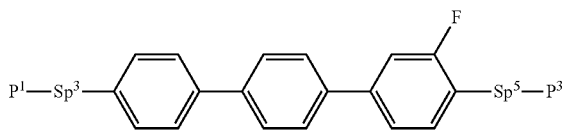
(4-22) 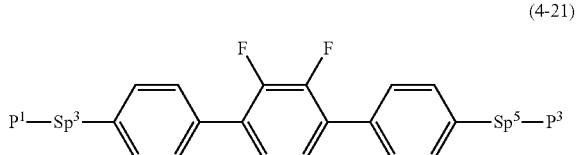
(4-23) 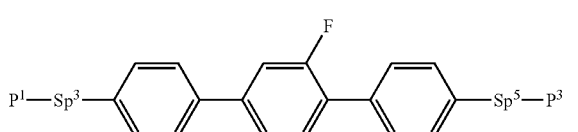
(4-24) 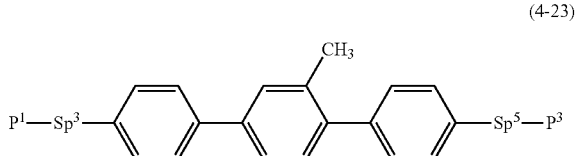
(4-25) 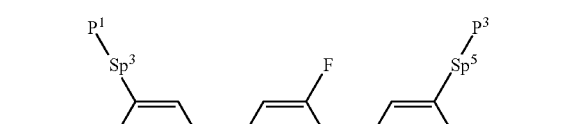
(4-26) 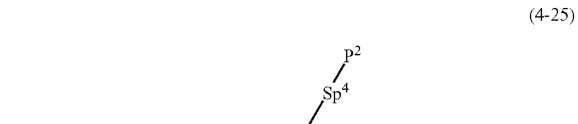
(4-27) 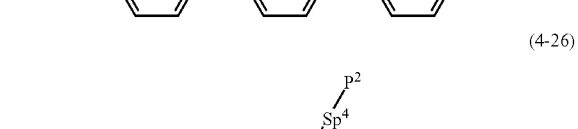

-continued (4-28)

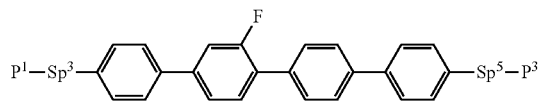

wherein, in formulas (4-1) to (4-28), $P^1$, $P^2$ and $P^3$ are independently a polymerizable group selected from the group of groups represented by formulas (P-1) to (P-3), in which M', $M^2$ and $M^3$ are independently hydrogen, fluorine, alkyl having 1 to 5 carbons, or alkyl having 1 to 5 carbons in which at least one hydrogen is replaced by fluorine or chlorine;

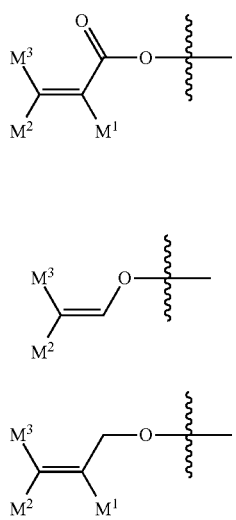

wherein $Sp^a$, $Sp^4$ and $Sp^y$ are independently a single bond or alkylene having 1 to 10 carbons, and in the alkylene, at least one piece of —$CH_2$— may be replaced by —O—, —OCO—, —OCO— or —OCOO—, and at least one piece of —$CH_2CH_2$— may be replaced by —CH=CH— or —C≡C—, and in the groups, at least one hydrogen may be replaced by fluorine or chlorine.

17. The method for manufacturing the liquid crystal display device according to claim 14, wherein a proportion of the polymerizable compound having no polar anchor group is in the range of 0.03% by weight to 10% by weight based on the weight of the liquid crystal composition.

18. A liquid crystal display device, manufactured by the method for manufacturing the liquid crystal display device according to claim 1.

19. The liquid crystal display device according to claim 18, wherein an operating mode in the liquid crystal display device includes an IPS mode, a VA mode, an FFS mode or an FPA mode, and a driving mode in the liquid crystal display device includes an active matrix mode.

20. The method for manufacturing the liquid crystal display device according to claim 2, containing at least one polar compound selected from the group of compounds represented by formula (1) and compounds represented by formula (AI-1) as

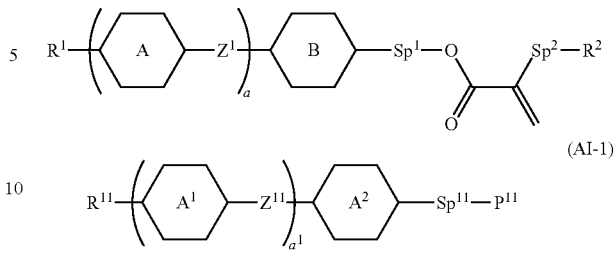

wherein, in formula (1), $R^1$ is hydrogen, halogen, alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; $R^2$ is —OH, —$OR^0$, —$NH_2$, —$NHR^0$ or a group represented by —$N(R^0)_2$, in which $R^0$ is alkyl having 1 to 5 carbons, and in the alkyl, at least one piece of —$CH_2$— may be replaced by —O—, and at least one piece of —$CH_2CH_2$— may be replaced by —CH=CH—, and in the groups, at least one hydrogen may be replaced by fluorine; ring A and ring B are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl or anthracene-2,6-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ is a single bond, —$CH_2CH_2$—, —CH=CH—, —COO—, —OCO—, —$CF_2O$—, —$OCF_2$—, —$CH_2O$—, —$OCH_2$— or —CF=CF—; $Sp^1$ and $Sp^2$ are independently a single bond or alkylene having 1 to 7 carbons, and in the alkylene, at least one piece of —$CH_2$— may be replaced by —O—, —COO— or —OCO—, and at least one piece of —$CH_2CH_2$— may be replaced by —CH=CH—, and in the groups, at least one hydrogen may be replaced by fluorine; and a is 0, 1, 2, 3 or 4: and in formula (AI-1),
$R^{11}$ is alkyl having 1 to 15 carbons, and in $R^{11}$, at least one piece of —$CH_2$— may be replaced by —O— or —S—, at least one piece of —$CH_2CH_2$— may be replaced by —CH=CH— or —C≡C—, and at least one hydrogen may be replaced by halogen;
ring $A^1$ and ring $A^2$ are independently 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta[a]phenanthrene-3,17-diyl or 2,3,4,7,8,9,10,11,12,13,14,15,16,17-tetradecahydrocyclopenta[a]phenanthrene-3,17-diyl, and in the rings, at least one hydrogen may be replaced by fluorine, chlorine, alkyl having 1 to 12 carbons, alkenyl having 2 to 12 carbons, alkoxy having 1 to 11 carbons or alkenyloxy having 2 to 11 carbons, and in the groups, at least one hydrogen may be replaced by fluorine or chlorine;

$a^1$ is 0, 1, 2, 3 or 4;

$Z^{11}$ is a single bond or alkylene having 1 to 6 carbons, and in $Z^{11}$, at least one piece of —CH$_2$— may be replaced by —O—, —CO—, —COO—, —OCO— or —OCOO—, at least one piece of —CH$_2$CH$_2$— may be replaced by —CH=CH— or and at least one hydrogen may be replaced by fluorine or chlorine; and $Sp^{11}$ is a single bond or alkylene having 1 to 10 carbons, and in $Sp^{11}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by halogen, and in the groups, at least one hydrogen is replaced by a group selected from the group of groups represented by formula (1a);

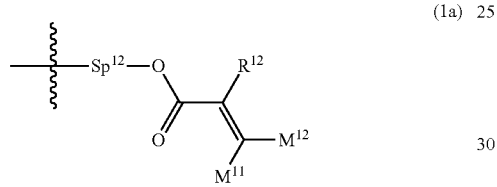

(1a)

wherein, in formula (1a), $Sp^{12}$ is a single bond or alkylene having 1 to 10 carbons, and in $Sp^{12}$, at least one piece of —CH$_2$— may be replaced by —O—, —CO—, —COO—, —OCO— or —OCOO—, at least one piece of —CH$_2$CH$_2$— may be replaced by —CH=CH— or —C≡C—, and at least one hydrogen may be replaced by halogen;

$M^{11}$ and $M^{12}$ are independently hydrogen, halogen, alkyl having 1 to 5 carbons, or alkyl having 1 to 5 carbons in which at least one hydrogen is replaced by halogen:

$R^{12}$ is alkyl having 1 to 15 carbons, and in $R^{12}$, at least one piece of —CH$_2$— may be replaced by —O— or —S—, at least one piece of —CH$_2$CH$_2$— may be replaced by —CH=CH— or —C≡C—, and at least one hydrogen may be replaced by halogen: and in formula (AI-1), $P^{11}$ is a group selected from the group of groups represented by formulas (1e) and (1f);

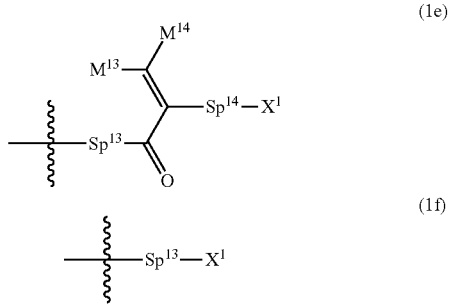

wherein, in formulas (1e) and (1f), $Sp^{13}$ is a single bond or alkylene having 1 to 10 carbons, and in $Sp^{13}$, at least one piece of —CH$_2$— may be replaced by —O—, —NH—, —CO—, —COO—, —OCO— or —OCOO—, and at least one piece of —CH$_2$CH$_2$— may be replaced by —CH=CH— or —C≡C—, and in the groups, at least one hydrogen may be replaced by halogen;

$Sp^{14}$ is independently a single bond or alkylene having 1 to 10 carbons, and in $Sp^{14}$, at least one piece of —CH$_2$— may be replaced by —O—, —NH—, —CO—, —COO—, —OCO— or —OCOO—, at least one piece of —CH$_2$CH$_2$— may be replaced by —CH=CH— or —C≡C—, and at least one hydrogen may be replaced by halogen;

$M^{13}$ and $M^{14}$ are independently hydrogen, halogen, alkyl having 1 to 5 carbons, or alkyl having 1 to 5 carbons in which at least one hydrogen is replaced by halogen:

$X^1$ is —OH, —NH$_2$, —OR$^{15}$, —N(R$^{15}$)$_2$, —COOH, —SH, —B(OH)$_2$ or —Si(R$^{15}$)$_3$; and in —OR$^{15}$, —N(R$^{15}$)$_2$ and —Si(R$^{15}$)$_3$, $R^{15}$ is hydrogen or alkyl having 1 to 10 carbons, and in $R^{15}$, at least one piece of —CH$_2$— may be replaced by —O—, at least one piece of —CH$_2$CH$_2$— may be replaced by —CH=CH—, and at least one hydrogen may be replaced by halogen.

* * * * *